United States Patent

[11] 3,621,326

[72] Inventor Gilbert L. Hobrough
Los Altos, Calif.

[21] Appl. No. 822,086
[22] Filed Sept. 30, 1968
[45] Patented Nov. 16, 1971
[73] Assignee Itek Corporation
Lexington, Mass.
Original application Sept. 4, 1964, Ser. No. 394,502, now Patent No. 3,432,674, dated Mar. 11, 1969. Divided and this application Sept. 30, 1968, Ser. No. 822,086

[54] TRANSFORMATION SYSTEM

5 Claims, 58 Drawing Figs.

[52] U.S. Cl. .......... 315/26
[51] Int. Cl. .......... H01j 29/76
[50] Field of Search .......... 250/220 SP; 315/24, 26

[56] References Cited

UNITED STATES PATENTS

| | | | |
|---|---|---|---|
| 2,961,576 | 11/1960 | Burgetti, Jr. | 315/26 X |
| 3,309,560 | 3/1967 | Popodi | 315/27 GDC |
| 3,422,305 | 1/1969 | Intante | 315/27 GDC |
| 3,422,306 | 1/1969 | Gray | 315/27 GD |
| 3,513,257 | 5/1970 | Hobrough | 250/220 SP |

*Primary Examiner*—Richard A. Farley
*Assistant Examiner*—Brian L. Ribando
*Attorneys*—Homer O. Blair and Robert L. Nathans ABSTRACT: A photogrammetric system for automatically registering a pair of photographic images for stereographic inspection. Automatic registration of the photographic images is accomplished by electronically sensing parallaxes between the images, and by transforming the images to accomplish registration. Each of a pair of stereo photographs is scanned in $x$ and $y$ by a separate flying spot scanner which is driven by $x$ and $y$ raster generators. The output of each of the flying spot scanners is applied to a separate video processor for controlling and enhancing the image signals and then to a separate cathode-ray tube which is driven in $x$ and $y$ by the same $x$ and $y$ raster generators. The two cathode-ray tubes comprise the left and right sides of a binocular viewer. The output of each of the flying spot scanners and the $x$ and $y$ raster signals are applied to a correlation system which detects parallax errors and first and second order distortions between corresponding sections of each of the photographic images. The correlation system divides the output signals of the flying spot scanners into different frequency band-pass regions for separate correlation of the components of each of the signals in each band-pass region. The output of the correlation system is applied, via a transformation system, as correction signals to the raster signals driving the flying spot scanners which enables the pair of photographic images to be viewed in registration.

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

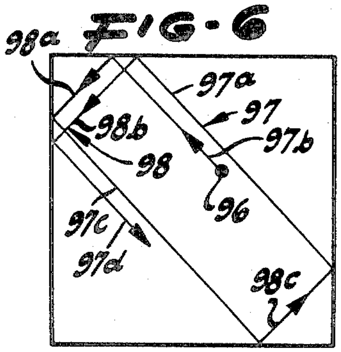
FIG-6
FIG-7
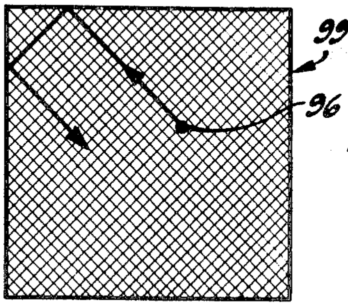
FIG 8
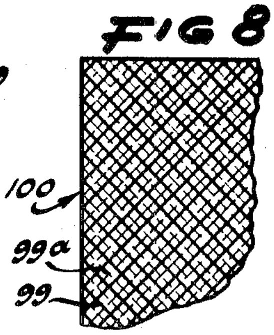
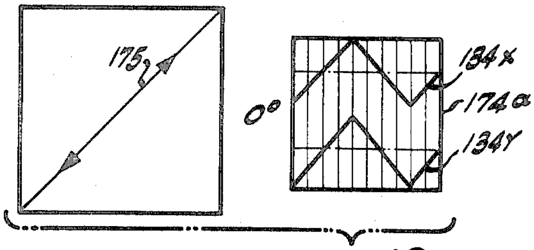
FIG-13a
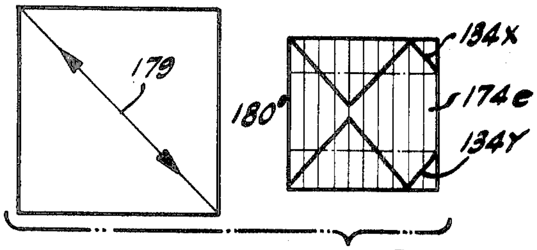
FIG-13e
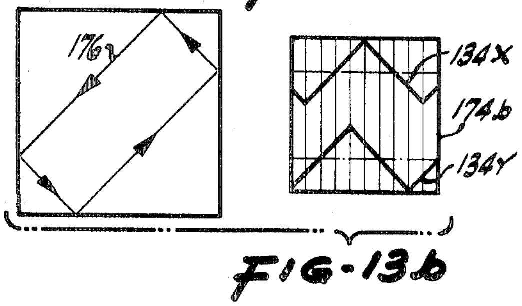
FIG-13b
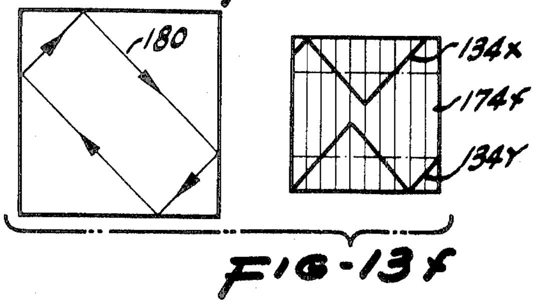
FIG-13f
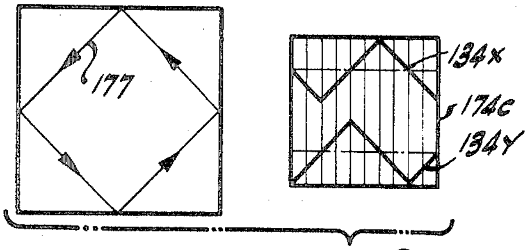
FIG-13c
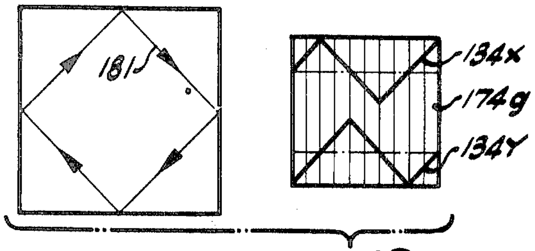
FIG-13g
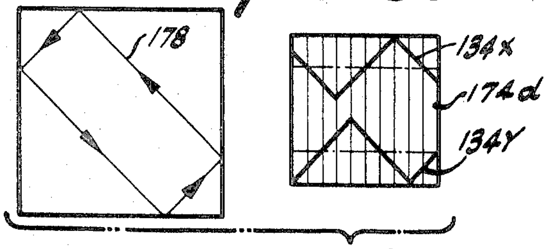
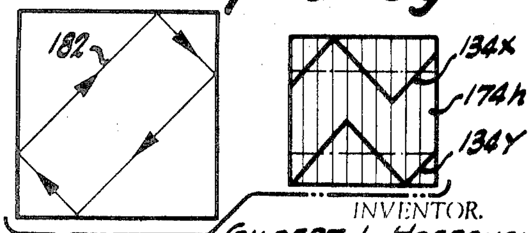
INVENTOR.
GILBERT L. HOBROUGH
FIG-13d FIG-13h

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

| | | | | |
|---|---|---|---|---|
| 354-INPUT | O | + | O | + |
| 355-INPUT | O | O | + | + |
| 356-OUTPUT | O | + | + | O |

INVENTOR.
GILBERT L. HOBROUGH

INVENTOR.
GILBERT L. HOBROUGH

WAVEFORMS IN DIFFERENTIATOR

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

INVENTOR.
GILBERT L. HOBROUGH

TRANSFORMATION SYSTEM

This patent application is a divisional application of U.S. Pat. Application Ser. No. 394,502, filed Sept. 4, 1964 for PHOTOGRAPHIC IMAGE REGISTRATION, now U.S. Pat No. 3,432,674, issued Mar. 11, 1969.

This invention pertains to the art of photogrammetry, and is concerned primarily with registration of a stereo pair of photographic images for stereographic inspection thereof. In a particular sense, the invention relates to a viewing instrument or stereoscope in which certain image transformations requisite to such registration are performed automatically.

The data reduction phase of map making (data gathering and data presentation being the other broad phases thereof) is generally referred to as photogrammetry, and involves the derivation of terrain dimensions from measurements taken in photographs. For purposes of analysis, mapping photogrammetry can be subdivided into compilation and aerial-triangulation operations. In a compilation operation, topographic and planemetric detail is plotted from a pair of stereo photographs on a stereo plotting instrument; and in an aerial-triangulation operation, the numerous aerial photographs obtained in the data-gathering phase of map making are related to each other in order to reduce to a minimum the need for ground control in the data-gathering phase. In both compilation and triangulation operations, the locating of corresponding or homologous points in stereo images (that is, the registration of such images) is the primary function performed. Consequently, it may be said that the registration of photographic images, whether accomplished manually or automatically, is basic to practically all photogrammetric operations.

In connection with such registration of photographic images, relative distortions between a stereo pair of photographic images are a common occurrence quite familiar to photogrammetists. Convergent and panoramic photography probably represent the most extreme cases of such distortions, with convergent panoramic stereograms providing the most severe instance thereof. As a consequence of such relative image distortions, registration of photographic images generally requires one or more transformations to be made if registration of the images is to be accomplished.

In order to understand better what is meant by the aforementioned terms "transformation" and "registration," it will be of convenience to define the same as well as certain other terms used herein. Accordingly, such terms are defined as follows:

1. Transformation—a systematic operation upon an image thereby to alter its scale, orientation, or overall shape;

2. Parallax—the separation, generally unwanted, between corresponding points in similar images when superimposed;

3. Registration—the act of transforming one or both of a pair of similar images so as to substantially reduce all parallaxes to zero when the images are superimposed;

4. Relative Distortion—a difference in size or shape of similar images such that a transformation of one or both images is required to achieve registration;

5. Manual Registration—the visual observation of parallax and the manual adjustment of the various image transformations as required to reduce the parallaxes to zero;

6. Automatic Registration—the sensing of image parallaxes (electronically herein) and the automatic feedback adjustment of "prime" transformations toward registration.

For purposes of classification herein, there are a group of 10 first- and second-order transformations which are taken to be prime, and there are various combinations of such prime transformations which will be considered therewith. (In this system of classification, relative displacement or separation between undistorted images i.e., parallax, is regarded as a zero-order transformation). The 10 first- and second-order transformations are illustrated in FIG. 1 of the drawings in superimposed relation, in each instance, on a nontransformed image indicated by broken lines. Referring to this figure, it is seen that the first-order transformations are grouped in the left-hand vertical column and the second-order transformations are grouped in the right-hand vertical column. The 10 prime transformations comprise two groups of five each, respectively involving $x$ parallaxes and $y$ parallaxes. In FIG. 1, the five prime transformations involving $x$ parallaxes are located in the upper horizontal row, and the five prime transformations involving $y$ parallaxes are located in the middle horizontal row. In the lower horizontal row are illustrated five combinations of the prime transformations, and as is evident in FIG. 1, three of such combinations are of the first order and two are of the second order.

Referring to the illustrated transformations, the $x$ in $x$ (or $x$ scale) transformation constitutes an elongation of the image along the $x$ or horizontal axis so that the image, which initially is square-shaped, becomes rectangular. Similarly, the $y$ in $y$ (or $y$ scale) transformation is an elongation of the image along the $y$ or vertical axis. A combination of the $x$ scale and $y$ scale transformations gives the scale transformation, illustrated under first-order combinations, in which the image is elongated both in the $x$ and $y$ directions to enlarge the same from the initial dimensions thereof illustrated by broken lines.

The $y$ in $x$ (or $x$ skew) transformation is an angular distortion in which the image becomes a parallelogram with the base thereof parallel to the $x$ or horizontal axis. The $x$ in $y$ (or $y$ skew) transformation is an angular distortion in which the image becomes a parallelogram with the base thereof parallel to the $y$ or vertical axis. Combinations of the $x$ sken and $y$ skew transformations, yield the rotation transformations indicated under first-order combinations.

The second-order transformations include an $x^2$ in $x$ transformation in which the image is enlarged to progressively increasing degrees along the $x$-axis, and the $y^2$ in $y$ transformation is a similar enlargement along the $y$-axis. The $y^2$ in $x$ transformation results in a parabolic curving of all of the $y$ ordinates. Similarly, the $x^2$ in $y$ transformation results in a parabolic curving of all of the $x$ abscissas. The $xy$ in $x$ transformation is a linear change in the $x$-direction width of the image which change progresses along the $y$-axis. Correspondingly, the $xy$ in $y$ transformation is a linear change in the $y$-direction width of the image which change progresses along the $x$-axis. Combinations of the prime second-order transformation to produce the two illustrated projective combinations are, respectively, the $y^2$ in $y$ and $xy$ in $x$ transformations, and the $x^2$ in $x$ and $xy$ in $y$ transformations.

Each of the FIG. 1 illustrations representing prime transformations shows the effect of such transformations upon an undistorted image consisting of a square 4×4 grid. Considering firstly $x$ scale transformations, such a transformation can be produced by adding to the $x$-coordinate of any point in the undistorted image area a quantity proportional to such $x$-coordinate Similarly, a $y$ scale transformation can be produced by adding to the $y$-coordinate of any point in the undistorted image area a quantity proportional to such $y$-coordinate X skew transformations can be produced by adding to the $x$-coordinate of any point in the undistorted image area a quantity proportional to the $y$-coordinate of that point. Similarly, the $y$ skew distortion illustrated in FIG. 1 can be produced by adding to the $y$-coordinate of any point in the undistorted image area a quantity proportional to the *$x$-coordinate of that point.*

All distortions shown in FIG. 1 can be construed as being produced by additions of this type; for example, the second-order distortion $y^2$ in $x$ can be produced by adding to the $x$-coordinate of any point in the undistorted image area a quantity proportional to the square of the $y$-coordinate of that point.

It may be noted that panoramic photographs taken in their entirety present considerable third and higher order distortions. However, sections of a panoramic photograph of a size likely to be examined at any one time show much less higher order distortion; and, consequently, it is not proposed herein to consider transformations of orders higher than the second when dealing with such photography. Terrain relief also introduces higher order relative distortion between stereo pairs, but such distortions and displacements are in the $x$ direction only and are not subject to systematic transformation by either optical or electronic means and are not considered herein.

Relative orientation of stereo pairs of photographs to effect registration thereof involves first- and second-order transformations requiring 5 degrees of freedom of movement. Consequently, when one considers the time and tedium involved in the process of relative orientation, it is appreciated that a manual registration operation in which all of the aforementioned prime transformations are separately subject to control would be for most purposes impractical. Also the complexity of mechanical optical instrument providing a separate adjustment for each of such transformations would be equally impractical. Nevertheless, registration operations have been performed manually using stereoscopes and stereo comparators, but transformations permitted in such instruments generally have been confined to simple translations and rotations of the images. In view of the complexities and difficulties inherent in manual registration, it is apparent that an automatic registration instrument would be desirable and some instruments of this type have been proposed. Such proposed instruments vary widely in the number of transformations subject to automatic registration, and so far as is known, all are limited to certain zero- and first-order transformations.

The present invention is concerned with automatic registration of photographic images in which parallaxes are sensed electronically, and error information is fed back automatically to adjust the prime transformations toward registration. The invention involves improved instrumentation in which:

a. $y$ parallax is reduced essentially to zero at all points in the image area;

b. $x$ parallax is reduced at all points to values compatible with comfortable ocular convergence; and c. the tonal range of the observed image and the sine wave response characteristic of the imaging system are both subject to automatic adjustment to improved the appearance and interpretability of the stereo model as seen by the operator.

The instrumentation further provides second-order transformations to accommodate simple terrain curvature and to accommodate also photography exposed in oblique cameras and in cameras (e.g., panoramic photography) that do not conform to conventional perspective geometry.

The invention as embodied in instrumentation includes a transport system adapted to carry a pair of stereo photographs or stereograms and to permit $x$-axis and $y$-axis translations thereof; a flying spot-scanning system for scanning such stereograms; a light collection system including photoelectric detector devices; a binocular viewer for inspecting the stereo model electronically developed by properly fusing corresponding image areas of the stereograms; and electronic circuitry including generally a raster generator for developing the raster used by the scanning system and binocular viewer, video processors for controlling and enhancing the images transmitted from the light collection system to the binocular viewer, a correlation system, and a transformation system—the latter two of which are concerned with sensing parallax and making the aforementioned image transformations.

Such instrument employs cathode-ray tubes in both the scanning system and binocular viewer and, therefore, a raster generator is necessarily included in the instrument to produce waveforms which, when amplified and applied to the deflection systems of the cathode-ray tubes, produce the required raster on the faces of such tubes. The term "scanning pattern" or "pattern" as used herein refers to the geometric interrelation of the various lines or portions of the path traced out by the scanning spot of the cathode-ray tube as such spot moves continuously through the scanning area to define the entire scanning raster.

In the present instance, the scanning pattern utilized accommodates both of the following two functions when performed simultaneously: (1) the presentation to an operator of a high-quality image in which all of the detail present in the original photographs is preserved and, where possible, made more visible; and (2) the estimation of $x$ and $y$ parallaxes by the detection of time differences between left and right video signals. Further the scanning pattern, from the standpoint of parallax detection, offers the following advantages:

a. Motion of the scanning spot in mutually perpendicular directions, thereby permitting distance measurements to be made in the image directly from time measurements and in two orthogonal axes. Consequently, $x$ and $y$ parallaxes can be detected without pattern reorientation.

b. Scanning of each point in the image successively in four directions along two perpendicular lines so as to give four permutations of the image information and eliminate errors arising out of delay displacement.

c. Giving equal weight to all areas in the image in the determination of parallax and maintaining the scanning velocity constant at all times without retraces. Therefore, comparitively simple correlation circuitry can serve to detect parallax and to derive therefrom the various error signals required for transformation correction of the photographic images.

d. Production of the scanning pattern simply by application of triangular waveforms of nearly identical frequency to both the $x$ and $y$ deflection systems of the cathode-ray tubes.

The particular scanning pattern has crossing orthogonal sets of parallel lines, each set of which tends to obliterate the structure of the opposite set thereby giving an image having a faint woven-silk texture which is distinctly more pleasant than television-type images of equivalent resolution; the crossed-diagonal raster defined by such pattern is of generally square-shaped configuration and each image element is scanned in mutually perpendicular directions by a spot traveling at substantially uniform velocity throughout the useful image area; and each scanning frame is produce in its entirety by a continuously tracing scanning spot, and comprises two interlaced fields (three or more interlaced fields can be provided if desired) to double the resolution of the video image reproduction and substantially obviate objectionable flicker thereof.

Further characteristics of the invention especially as concerns particular objects and advantages thereof will become apparent from a consideration of the following specification and drawings, the latter of which illustrate a specific embodiment of the invention in which:

FIG. 6 is a diagrammatic view illustrating the character of the path followed by the spot of a cathode-ray tube in tracing the square-shaped dual-diagonal pattern;

FIG. 7 is a diagrammatic view illustrating one complete field as traced by the spot;

FIG. 8 is a broken diagrammatic view illustrating one complete frame as traced by the spot, one field of the frame being shown in solid lines and the second interlaced field being shown by broken lines;

Figure 17:
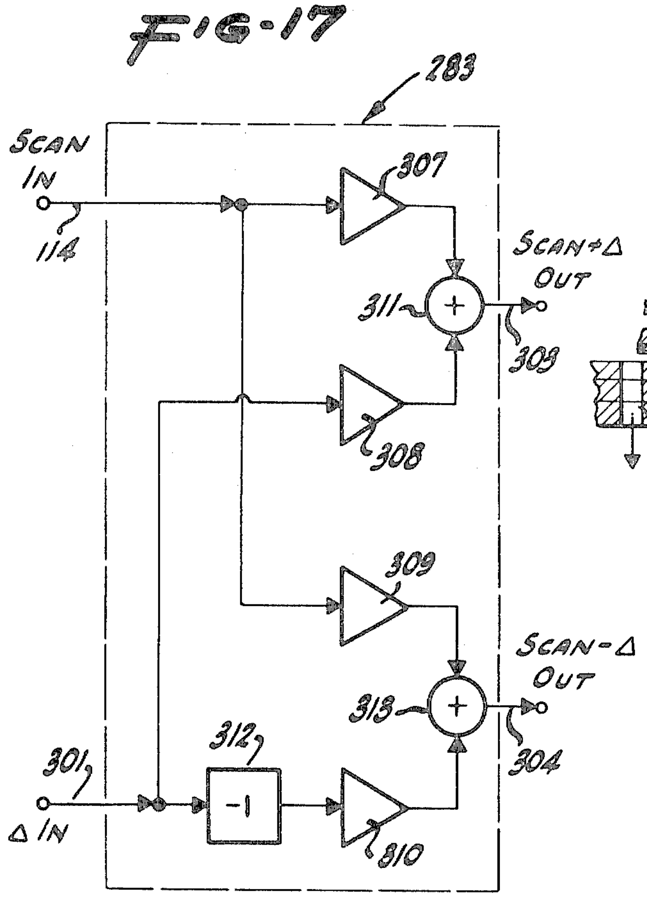
Figure 14:
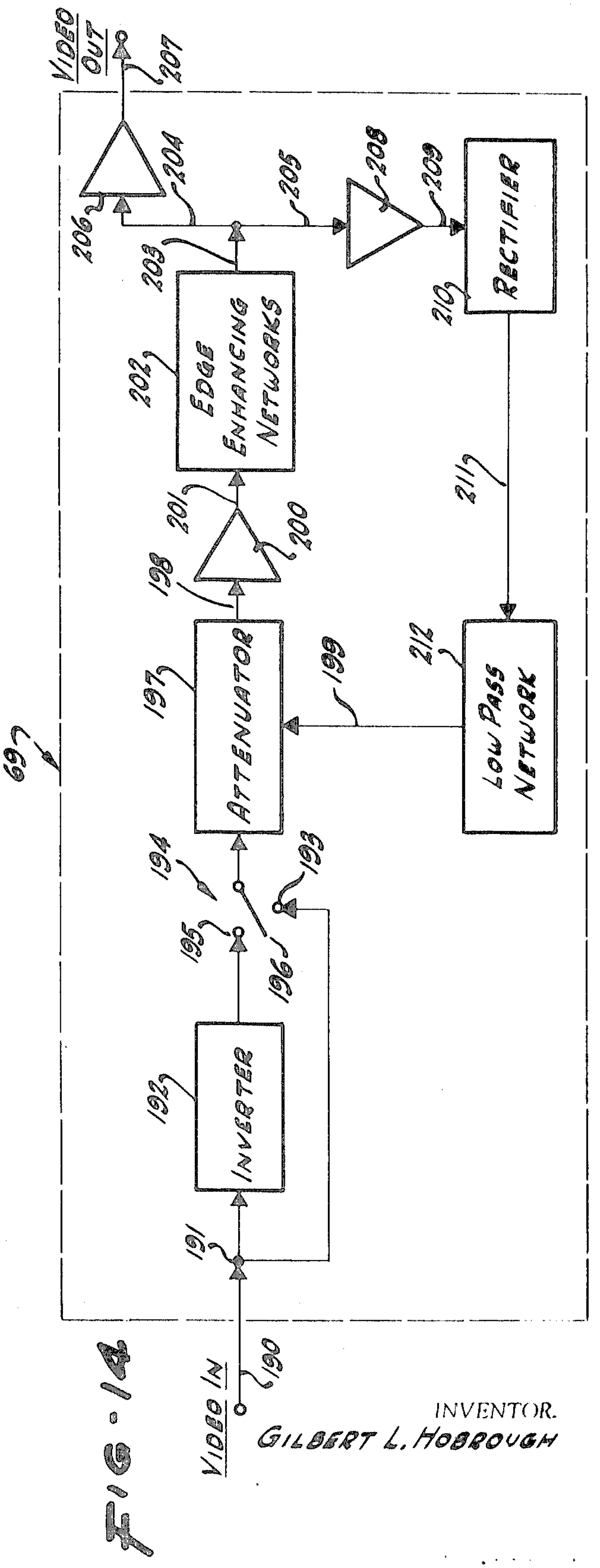
Figure 9:
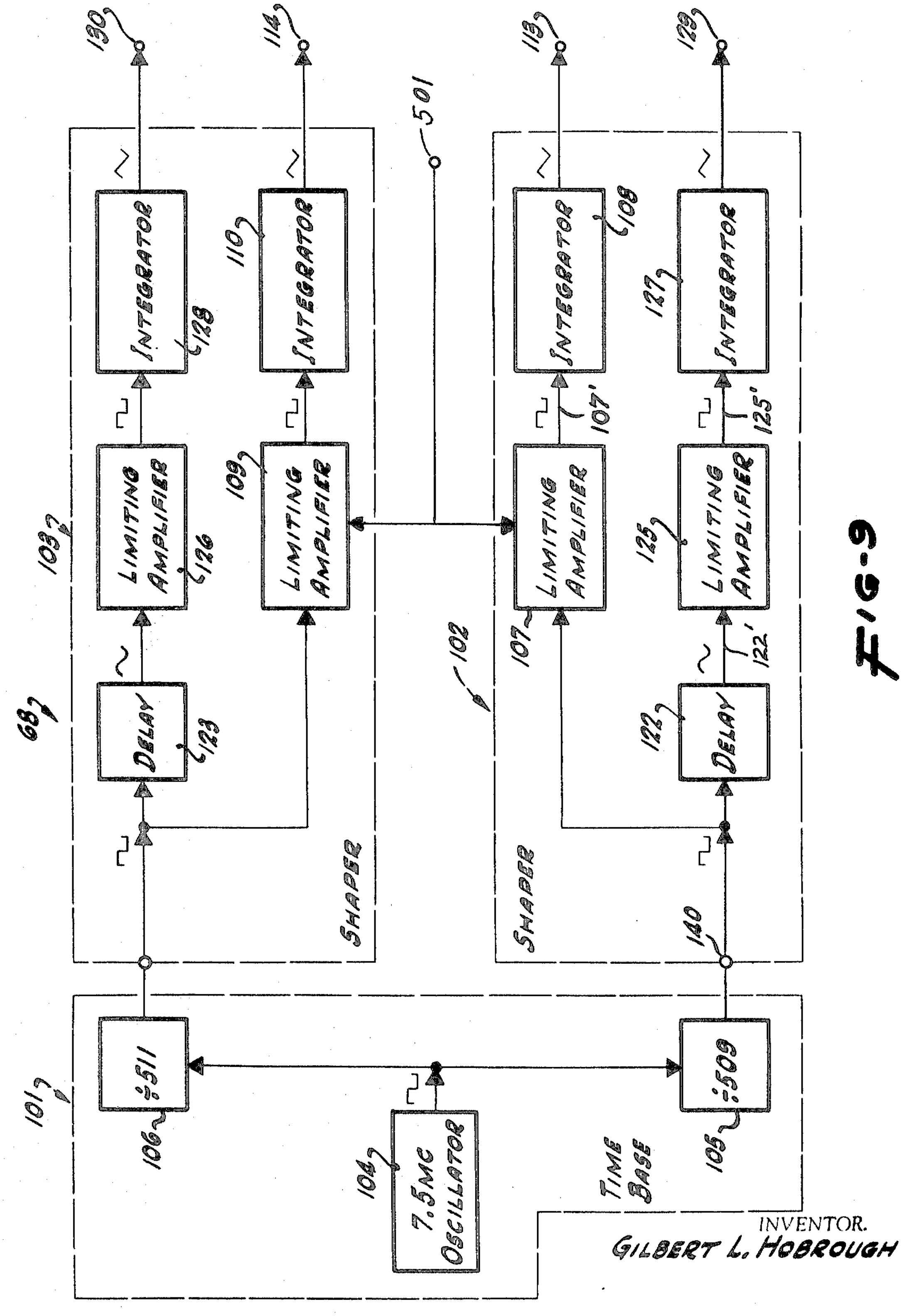
FIG. 9 is a block diagram illustrating a raster generator network for producing the required dual-diagonal scanning patterns.
Figure 15:
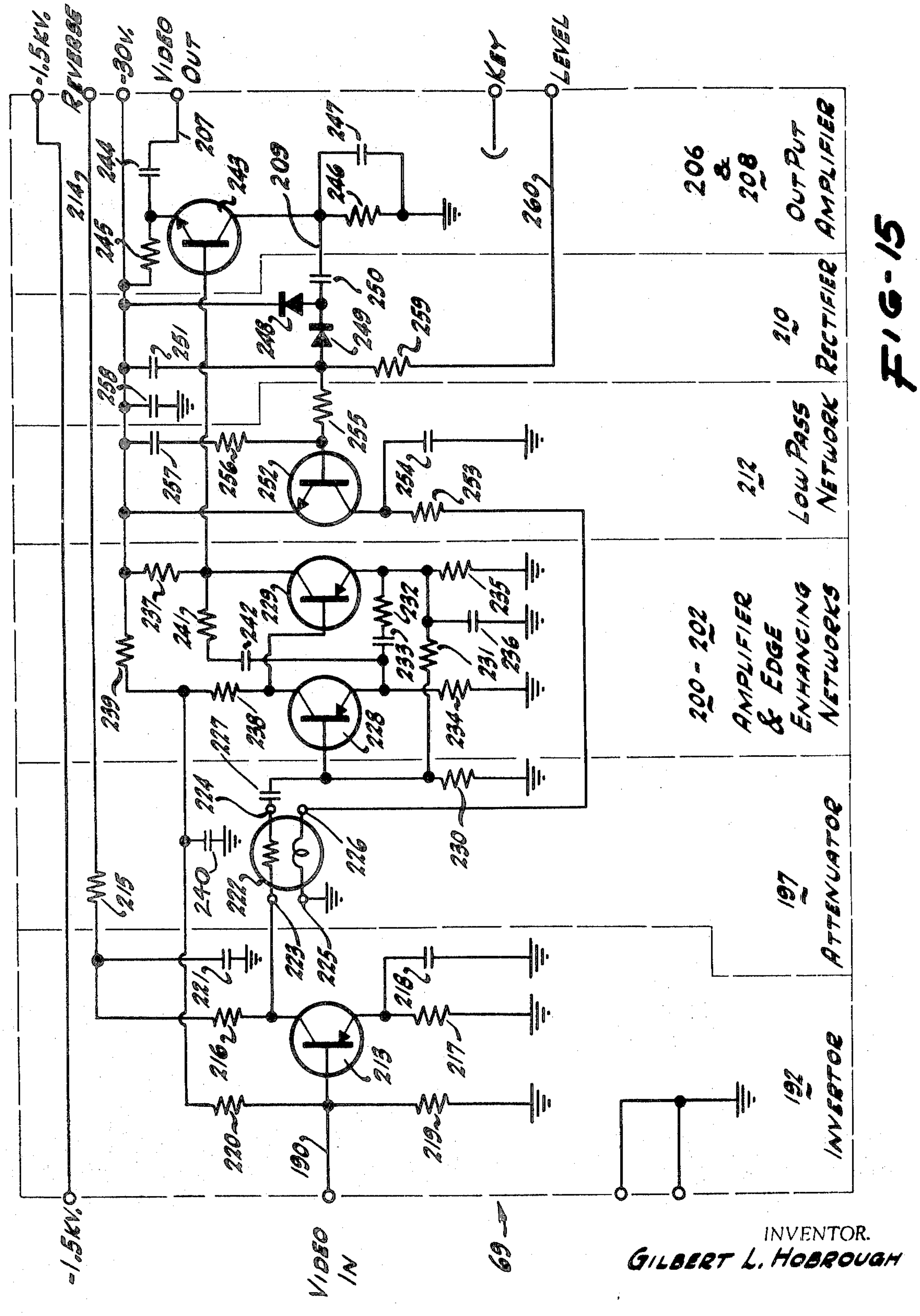
Figure 16:
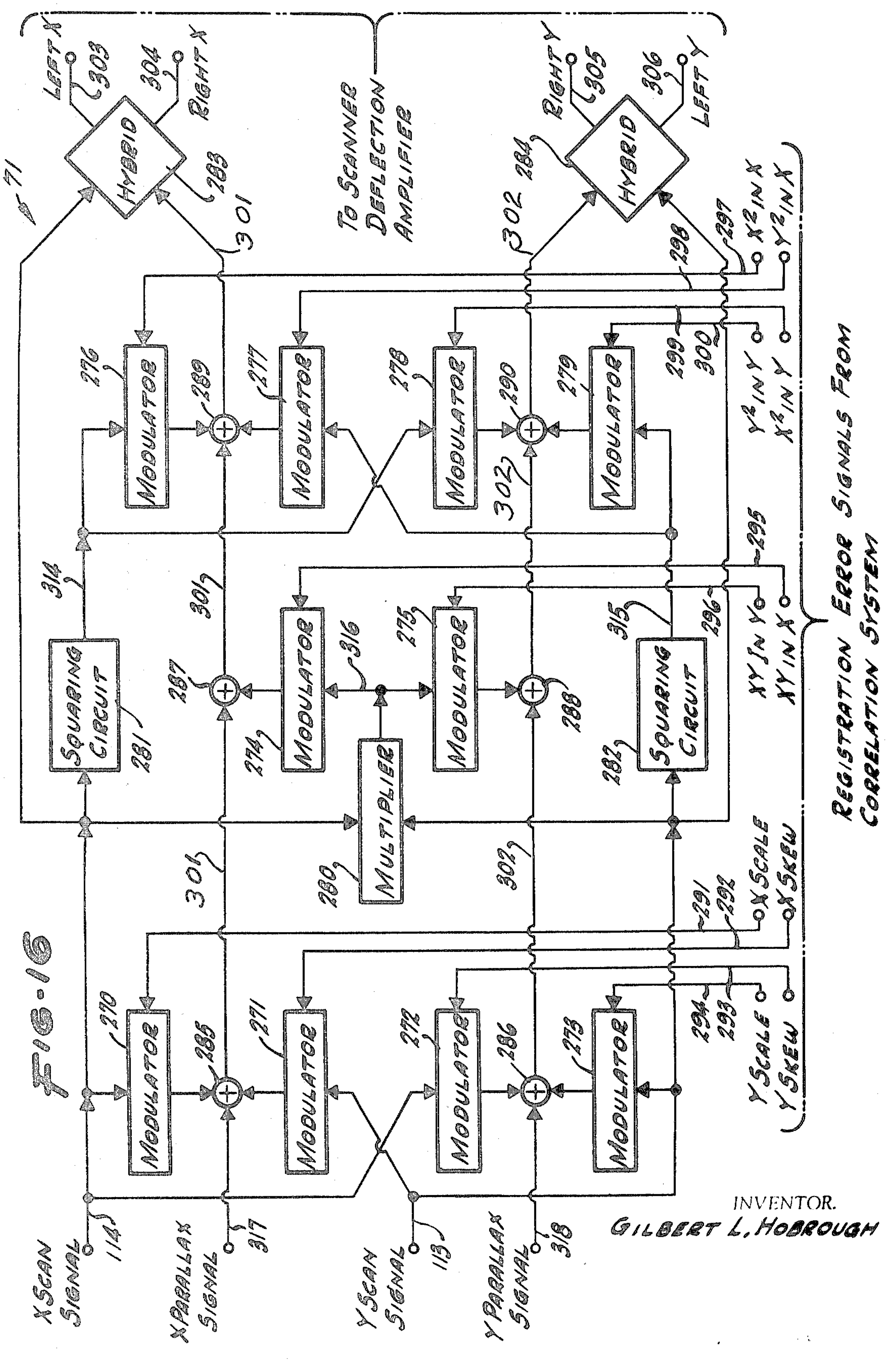
Figure 18:
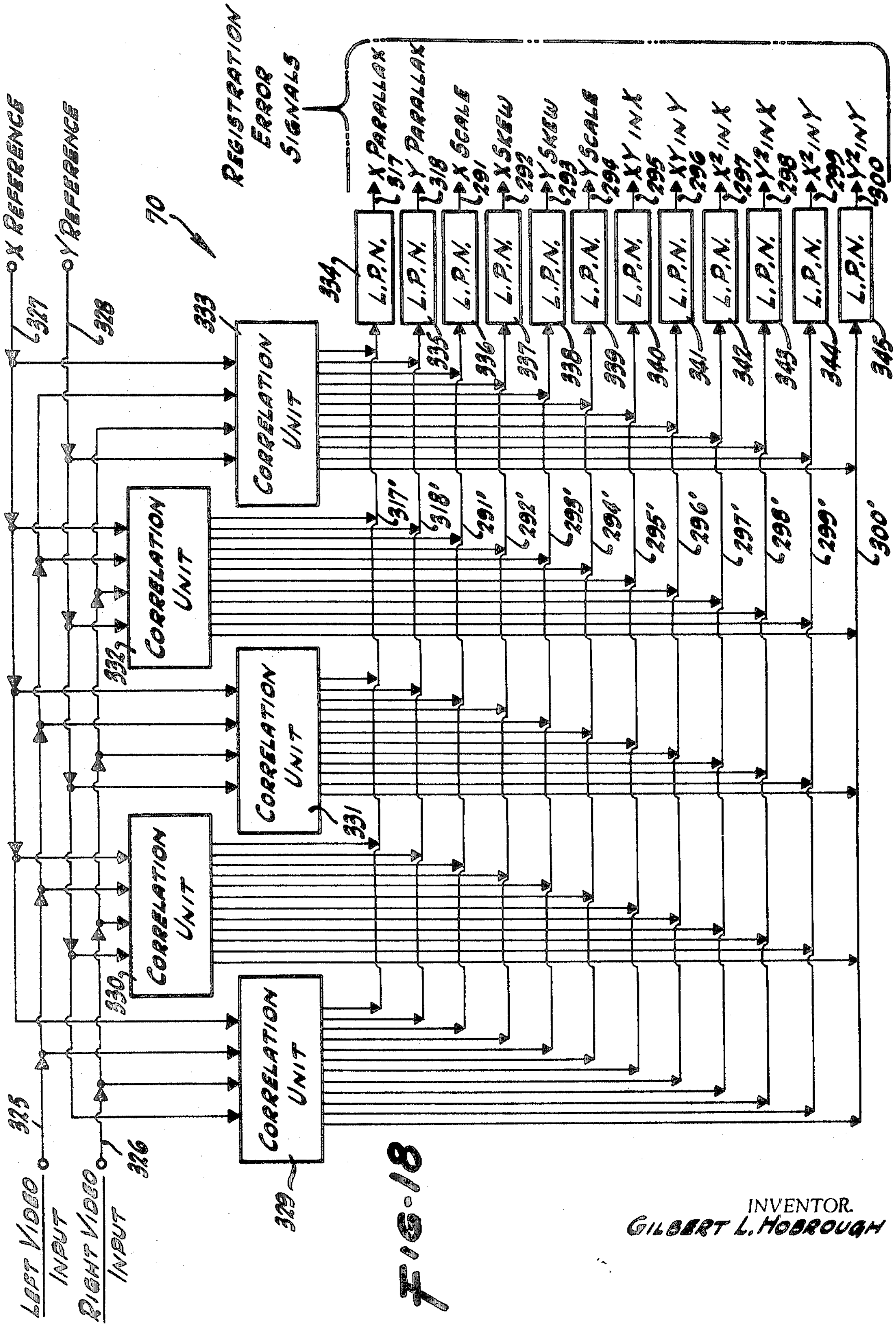
Figure 19:
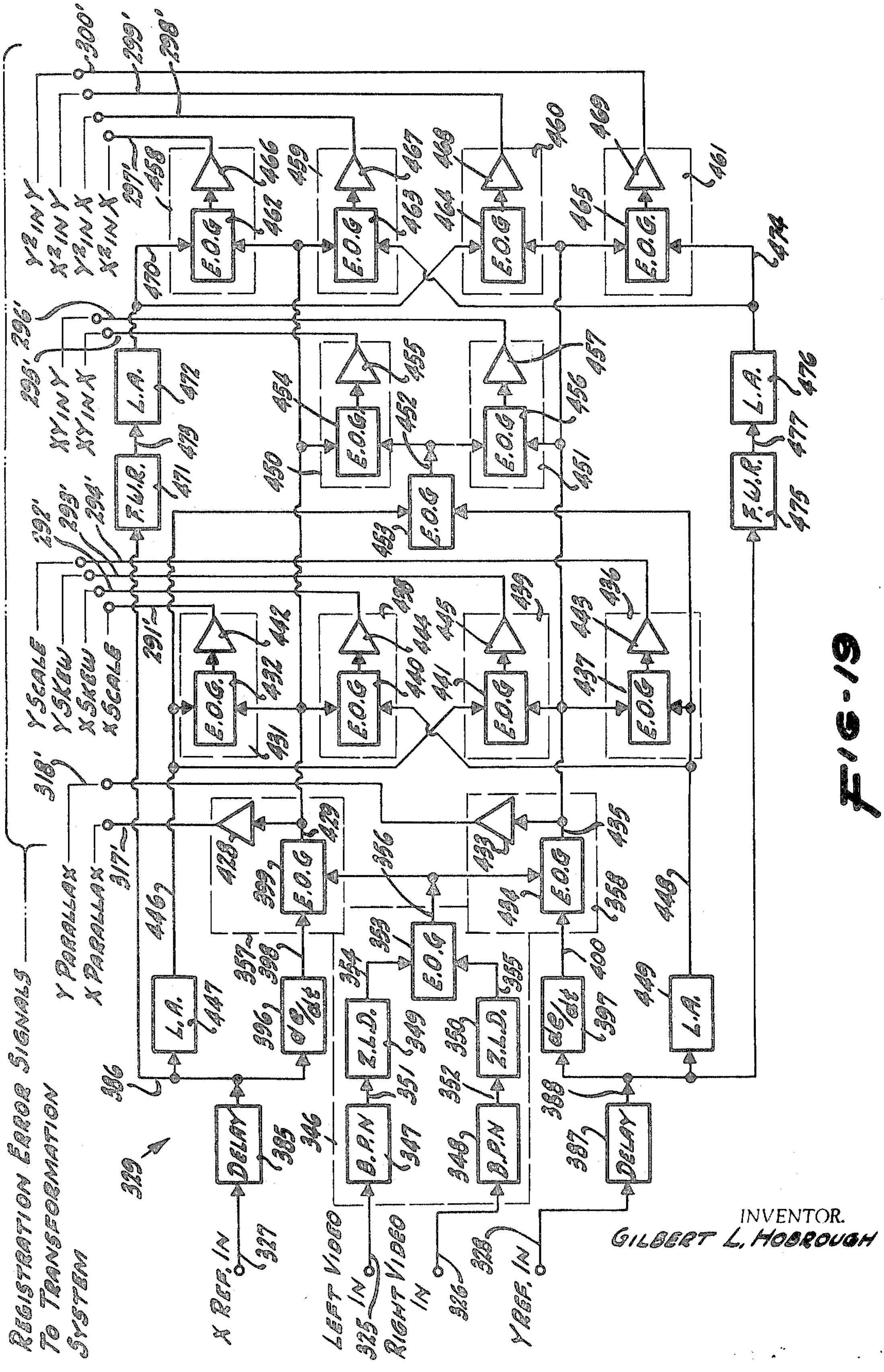
Figure 20:
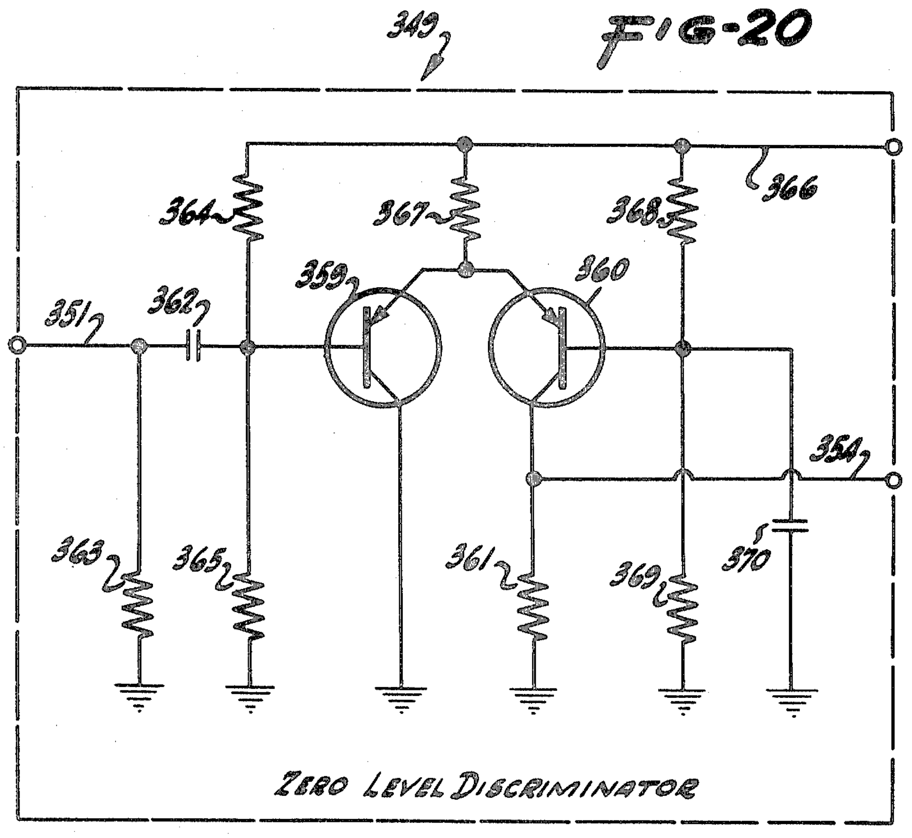
Figure 21:
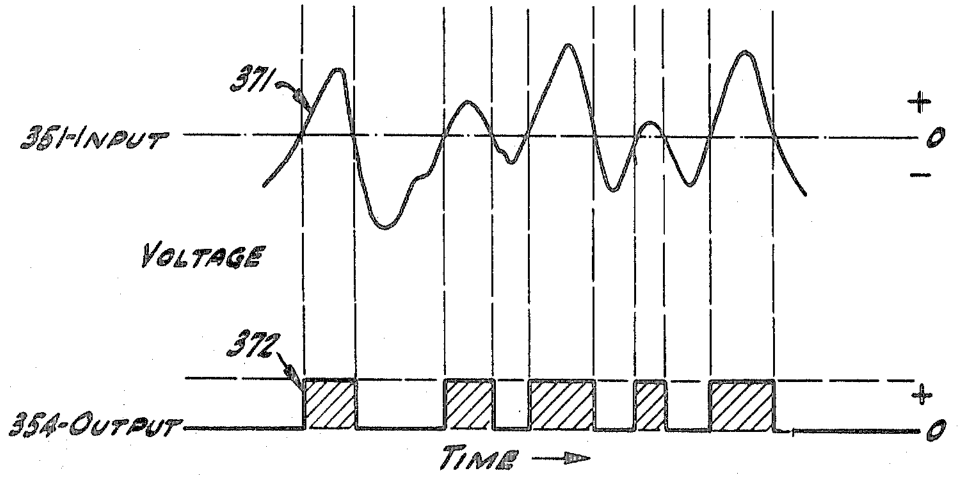
Figures 22, 23:
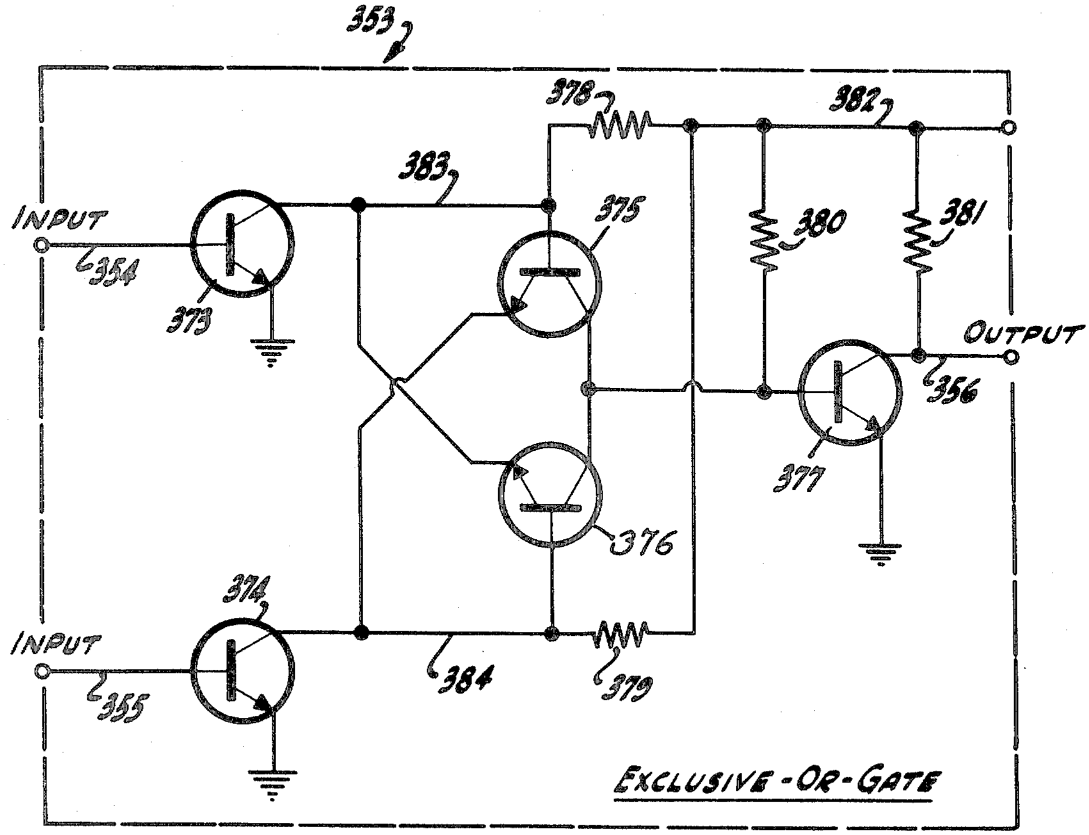
Figure 26:
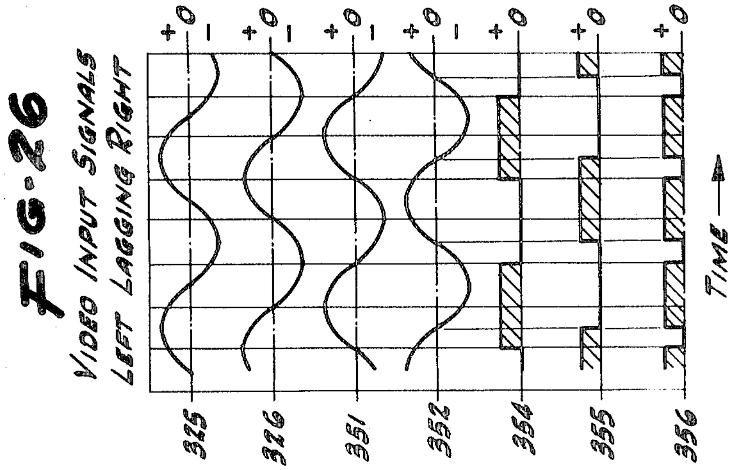
Figure 25:
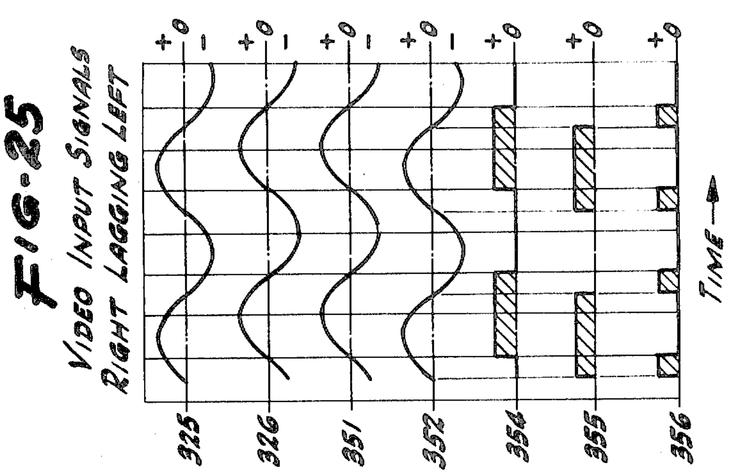
Figure 24:
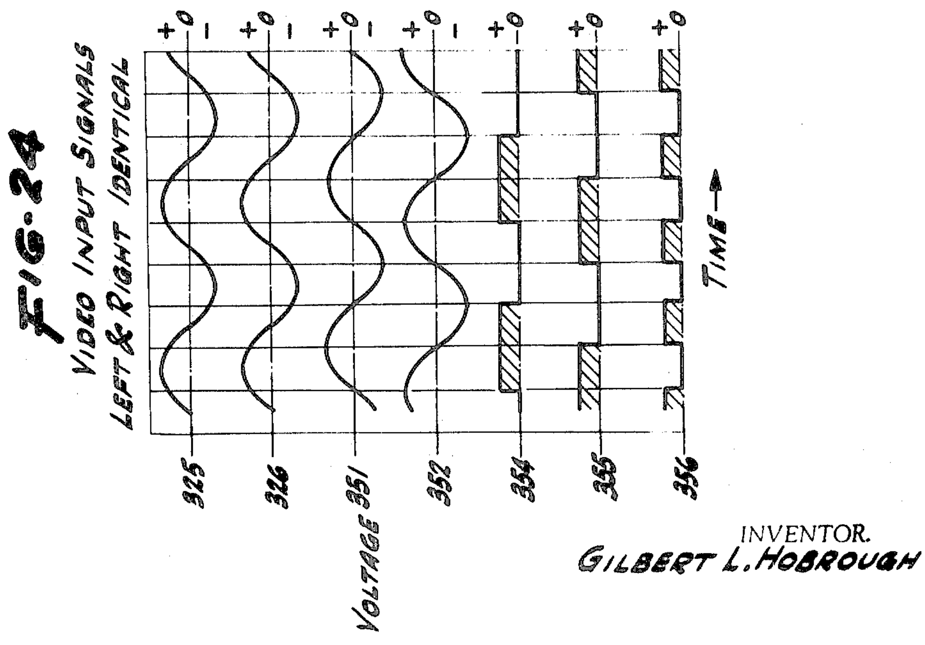
Figure 27:
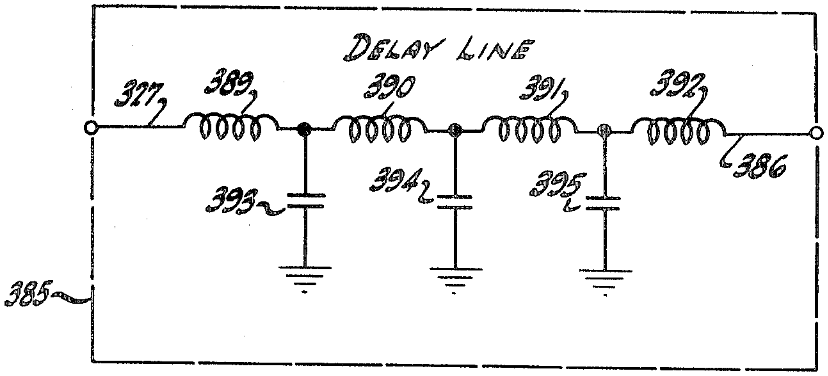
Figure 28:
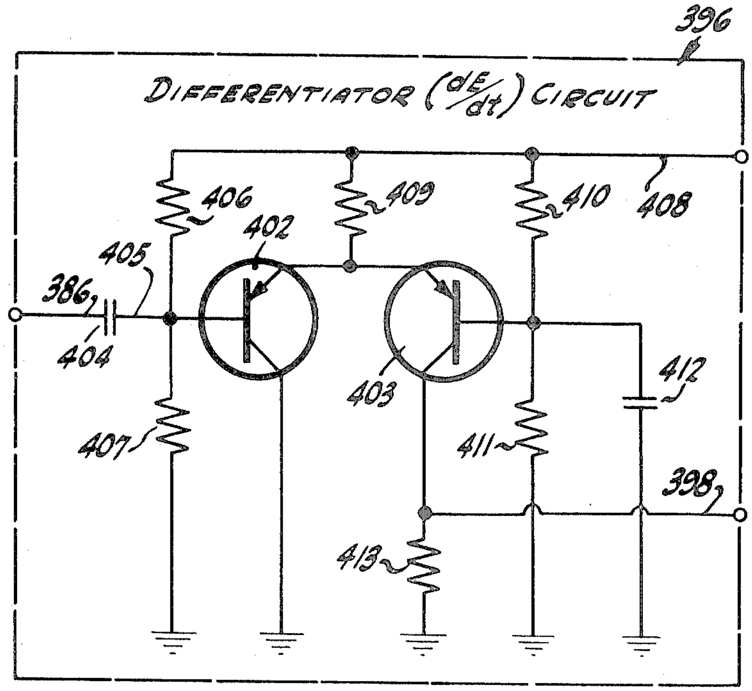
Figure 29:
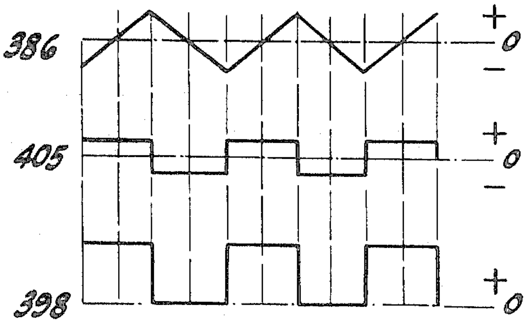
Figure 30:
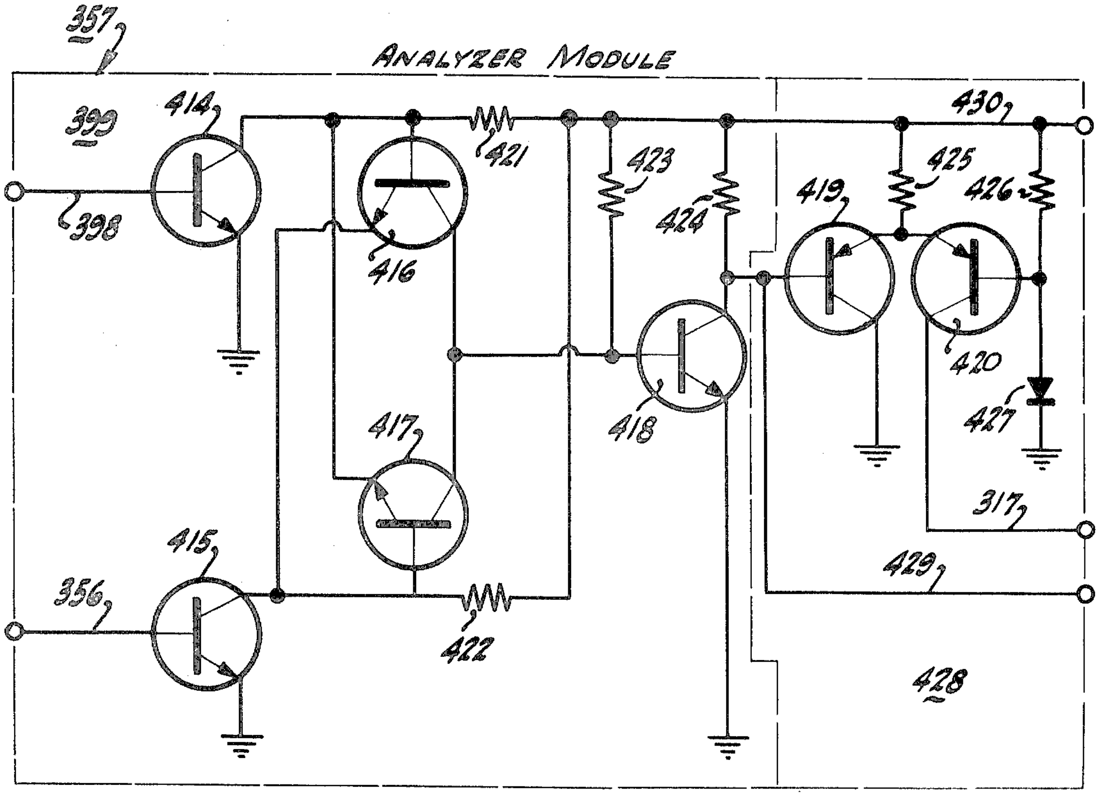
Figure 48:
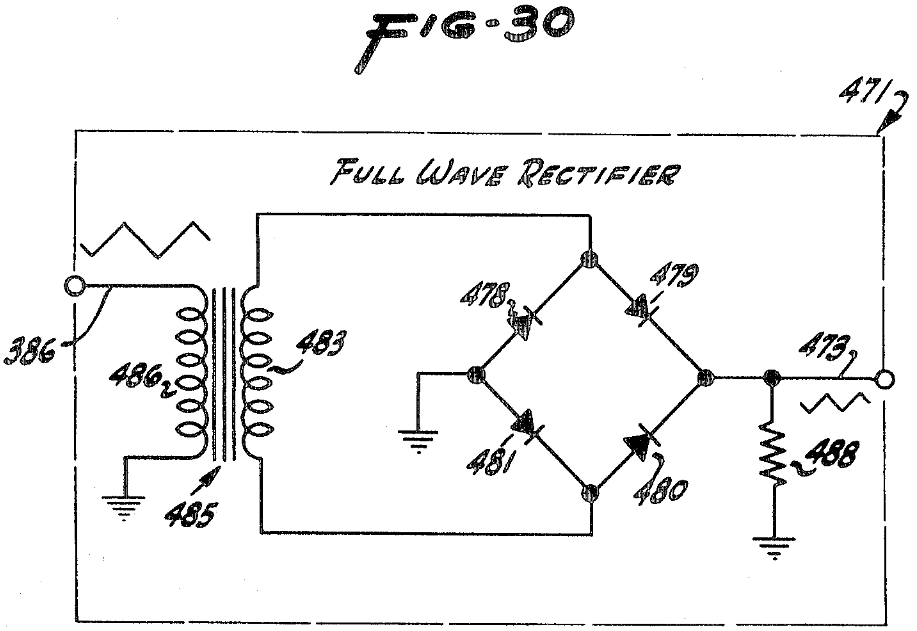
Figure 47:
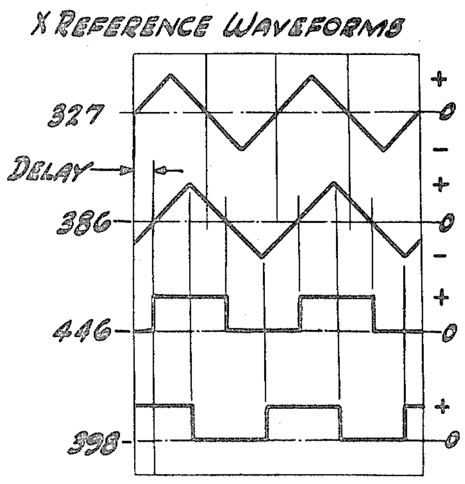
Figure 49:
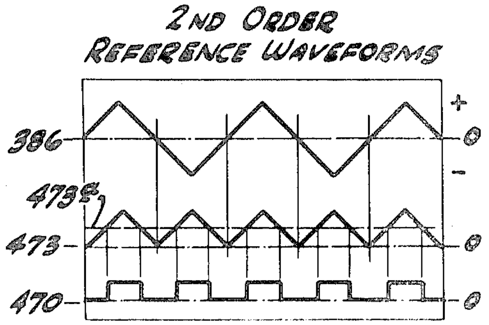
Figure 50:
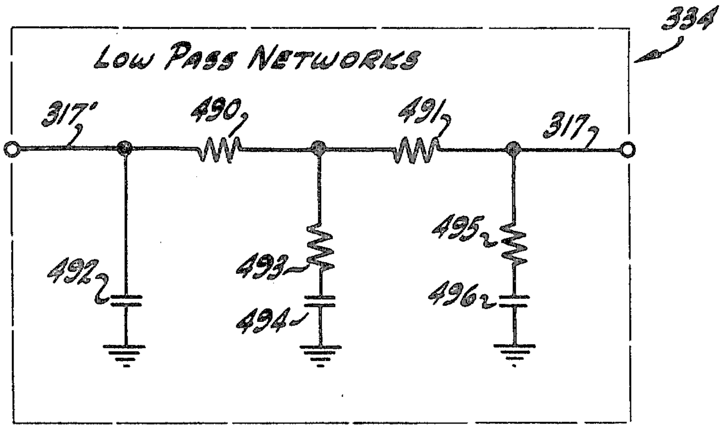

FIGS. 13*a* through 13*h* comprise a series of diagrammatic views respectively illustrating the orientation of the trace in relation to the progressive change in the phase relationship of the two time base signals derived from the raster generator network illustrated in FIG. 9;

FIG. 14 is a block diagram of one of the video processors;

FIG. 15 is a schematic circuit diagram of the video processor shown in fIG. 14;

FIG. 16 is a block diagram of the transformation system;

FIG. 17 is a block diagram of the hybrid circuit employed in the transformation system;

FIG. 18 is a block diagram of the correlation system;

FIG. 19 is a block diagram of one of the correlation units employed in the correlation system illustrated in FIG. 18;

FIG. 20 is a schematic circuit diagram of one of the zero level discriminators shown in FIG. 19;

FIG. 21 is a graph of the voltage waveforms of the input signal to and the output signal from the zero level discriminators of FIG. 20;

FIG. 22 is a schematic circuit diagram of each of the exclusive OR gates employed in the correlation unit illustrated in FIG. 19;

FIG. 23 is a chart showing the character of the output signal from the gate of FIG. 22 in relation to the character of the two input signals thereto;

FIGS. 24 through 26 respectively comprise a group of waveforms relating to the video module of the correlation unit shown in FIG, 19;

FIG. 27 is a schematic circuit diagram of a delay line;

FIG. 28 is a schematic circuit diagram of a differentiator circuit;

FIG. 29 is a graph illustrating waveforms applicable to the circuit of FIG. 28;

FIG. 30 is a schematic circuit diagram of one of the analyzer modules in the correlation unit;

FIGS. 31 through 46, inclusive, respectively comprise a group of graphs illustrating waveforms on various signal lines in the correlation unit of FIG. 19 relative to certain conditions of $x$ and $y$ parallax and with the scanning spot moving in various directions;

FIG. 47 is a graph illustrating a group of waveforms appearing on various signal lines in the correlation unit of FIG. 19;

FIG. 48 is a schematic circuit diagram of a full-wave rectifier;

FIG. 49 is a graph illustrating another group of waveforms appearing on various other signal lines in the correlation unit of FIG. 19;

FIG. 50 is a schematic circuit diagram of a low pass network; and

Figure 51:
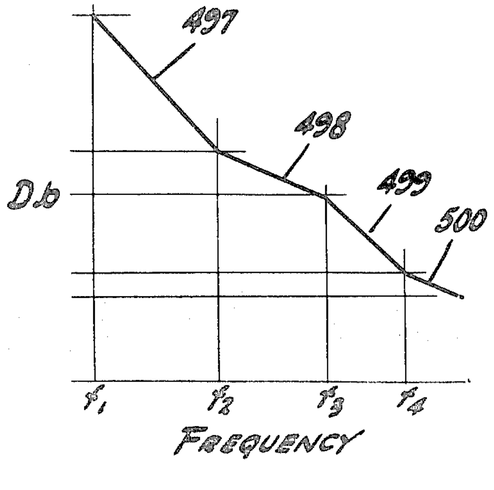

FIG. 51 is a chart depicting certain operational conditions relating to the network of FIG. 50.

GENERAL DESCRIPTION

In generally describing the apparatus, reference will be made in particular to FIGS. 2 and 3, and referring thereto, the console therein illustrated is designated in its entirety with the numeral 50. It comprises a lower casing or cabinet 51 defining therewithin a compartment 52 in which is located various of the circuit components to be described hereinafter. At its lower end, the casing 51 may be equipped with feet, pads, rollers, etc., adapted to engage a floor and support the console thereon. Adjacent its upper end, the casing 51 provides a mounting for a tabletop or platform 53 defining therealong a support system generally denoted 54 and a transport system generally designated 55. The transport system 55 includes a pair of frame or transport elements *56a* and *56b* respectively adapted to support thereon a pair of photographic transparencies *57a* and *57b* kforming a stereographic pair of photographs.

Figure 2:
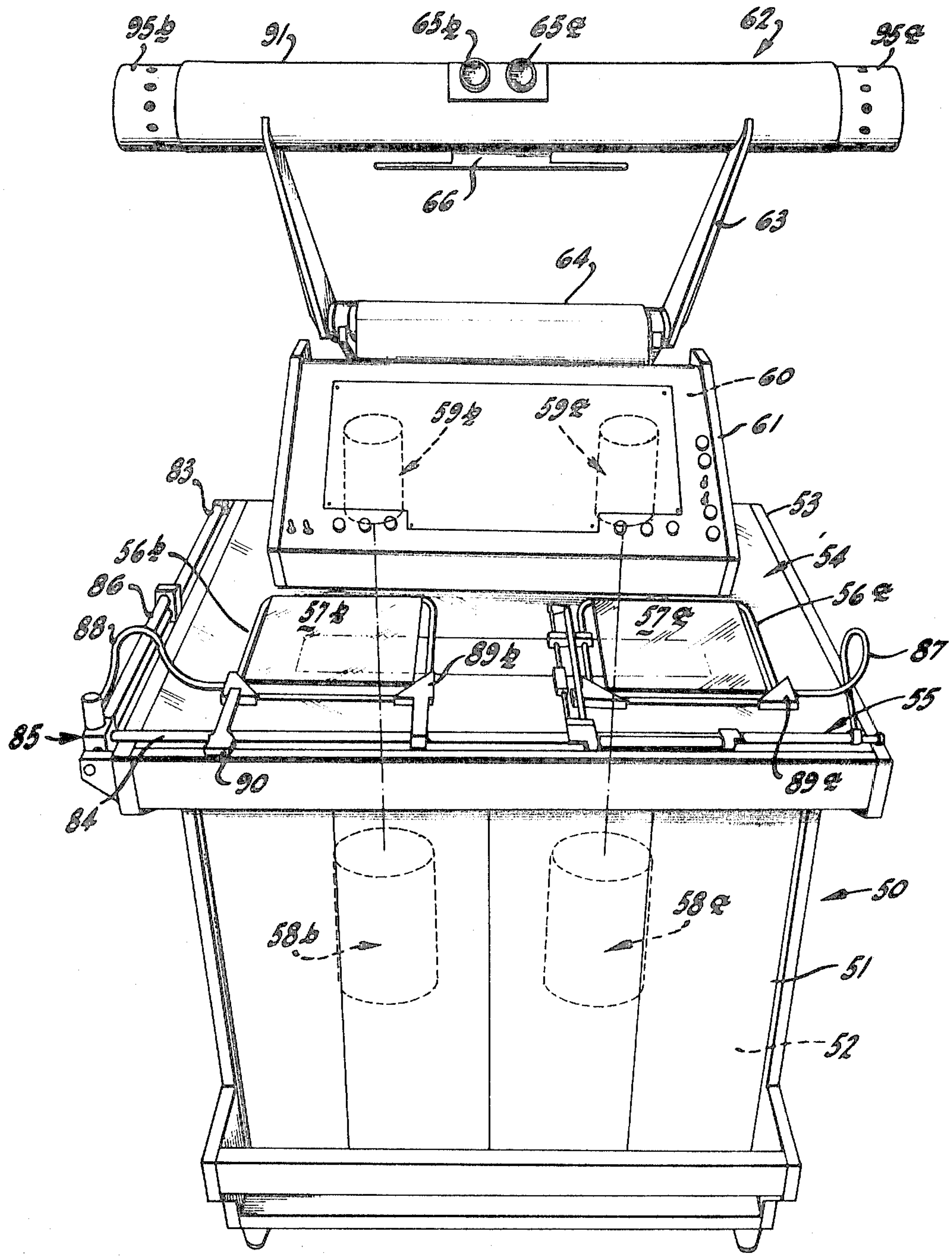
FIG. 2 is a perspective view of the console which houses or otherwise carries the various components of the instrument.

Mounted within the compartment 52 is the aforementioned scanning system which comprises a pair of substantially identical flying spot-scanning assemblies generally designated in FIG. 2 with the numerals *58a* and *58b*. The scanning assemblies *58a* and *58b* respectively associated with the photographic transparencies *57a* and *57b*, and the scanning beams of such assemblies are directed upwardly through such transparencies as diagrammatically indicated. The image-modulated light energy of such scanning beams is collected in a light collection system comprising a pair of photoelectric detectors generally indicated with the numerals *59a* and *59b*. These detectors are housed within a compartment 60 defined in part by a control panel 61 appropriately supported above the platform 53 in spaced relation therewith so that the transport elements 56 and their associated photographic transparencies 57 can be moved beneath the panel 61 and into the light beams transmitted from the flying spot scanning assemblies 58 to the photoelectric detectors 59 respectively associated therewith.

Located above the tabletop 53 in a binocular viewer 62 carried by bracket structure 63 swingable about a horizontal axis through a support 64 so that the elevation of the viewer can be readily adjusted to accommodate the height of any particular operator. The viewer includes a pair of eyepieces *65a* and *65b* adapted to be respectively aligned with the eyes of such operator who will view at any instant a stereographic model of the images areas then being scanned on the photographic transparencies *57a* and *57b*. A handle 66 may be provided to facilitate adjustment of the viewer, and suitable spring structure or other counterbalancing means (not shown) may be employed to maintain the viewer in any position of adjustment thereof.

Figure 3:
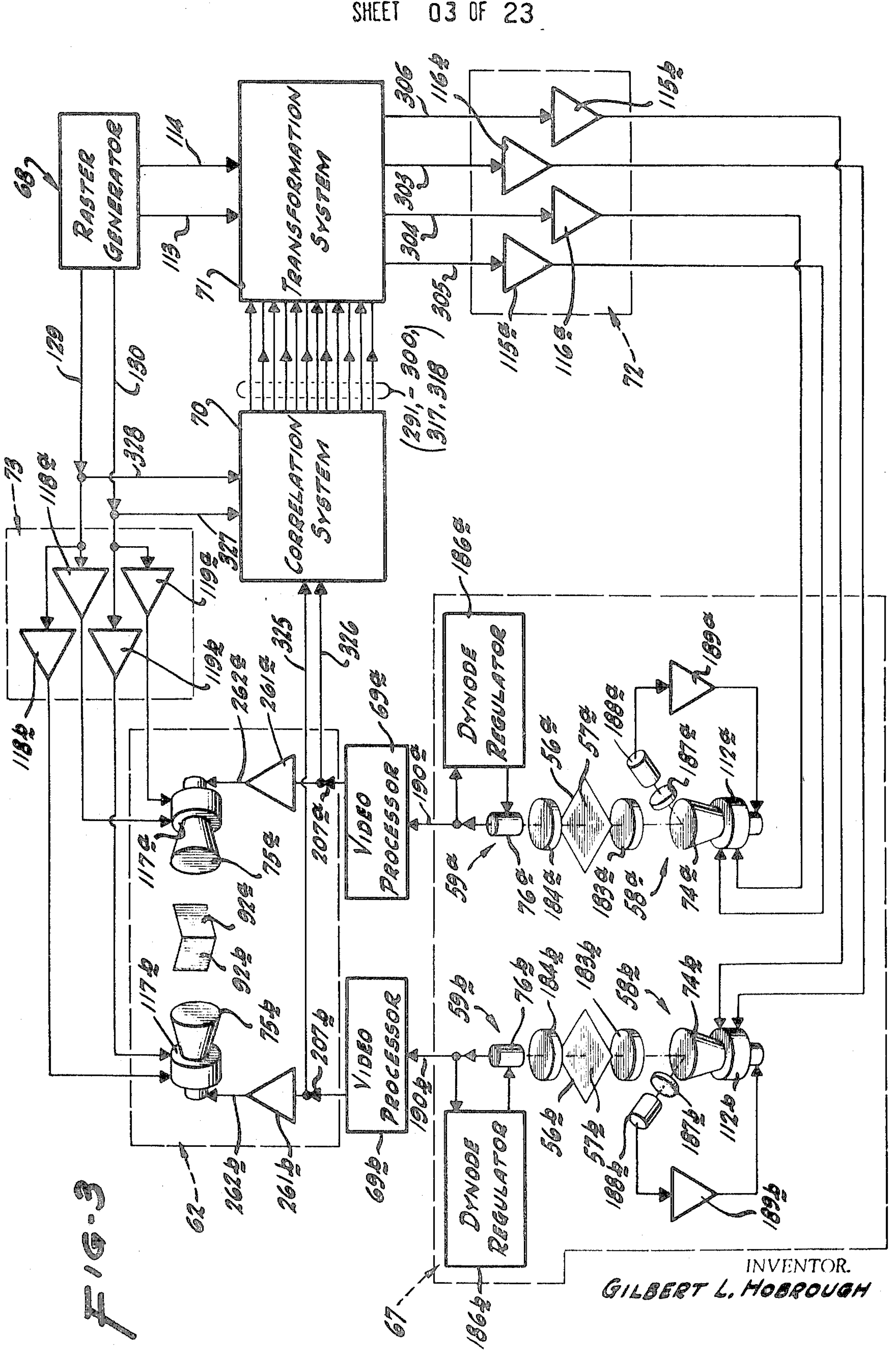
FIG. 3 is a general block diagram illustrating the functional interrelation of the main components of the apparatus.

In FIG. 3, the scanning system comprising the assemblies *58a* and *58b*, the light collection system comprising the detectors *59a* and *59b*, and the transport system comprising the frame elements *56a* and *56b* respectively carrying the photographic transparencies *57a* and *57b*, are grouped together into a block defined by broken lines and which in its entirety is designated with the numeral 67. The binocular viewing assembly is illustrated diagrammatically in the block denoted 62.

As indicated hereinbefore, such scanning and viewing components are operatively arranged in a circuit comprising a raster generator 68, a pair of video processors *69a* and *69b* respectively associated with the photoelectric detection networks *59a* and *59b*, a correlation system 70, a transformation system 71, and two groups of deflection amplifiers 72 and 73—the first of which is associated with the flying spot-scanning assemblies *58a* and *58b*, and the second of which is associated with the viewer assembly 62.

Quite evidently, each of the components generally designated in FIG. 3 necessarily comprises a plurality of subcomponents or units and will be considered in greater detail hereinafter. However, as part of the general description of the invention, the functional interrelationship of the components illustrated in FIG. 3 will be described briefly; and for such description, it will be of convenience to note that the scanning assemblies *58a* and *58b* respectively include scanning cathode-ray tubes *74a* and *74b*, that the viewing assembly 62 comprises a pair of viewing cathode-ray tubes *75a* and *75b*, and that the light collection system comprises multiplier phototubes *76a* and *76b*.

The stereo transparencies 57 are respectively positioned upon the support elements *56a* and *56b* which are dimensioned and configurated so as to fixedly constrain such transparencies. Usually, although not essentially, such transparencies will be glass diapositives. The transport system is air supported on the surface of the tabletop 53, and air is supplied to the transport system continuously by a small compressor (not shown). The air supplied to the transport system raises the support elements 56 about 20 microns above the surface of the tabletop and allows the whole assembly to transport freely in response to the slightest displacement force applied thereto.

The supply of actuating air to the transport system is under the influence of a manually controlled valve; and when the supply of energizing air is terminated, the transport immediately drops onto the surface of the platform and remains fixed for continued observation of the photographs. Thus, the operator can selectively shift various areas of the photographs *57a* and *57b* into the paths of the scanning beams transmitted from the scanning assemblies 58 to their respectively associated detector networks 59.

The raster generator 68 produces waveforms which, when amplified and applied to the deflection systems of the scanning cathode-ray tubes 74*a* and 74*b* and the viewing cathode-ray tubes 75*a* and 75*b*, produce the required scanning raster on the faces of such tubes. The correlation system 70 observes the video signals being transmitted through the video processors 69*a* and 69*b* to the viewing cathode-ray tubes 75*a* and 75*b*, and detects in such signals differences in timing between corresponding detail in the left and right channels of the apparatus. The correlation system 70 also receives reference signals from the raster generator 68, which reference signals from the raster generator 68, which reference signals indicate the scanning spot position in the *x* and *y* directions separately. From these four input signals (that is, left and right video signals and the reference or *x* and *y* spot coordinate signals), the correlation system 70 computes the direction of parallax errors and makes this information available in the form of error signals on lines 291–300 and 317–318.

Signals from the raster generator 68 when applied to the cathode-ray tubes 74 of the scanner and to the tubes 75 of the viewer produce a square-shaped scanning raster in each instance. The transformation system 71 develops signals which, when combined with the signals transmitted from the raster generator to the scanning cathode-ray tubes, modify the shape of the rasters on such scanner tubes. Since the raster on each of the viewer tubes remain square-shaped, the imagery as seen on such viewer tubes by the operator has transformations complementary to the change in the shape of the rasters of the flying spot scanner tubes 74*a* and 74*b*. The signals developed by the transformation system 71 are under the control of the respective transformation error signals from the correlation system 70.

If no registration error exists, then all error signals will be zero. Under these conditions, the rasters of the flying spot scanner tubes 74*a* and 74*b* remain square-shaped and there is no transformation of the imagery as seen by the operator. If, however, registration is incomplete, then one or more prime transformation error signals will be present, and a corresponding transformation will be generated by the system 71. These signals, then, when applied to the signals which otherwise would define a square-shaped raster will produce on the face of the flying spot scanner tubes a transformation of the type required to produce registration. As will be noted hereinafter, any such transformations will be applied to the left and right scanning rasters equally but in opposite senses.

The video signals being transmitted from the multiplier phototubes 76*a* and 76*b* to the respectively associated viewing cathode-ray tubes 75*a* and 75*b* pass through the video processors 69*a* and 69*b* which function to provide constant image contrast or tonal range. In this respect, each video processor includes an automatic gain control operative to adjust signal amplification in such a manner that the output video amplitude remains substantially constant in spite of variations in input amplitude owing to differences in local image contrast. In this way, the full range of the viewing cathode-ray tubes 75*a* and 75*b* from dark to light is utilized.

MECHANICAL COMPONENTS

The main mechanical components of the apparatus—apart from the lower cabinet 51 of the console, similar casing members and enclosures, and the usual structural support elements present in any piece of equipment—are the support and transport system and the binocular viewer. These mechanical components will now be described.

Support and Transport System

The support and transport system used in the particular instrument being considered herein has been disclosed in detail in the pending patent application of Gilbert L. Hobrough and George A wood, Ser. No. 313,882, filed Oct. 4, 1963, now U.S. Pat. No. 3,267,798 and reference may be made thereto if a detailed consideration of this component is desired. However, for convenience, a general description of the support and transport system will be included.

Accordingly, it may be noted that the photographic transparencies 57*a* and 57*b* are carried by the respectively associated frame or transport elements 56*a* and 56*b* for translational movements over a flat platform which serves as a reference plane for the scanning system; and if the electronic reproduction of the photographic images is to have a high order of fidelity and be useful, the transparencies must be positionally oriented within very close tolerances relative to the reference platform so as to be accurately held at the plane of focus of the scanning system. Therefore, the requirements for platform flatness and limitations on transport motion along the scanning axis (usually vertical) are quite restrictive.

Further, in the viewing system being considered, the photographic images usually will be inspected point by point, and it is necessary therefore that the transport system be susceptible of refined positional adjustments so that each point of interest in the photographic transparencies can be accurately oriented with respect to the scanning beams and corresponding points in the two photographic images brought into proper register in order that a useful stereoscopic image of any point of interest be provided. Consequently, the transport system is characterized by being freely and easily movable relative to the reference platform or tabletop, and it is also able to maintain readily any position into which it is moved so that any selected point of interest in the photographic images will remain properly aligned with the scanning beams.

In the present instrument, it has been found convenient to employ a glass platform or tabletop as the reference plane because the transparency of glass permits the scanning beams of the cathode-ray tubes to pass therethrough. However, it is practicably necessary to restrict the thickness of the glass platform to approximately one-quarter of an inch or less in order to avoid distortion in the scanning beams transmitted therethrough. Unfortunately, a plate of glass of such thickness is not sufficiently rigid to avoid sagging or deflection in the vertical direction (i.e., along the scanning axis), and the resultant distortion which would be introduced into the viewing system because of the accompanying displacements of the photographic transparencies from the focal plane of the scanning system would be intolerable. Furthermore, any random loads imposed upon such a thin glass platform would aggravate the deflection tendency thereof and further reduce the fidelity of the scanning and viewing systems.

The support system employed herein is effective to uniformly support the thin glass platform along substantially all incremental surface areas thereof so that any tendency of the platform to sag because of its lack of rigidity or because of random loads being imposed thereon is obviated. The support system additionally enables the platform to act as a weightless rigid member stably supported at three nonlinearly oriented points, and it also permits the platform to be leveled and enables the precise disposition of the plane defined thereby (that is, the reference plane) to be selectively adjusted and thereafter automatically maintained irrespective of changes in the external load applied to the plate whether distributed thereover or localized.

The transport system used herein provides excellent vertical stability and has a minimum inertia and also minimum frictional and stictional resistance to movement, and yet, irrespective of its freedom of translational movement, maintains itself readily in any position of adjustment.

Figure 4:
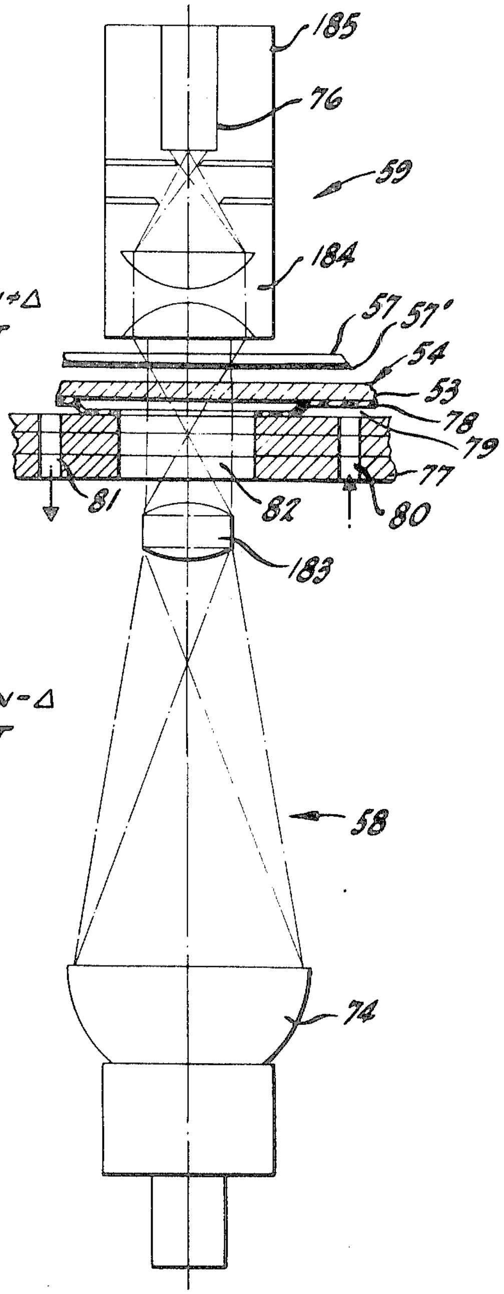
FIG. 4 is a diagrammatic view showing the functional interrelation of one of the flying spot scanners, the light collection system associated therewith, and a stereogram positioned upon the tabletop support therefore.

Referring to FIG. 4 in particular, the support system 54 includes the aforementioned tabletop or platform 53, which is formed of transparent material such as glass and permits the scanning beam of the scanning cathode-ray tube 74 to pass therethrough. It may be noted that the structural composition shown in FIG. 4 is equally applicable to both video channels; and, therefore, either to the scanning cathode-ray tube 74*a*, multiplier phototube 76*a* and transparency 57*a* or to the scanning cathode-ray tube 74*b*, multiplier phototube 76*b* and photographic transparency 57*b*. Consequently, in FIG. 4 the suffixes *a* and *b* have been omitted.

The tabletop 53 is supported with respect to a stable base 77 carried by the console 50 in generally horizontal disposition.

The base 77 is formed from a relatively rigid material which is substantially fluid impervious as, for example, wood or metal. Interposed between the upper surface of the base 77 and the superjacent tabletop 53 is a hermetic seal structure 78 of a character that permits movement of the tabletop 53 in directions generally normal to the plane thereof and relative to the base 77. The tabletop 53 is spaced from the upper surface of the base 77, and the base and tabletop, together with the seal structure 78, define a pressurizable chamber 79. The seal structure 78 comprises a flexible resilient membrane and may be formed of rubber, and it is sealingly secured to the base 77 at appropriate locations therealong to form such pressurizable chamber 79. In the actual structure, three independent pressurizable chambers are provided so that the tabletop 53 is supported with respect to the base 77 on three separate and independently regulated air cushions (i.e., any gaseous fluid).

Each of the pressurizable chambers 79 is provided both with an inlet 80 through which air under pressure is admitted thereto and with an outlet 81 through which air is permitted to escape. Since it is desired to accurately establish and thereafter maintain the position of the tabletop 53 such that the photographic transparencies 57 supported thereby are located at the plane of focus of the scanning system, the requirement is imposed that the tabletop 53 have a predetermined positional relation with respect to the base 77. Such positional relation is determined by regulating the relative rates of the supply of pressurized air to and the escape of air from each of the chambers 78. In the particular structure being considered, control over the relative rates of supply and escape of air to each of the chambers is maintained by automatically regulating the rate of escape of air through the outlets 81 by means of valve structure (not shown).

The base 77 has an opening 82 formed therethrough for each of the scanning systems so that the scanning beams from the cathode-ray tubes 74 can be transmitted through such openings, through the tabletop 53 and photographic transparencies 57 disposed thereabove and to the multiplier phototubes 76. Quite evidently, the member 78 is sealingly secured to the base 77 about each such opening 82.

Referring to FIG. 2, it is seen that the transport system 55 includes a track 83 and rail 84 forming a pair of axes defining the paths of movement of the system. In the structure shown, the track and rail are disposed at substantially right angles with respect to each other; and therefore, such axes defined thereby are rectangular coordinate axes in which the rail 94 establishes the *x* or longitudinal direction and the track 83, the *y* or transverse direction.

The track 83 is fixedly carried by the console or base 77, and the rail 84 is slidably related adjacent one end thereof to the track 83 so as to be movable therealong. The interconnection of the rail and track is established through antifriction sleeve or bearing structure (generally indicated at 85) that slidably engages the track 83 and is rigidly secured to the rail 84. A part of such bearing structure includes a hollow tube or rod 86 adapted to be connected to a compressor or other source (not shown) of pressurized air. The rail 84 is a hollow tube defining a flow pass therethrough in flow communication with the rod 86 which connects it with such source of air.

Slidably mounted upon the rail 84 are the frame elements 56*a* and 56*b*. Each of the frame elements is a hollow tubular condition defining a flow passage therethrough. The hollow frame 56*a* is supplied with compressed air from the hollow rail 84 through a flexible tube 87, and the frame 56*b* is supplied with compressed air from the hollow rod 86 through the fitting and associated flexible tube 88. The frame element 56*a* is provided therealong with a plurality of support pads 89*a*—*there being three in number in the specific structure shown. In an identical manner, the frame element 56b* is provided with a plurality of support pads 89*b;* and again, there are three in number. The support pads are each flow connected with the hollow interiors of the associated frame elements so as to be supplied with compressed air therethrough. The undersurface of each of the support pads is substantially planar and is provided therealong with fluid discharge means through which compressed air is expressed downwardly and against the upper surface of the tabletop 53.

Manually controlled valve means are included in the transport system so as to control the discharge of compressed air from the support pads 89. In the structure shown, such valve constitutes an opening or escape port provided in the handhold 90. When the opening is closed, as by an operator placing his finger thereover, compressed air is directed downwardly against the tabletop 53 through the various support pads 89 which elevates the pads and frame elements above the tabletop. The frame elements then are readily displaced in either or both the *x* and *y* directions. However, when the valve opening is uncovered, a sufficient quantity of air escapes therethrough to prevent the compressed air from elevating the frame elements. As a result, the frictional forces developed between the lower surfaces of the support pads 89 and the upper surface of the tabletop 53 effectively constrain the frame elements against translational displacements.

The track 83 and rail 84 define a rotation-constraining guidance system preventing the frame elements 56*a* and 56*b* (and more particularly, the stereo transparencies 57*a* and 57*b* respectively carried thereby) from exhibiting angular or rotational movements during translational displacements thereof. Additionally, the track and rail permit substantially uninhibited translational displacements in the sense that the frame elements can be moved into any desired position because of the permitted displacements thereof along the two coordinate axes respectively defined by the rail 84 (the *x*-axis) and the track 83 (the *y*-axis). Further, each of the frame elements 56 has a tip-tilt stability enforced thereon because of the plurality of support pads 89*a* and 89*b* respectively associated therewith which provided relatively independent corrective actions resulting in such stability.

Binocular Viewer

Figure 5:
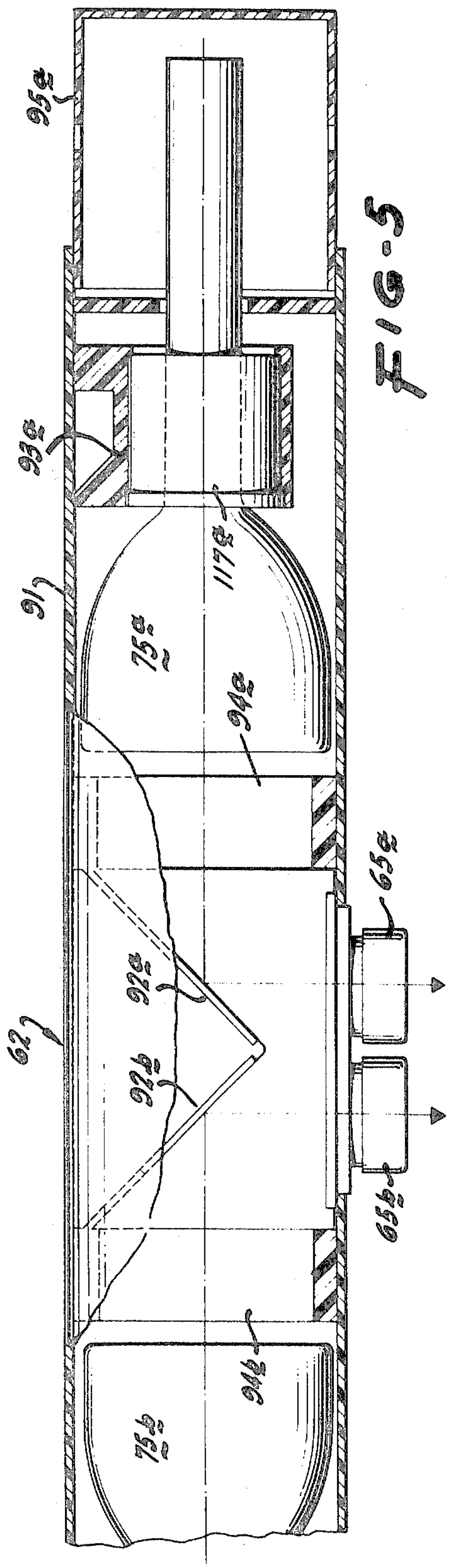
FIG. 5 is a broken longitudinal sectional view of a part of the binocular viewer.

The binocular viewer 62 is illustrated in FIGS. 2 and 5, and has for its purpose the provision of two separate images, respectively corresponding to the image areas being scanned at any instant on the photographic transparencies 57*a* and 57*b*, for selective viewing by the operator's right and left eyes through the eyepieces 65*a* and 65*b*. In the form shown, the viewer 62 comprises a hollow support tube 91 that in the usual case will be formed of an insulating material although this is not essential. The viewing cathode-ray tubes 75*a* and 75*b* are respectively mounted adjacent the outer end portions of the support tube 91 with the faces of the cathode-ray tubes direction inwardly. Interposed between the adjacent faces of the viewing cathode-ray tubes is a mirror structure comprising angularly disposed mirror sections 92*a* and 92*b*. The two sections 92*a* and 92*b* meet at an angle of substantially 90°, and such angle is located at substantially the midpoint of the eyepieces 65*a* and 65*b*. Such midpoint establishes the center of the binocular viewer which is symmetrical from right to left about a plane through such center.

Evidently, the images respectively appearing on the faces of the cathode-ray tubes 75*a* and 75*b* are respectively reflected by the mirror elements 92*a* and 92*b* through the associated eyepieces 65*a* and 65*b*. The mirror may be wholly conventional and, for example, can be a silvered-surface mirror. The eyepieces are respectively associated with lens systems—the requirement therefor being that the light collected by such lens be transmitted therethrough with substantially parallel rays so that no interpupillary adjustment of the eyepieces is required. In a typical system, the lens associated with each eyepiece may be a two-element acromat having a focal length in order of 220 millimeters.

Each of the cathode-ray tubes 75 is equipped with the usual deflection coil assembly or yoke and is centered with respect to the tube 91 by a support spider 93 that is coaxially circumjacent the deflection yoke and engages the inner surface of the tube 91 at angularly spaced locations therealong. An inner sleeve 94 defines an abutment or stop element limiting the maximum inward displacement of the associated tube. The neck of each cathode-ray tube extends through a transverse wall supported within the tube 91 adjacent the outer end thereof and into a removable end closure 95. The end closure is telescopically insertable into the associated end of the tube 91 and encloses the connector-equipped end portion of the cathode-ray tube (not shown in FIG. 5). Apertures may be located wherever desired to permit the circulation of air about the cathode-ray tubes and deflection coils thereof for cooling purposes.

Light from the scanning rasters and any images appearing on the respective faces of the cathode-ray tubes 75*a* and 75*b* is directed toward the associated mirrors 92*a* and 92*b* which change the direction of light transmission by 90° and transmit such rasters and images through the respectively associated eyepieces 65*a* and 65*b* for separate viewing by the right and left eyes of an operator. Thus, if the photographic transparencies providing such images constitute a pair of stereo transparencies, such operator will see a stereographic reproduction thereof, assuming the two images are properly oriented.

ELECTRONIC CIRCUITRY

The various electronic components heretofore mentioned and which in the main comprise the raster generator, scanning and light collection systems, video processors, transformation system, and correlation system, will now be described in order set forth.

Raster Generator

The desired scanning raster, as indicated hereinbefore, is susceptible to both manual and electronic viewing of a stereo pair of photographic images, and employs a dual-diagonal pattern comprising a plurality of interlaced fields defining one complete frame or scanning cycle (i.e., one entire scanning pattern which is then repeated). In a particular instance which has been found satisfactory, the scanning pattern defines a square-shaped raster having a frame repetition rate of 30 per second with each frame comprising an interlace of two fields. Each field is formed of substantially 205 lines to the diagonal or a total of 510 lines for a complete frame.

Such scanning pattern is illustrated in FIGS. 6 through 8 of which FIG. 6 denotes the path of movement of the traveling spot, FIG. 7 illustrates one complete field (with the number of lines reduced for clarity), and FIG. 8 depicts one complete frame comprising two interlaced fields. As indicated, each frame may comprise 510 lines in each orthogonal set of parallel lines, and the frame repetition rate may be 30 per second of the single interlace (i.e., two) fields, as shown in FIG. 8. The traveling or moving spot that develops the trace of the face of the cathode-ray tube is shown in enlarged form in FIGS. 6 and 7 and is designated for identification with the numeral 96. It is understood that the spot is developed in the conventional manner by a stream of electrons striking the coated inner face of a cathode-ray tube and, therefore, the entire area enclosed within the generally square-shaped boundaries of FIGS. 6, 7, and 8 may be taken to be a major portion of the face of such cathode-ray tube.

The spot 96 moves continuously in tracing an entire scanning pattern of one frame which comprises two interlaced fields. The general path of movement of the spot 96 is illustrated most clearly in FIG. 6 wherein it is seen that the spot changes direction by 90° as it reaches each marginal edge of the raster. Thus, the crossing orthogonal sets of parallel lines are developed in a progression which one line of a set is traced, the spot changes direction and the first line of a normally oriented second set is traced, the spot again changes direction and the first line of a set oppositely oriented to but parallel with the first set is then traced, again the spot changes direction and the first line of a set oppositely oriented to but parallel with the second set is then traced, and so forth. In FIG. 6, one pair of sets of parallel lines is indicated generally with the numeral 97 and the normally oriented pair of sets of parallel lines are designated generally with the numeral 98. The sets 97 as they are partially shown in FIG. 6, constitute four parallel lines which for identification are denoted as 97*a*, 97*b*, 97*c*, and 97*d*. Similarly, the sets 22 as illustrated in FIG. 6 comprises three parallel lines respectively denoted with the numerals 98*a*, 98*b*, and 98*c*.

The lines defining the orthogonal sets 97 are equally spaced from each other and, in an identical manner, the lines forming the sets 98 are equally spaced. This equality of spacing is also present in all of the parallel sets of lines forming one complete frame as shown in FIG. 8. The single field illustrated in FIG. 7 is designated in its entirety with the numeral 99, and in FIG. 8, the two fields forming the single frame 100 are respectively designated 99*a* and 99*b*.

A technique for producing the deflection waveforms requisite for the production of the desired interlaced dual-diagonal scan is illustrated in FIG. 9. This arrangement utilizes a relatively high-frequency oscillator and two counting circuits or channels for providing the two signals independently necessary for the deflection axes (hereinafter referred to for convenience as the *x* and *y* deflection axes). With this arrangement, the phase relationship between the *x* and *y* waveforms is rigidly controlled cycle by cycle so that the application of interlace techniques is quite feasible.

In order to achieve single interlace with a crossed-diagonal scan of square format, the two counting circuits must divide the oscillator frequency by consecutive odd numbers. With such an arrangement, the number of scanning lines across a picture diagonal will be equal to the division ratio of the counting circuits and the frame repetition rate of the pattern will be equal to the oscillator frequency divided by the square of the counting ratio. In the particular circuits illustrated, the division ratios are 509 and 511, thereby giving approximately 509 lines to one diagonal and 511 to the other. An oscillator frequency of 7.5 megacycles provides a frame repetition rate of approximately 30 cycles per second with single interlace.

The circuit embodiment shown in FIG. 9 includes a time base section 101 and a pair of shapers 102 and 103. The time base section 101 comprises an oscillator 104, the output of which is coupled to two dividing or counting circuits or channels respectively denoted in general with the numerals 105 and 106. The output of the dividing channel 105 feeds directly into a limiting amplifier 107 the output of which is delivered by a signal line 107' to the input of an integrator 108. Similarly, the dividing channel 106 feeds directly into a limiting amplifier 109 the output of which is delivered to an integrator 110.

The flying spot scanner tubes 74*a* and 74*b* are each equipped with an *x* and *y* deflection system depicted in FIG. 3 in the form of yokes 112*a* and 112*b*. The cathode-ray tubes and deflection systems thereof may be conventional, and such systems are provided with the required deflection waveforms through conventional deflection amplifiers generally denoted 72 in FIG. 3. The output terminals of the integrators 108 and 110 are respectively designated 113 and 114 in FIG. 9; and as shown in FIG. 3, the integrators feed the amplifiers 72 through the transformation system 71. It may be noted that the deflection amplifiers 72 comprise four in number, respectively identified as 115*a*, 115*b*, 116*a*, and 116*b*. For purposes hereof, it may be assumed that the output 113 of the integrator 108 is coupled to the *y* deflection amplifiers 115*a* and 115*b*, and that the output 114 of the integrator 110 is coupled to the *x* deflection amplifiers 116*a* and 116*b*.

The viewing cathode-ray tubes 75*a* and 75*b* are also each equipped with an *x* and *y* deflection system depicted in FIG. 3 in the form of yokes 117*a* and 117*b*. These viewing cathode-ray tubes and the deflection systems therefor may be conventional, and such systems are provided with the required deflection waveforms through conventional deflection amplifiers generally denoted 73 in FIG. 3. The deflection amplifiers 73 comprise four in number, respectively identified as 118*a*, 118*b*, 119*a*, and 119*b*. The deflection waveforms for the viewing system (i.e., the binocular viewer 62) are also provided by the raster generator comprising the time base 101 and shapers 102 and 103.

Although the same raster generator is used to energize the deflection systems of the viewing cathode-ray tubes 75*a* and 75*b* and the deflection systems of the scanning cathode-ray tubes 74*a* and 74*b*, it is necessary to introduce a time delay in the development of the scanning pattern for the viewing cathode-ray tubes 75*a* and 75*b* in order that the electronically produced images appearing on the faces of such viewing tubes be correlated in a time sense with the scanning of the photographic transparencies 57*a* and 57*b*. Accordingly, and referring to FIG. 9, the inputs to the limiting amplifiers 107 and 109 also respectively constitute the inputs to a pair of delay circuits 122 and 123 which form a part of the respectively associated shapers 102 and 103.

The shapers 102 and 103 also include limiting amplifiers 125 and 126–the inputs of which are respectively connected to the delay circuits 122 and 123, and the outputs of which are respectively connected to the integrators 127 and 128; in the case of the delay circuit 122 it is connected to the limiting amplifier 125 via a signal line 122′, and the amplifier is connected to the integrator 127 via a signal line 125′. The output terminals of the integrators 127 and 128 are respectively designated 129 and 130 in FIG. 9; and as shown in FIG. 3, the integrators feed the amplifiers 73. For purposes hereof, it may be assumed that the output 129 of the integrator 127 is coupled to the *y* deflection amplifiers 118*a* and 118*b*, and that the output 130 of the integrator 128 is coupled to the *x* deflection amplifiers 119*a* and 119*b*.

The limiting amplifiers 107, 109, 125, and 126 are all identical and are operative to provide at the respective outputs thereof a substantially square-shaped voltage waveform as indicated in FIG. 9. In a similar manner, the integrators 108, 110, 127, and 128 are all identical and function to provide an output voltage waveform of essentially triangular shape, also as indicated in FIG. 9. Further, the delay circuits 122 and 123 are identical and their function is to compensate for signal delays that occur in the video processors 69*a* and 69*b* so as to enable the video signal into the viewing cathode-ray tubes 75*a* and 75*b* to arrive in time coincidence with the corresponding points on the scanning waveforms being fed into the deflection amplifiers 73.

Figure 10:
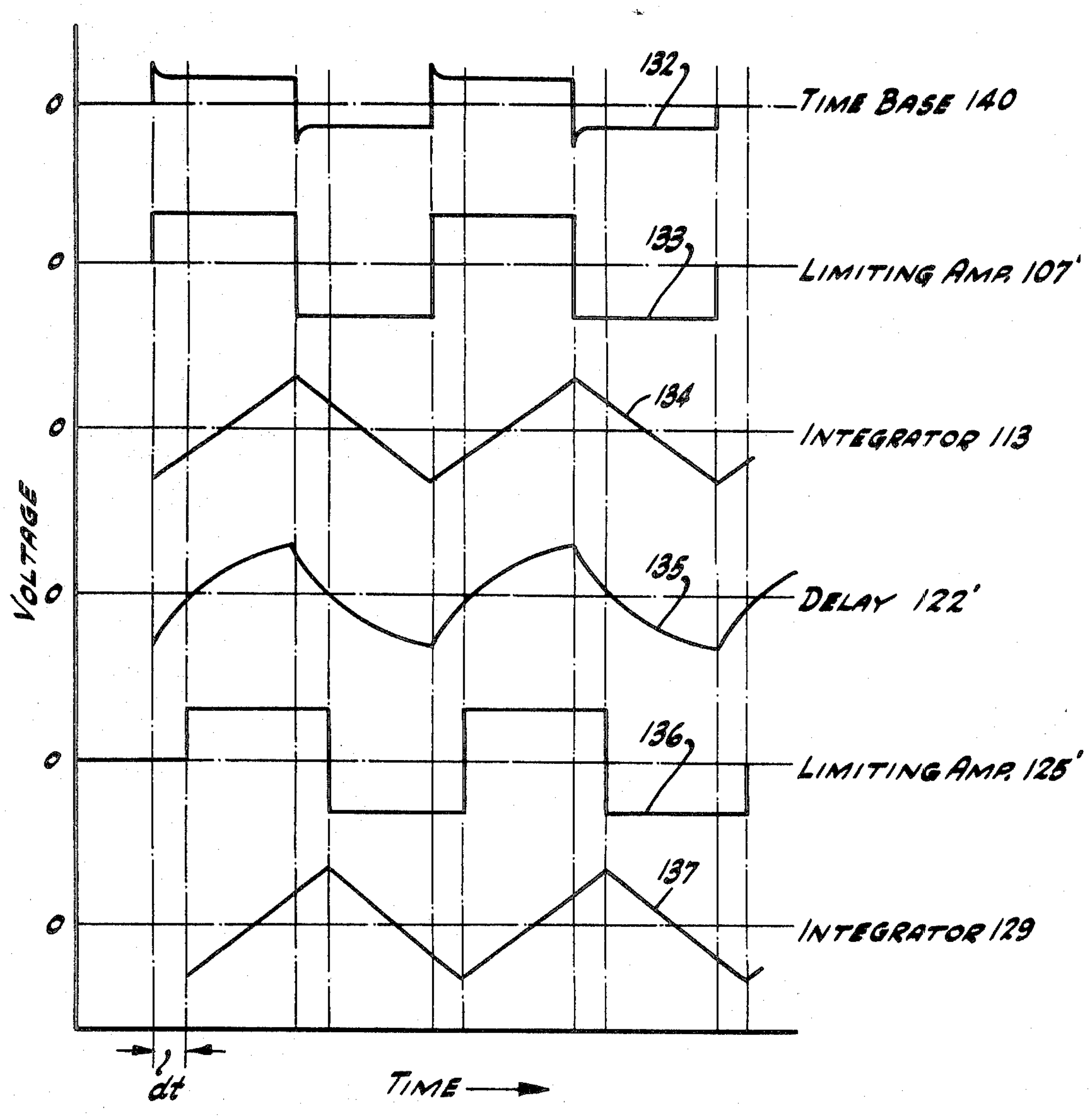
FIG. 10 is a graph showing a plurality of voltage waveforms plotted against time.

In this same connection, and referring to FIG. 10 in particular, the output voltage of one of the dividing channels, one of the limiting amplifiers and integrators of both the scanning and viewing systems, and also one of the delay circuits are plotted against time so as to depict not only the shape of the waveforms but also the interrelationship thereof in a time sense. Thus, in FIG. 10 the vertical axis of the graph represents voltages and the horizontal axis represents time. In this Figure, it is seen that the voltage waveform constituting one of the outputs of the time base unit 101 is generally square-shaped and alternates about a zero-voltage axis between positive and negative half-cycles. For identification, the voltage waveform is designated with the numeral 132 and may constitute the voltage output of either of the counting channels 105 or 106; but for purposes of positive selection, it may be assumed that the waveform 132 is the output of the counting channel 105. Accordingly, and for convenience of reference, the output signal lines and the components from which they extend are indicated in FIG. 10 in association with the appropriate waveforms.

Such output signal is fed to the limiting amplifier 107 which amplifier will cut off the signal at a predetermined level so that the magnitude of the voltage output does not exceed a predetermined value irrespective of the magnitude of the input voltage. Thus, the voltage output of the limiting amplifier 107 may have the general shape and magnitude relative to the waveform 132 shown in FIG. 10. This output voltage waveform is designated with the numeral 133, and is seen to be essentially in time coincidence with the waveform 132. The integrator 108 is operative to provide a triangularly shaped waveform 134 which is also in time coincidence with the waveforms 132 and 133.

The input to the limiting amplifier 107 also provides the input of the delay circuit 122. The output waveform of the delay circuit is shown in FIG. 10 and is denoted with the numeral 135. Such waveform 135 is a significant distortion of the input waveform 133 thereto and as a consequence, the output voltage waveform of the delay circuit must be limited and reshaped before it can be usefully employed. As a result, such output voltage waveform is fed into the limiting amplifier 125 which provides an output voltage waveform 136 substantially identical to the output voltage waveform 133 of the limiting amplifier 107 except that the waveform is delayed slightly—the amount of such delay being represented in FIG. 10 by the interval *dt*.

The voltage waveform 136, time delayed with respect to the voltage waveform 133, is fed to the integrator 127 which provides an output voltage waveform 137 of triangular shape which is substantially identical to the triangularly shaped output waveform 134 of the integrator 108 except that it is delayed in time with respect thereto by the amount *dt*. Thus, the two voltage waveforms fed to the deflection amplifiers from the respective terminals 113 and 129 are substantially identical in shape and in magnitude, but the waveform at the output terminal 129 is slightly delayed with respect to the waveform at the output terminal 113 by the amount *dt* which is selected to correspond to the delay developed in the video processor as between the input signal thereto and the output signal therefrom.

Precisely, the same relationship exists with respect to the channel comprising the elements 106, 109, and 110 and by the channel comprising the elements 106, 123, 126, and 128. Consequently, the triangularly shaped waveform constituting the voltage output waveform of the integrator 128 is substantially the same in both shape and magnitude as the voltage output waveform of the integrator 110 but is delayed in time with respect thereto by the amount *dt*.

Any suitable countdown or frequency-dividing circuitry may be employed in the time base 101. In the specific arrangement being considered, such circuitry will in one channel divide the oscillator frequency of 7.5 megacycles by the number 509; and in the other channel, it will divide such oscillator frequency by the number 511. In a typical arrangement, the oscillator 104 may be a conventional crystal oscillator and the counting channels 105 and 106 may each comprise a plurality of flip-flops or bistable multivibrator stages coupled to each other. Flip-flop units which may be used are commercially available, and an example thereof are the units sold by the Motorola Company of Chicago, Ill. under part number Mc 308. An exemplary consideration of a circuit grouping for such flip-flops is found in pages 323–330 of a text entitled "Pulse and Digital Circuits" by Millman and Taub, published in 1956 by the McGraw-Hill Company. Another example is disclosed in the patent to Gilbert L. Hobrough, U.S. Pat. No. 3,429,990, issued Feb. 25, 1969 which is entitled "Scanning Raster and Generator Therefor," and reference may be made to said patent for a discussion of such circuit and the details thereof.

Figure 11:
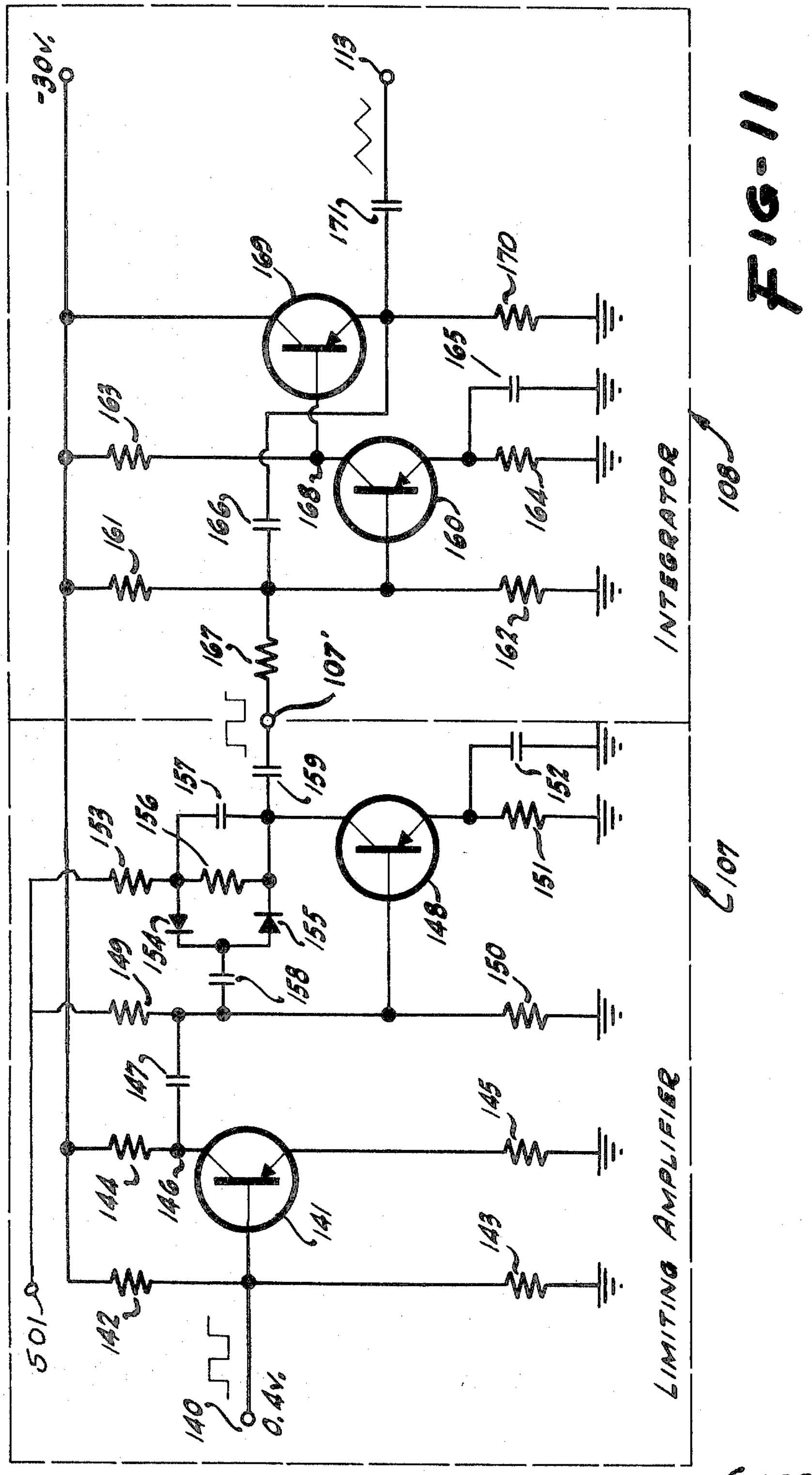
FIG. 11 is a schematic circuit diagram of a shaper illustrated in block form in FIG. 9.

For purposes hereof, the limiting amplifier, integrator and delay circuits used in the shapers 102 and 103 may be conventional individually. However, it will facilitate the present disclosure if the details of a typical limiting amplifier, integrator and delay circuits are set forth herein. Accordingly, and as stated heretofore, the limiting amplifiers 107, 109, 125, and 126 are all substantially identical as are the integrators 108, 110, 127, and 128. One such limiting amplifier and integrator combination is illustrated in FIG. 11 and will now be described.

The generally square-shaped voltage waveform 132 (shown in FIG. 10) which constitutes the output of either of the time base counting channels 105 or 106 is applied to the input terminal 140 of the associated limiting amplifier, 107, for example. Such amplifier essentially comprises two stages of amplification, the first of which is defined by the transistor 141 and associated resistances 142, 143, 144, and 145. The resistance 142 connects the base of the transistor to the negative side of a —30 volt DC power supply, the resistance 143 connects the base of the transistor to ground, the collector of the transistor is connected to the negative side of such power supply through the resistance 144, and the emitter of the transistor is grounded through resistance 145. The input terminal 140 is connected to the base of the transistor, and the generally square-shaped voltage waveform applied to such terminal appears as a current waveform at the point 146 (the collector of the transistor) and constitutes an amplified replica of the input waveform.

A capacitance 147 connected to such point 146 couples the first amplification stage to the subsequent limiting amplifier stage which is effective to modify the waveform of the signal appearing at the point 146. The second stage also includes an amplifier comprising a transistor 148, a resistance 149 connecting the base of the transistor to a negative control voltage on a line connected to the terminal 501, a resistance 150 connecting such base to ground, a resistance 151 connecting the emitter of the transistor to ground, a capacitance 152 in shunt connection with the resistance 151, and resistances 153 and 156 adapted to connect the collector of the transistor to the negative voltage line (terminal 501). These elements together comprise an amplifier which would be operative to provide an amplified replica at the output terminal 107' of the waveform appearing at the base of the transistor 148.

However, the circuit also includes a pair of diodes 154 and 155 which are directly connected anode-to-cathode at one of their ends, and the other ends thereof are connected together through resistance 156. A capacitance 157 is connected in shunt with the resistance 156, and one side of such capacitance is connected to the collector of the transistor 148. The opposite side of the capacitance is connected to the resistance 153. A capacitance 158 connects the juncture of the resistance 148 and 150 and capacitance 147 (i.e., the base of the transistor 148) with the juncture of the diodes 154 and 155. A coupling capacitance 159 connects the collector of the transistor with the terminal 107' and serves to provide DC isolation between the transistor 148 and the subsequent integrator circuit.

The diode network comprising the diodes 154 and 155, and the capacitances 157 and 158 constitute a feedback circuit effective to reduce the amplitude of the voltage at the base of the transistor 148 to a lower value than would be the case in the absence of such diode network. The diodes 154 and 155 are back biased by the voltage developed across the resistance 156 and smoothing capacitance 157 in shunt therewith, and such voltage is determined by the collector current of the transistor 148 which flows through the DC circuit defined by the resistances 156 and 153. Since the diodes are back biased by this voltage, they normally present a high impedance and, therefore, isolate the collector circuit of the transistor 148 from the input or base circuit thereof.

However, when the magnitude of the output voltage waveform at point 107' exceeds the value of the back bias across either of the diodes 154 or 155, such diode begins to conduct current which effectively connects the collector of the transistor 148 directly to the base thereof with the result that the amplification of the transistor stage is reduced substantially to zero. In the particular circuit arrangement described, the diode 154 is adapted to become conductive on positive-going output voltage swings and the diode 155 is adapted to become conductive on negative-going voltage swings.

Clearly the amplitude of the limited signal appearing on the line 107', as shown in the FIG. 10 waveform 133, depends upon the value of the back bias developed by the resistance 156 and, therefore, upon the collector current of the transistor 148 which flows therethrough. FIG. 10 shows resistances 149 and 153 being connected to an external control line 501 which corresponds to the line 501 illustrated in FIG. 9. Such control line is connected to the external —30 volt power supply through a potentiometer operative to reduce the applied —30 volts to a lesser value. The potentiometer is under the manual control of an operator, and it supplies a control signal to the limiting amplifiers 107 and 109, which control signal may have any value from zero to —30 volts depending upon the setting of the potentiometer. The potentiometer constitutes a "zoom" control and effectively reduces the size of the rasters on the scanning tubes **74*a* and 74*b* in response to the desires of the operator, thereby altering the effective magnification of the images as seen on the viewing tubes 75*a* and 75*b***.

Specifically, a reduction in the potential on the line 501 from its maximum possible value of —30 volts, representing the supply potential, reduces correspondingly the current flow through the resistance 156 and therefore the back bias on the diodes 154 and 155. Since the amplitude of the limited signal 133 (FIG. 10) on the line 107' is determined by such back bias, therefore the amplitude of the signal 133 will be reduced accordingly as will the amplitude of all signal subsequently derived therefrom, and including finally the deflection signals applied to the deflection yokes 112 of the flying spot scanner cathode-ray tubes 74.

The corresponding reduction in raster size on the scanner tubes 74 increases the effective magnification of the system since the viewing tube rasters have not been reduced in size and display thereon the entire reduced image area covered by the scanning raster.

As shown in FIG. 9, the limiting amplifiers 125 and 126 do not receive the control signal from the line 501; and, consequently, the resistance in the amplifiers 125 and 126 respectively corresponding to the resistances 149 and 153 in the amplifier 107 as shown in FIG. 11, are connected directly to the —30 volt supply line, to provide a maximum signal amplitude at all times.

The capacitance 158 is provided in series with the diode network to block the flow of DC current between the collector and the base circuits of the transistor 148. In that DC current cannot flow through the capacitance 158, the charge conducted by the diode 154 during positive cycles must be precisely equal to the charge transferred by the diode 155 during negative half-cycles. This action results in a symmetrical waveform having equal positive and negative excursions from zero.

The resistance 151 and capacitance 152 bypassing the same serve to bias the base to emitter junction of the transistor 148. Similarly, the resistance 145 serves to bias the input junction of the transistor 141 but is not bypassed so that this first transistor stage provides essentially a constant current generator for the subsequent limiting amplifier stage.

The output voltage waveform of the limiting amplifier 107 has a substantially square-shaped configuration as shown most clearly in FIG. 10 by the waveform 133. This voltage waveform which is coupled to the terminal 107' by the capacitance 159, is the input signal to the integrator 108. The integrator comprises an amplifier stage which includes a transistor 160, resistances 161, 162, 163, and 164, and capacitances 165 and 166. The voltage waveform appearing at the terminal 107' is connected to the base of the transistor 160 through a resistance 167, and the transistor develops an amplified replica of such input voltage waveform at the collector thereof which, in FIG. 11, is denoted by the point 168.

The integrator circuit further comprises an emitter-follower amplifier which includes a transistor 169 and a resistance 170 connected in the emitter circuit thereof. The emitter-follower amplifier is operative to produce a current amplification of the input signal appearing at the point 168 and, therefore, provides an amplified replica of such input signal at the output terminal 113 but at a lower impedance level. The output of the transistor 169 is connected to the input of the transistor 160 by the coupling capacitance 166 and the output of the transistor 169 is connected to the terminal 113 by the coupling capacitance 171 which serves to provide DC isolation between the output of the transistor 169 and the input of the subsequent circuitry connected to the terminal 113. The output voltage waveform appearing at the terminal 113 is triangular-shaped and constitutes the waveform 134 illustrated in FIG. 10.

The action of the integrator 108 in producing an integrated waveform at the output terminal 113 from the input voltage waveform at the terminal 107′ is best understood if the amplification or gain of the transistors 160 and 169 is considered to be extremely high. Under these conditions, the voltage waveform appearing at the base of the transistor 160 constitutes the input waveform and will be negligibly small. In specific terms, the voltage waveform at the base of the transistor 160 will be equivalent to the output voltage waveform at the terminal 113 divided by the voltage gain of the transistors 160 and 169. Assuming an amplifier voltage gain in the order of 100, the amplitude of the waveform at the base of the transistor 160 will be approximately 1 percent of the amplitude of the waveform at the output terminal 113 and, therefore, can be considered negligible for present purposes.

Since the signal level at the base of the transistor 160 is negligibly small, the value of the current flow through the resistance 167 will be essentially equal to the value of the input voltage divided by the value of the resistance 167. In that the resistance 167 and capacitance 166 are connected in series, and because the signal at the midpoint between the resistance and capacitance (that is, at the base of the transistor 160) is negligibly small, the value of the currents flowing through the resistance 167 and through the capacitance 166 are essentially equal. Also, since the magnitude of the signal at such midpoint or base of the transistor 160 is negligibly small, the value of the output voltage at the terminal 113 is essentially equal to the voltage developed across the capacitance 166 by virtue of such input current through it.

In that the input voltage at the terminal 107′ has a substantially square-shaped waveform, the waveform of the current flow through the resistance 167 will be substantially square-shaped. Further, the current flow through the capacitance 166 being essentially equal to the current flow through the resistance 167, such flow of current through the capacitance will also be essentially a square-shaped waveform. Because the current flow through the capacitance 166 has a square-shaped waveform, the voltage across the capacitance 166 will have substantially constant positive and negative slopes respectively corresponding to the positive and negative current values through the capacitance. Since the current flow through the capacitance 166 defines the output waveform, the circuit 108 has therefore performed the required integrating function.

As indicated hereinbefore, time delays are inherent in video amplification and other video processing; and, therefore, again considering the circuit arrangement illustrated in FIG. 3, the video signals arriving at the intensity electrode of the viewing cathode-ray tube 75*a* and 75*b* will not arrive in time coincidence with the corresponding scan voltage waveforms applied thereto unless special provision is made to assure such time coincidence. The consequence of any such delay or time difference in the arrival of the video signal and the scan voltage waveforms is that the image points appear on the face of a viewing tube 75 will be displaced from their proper position, and such displacement will result in the presentation of four separate images respectively corresponding to the four directions of scan, each displaced from its proper location by the same distance.

Such undesirable displacement can be obviated by introducing a delay in the time of arrival at each viewing cathode-ray tube 75 of the scanning waveforms relative to the application to each scanning cathode-ray tube 74 of the scanning waveforms therefor. The delay must be made equal to the delay that occurs in each video processor 69 so that the video signal delivered to the intensity electrode of each viewing cathode-ray tube 75 will arrive in time coincidence with the corresponding points on the scanning waveforms applied to the deflection system of such viewing tube. In FIG. 9 such time delay is provided by the delay means 122 and 123, which may be identical.

Figure 12:
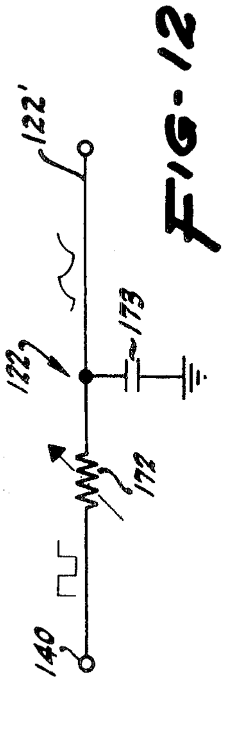
FIG. 12 is a schematic circuit diagram of a delay circuit used in the shapers shown in FIG. 9.

A typical delay circuit comprising the means 122 and 123 is shown in FIG. 12, and includes a resistance 172 and capacitance 173. The resistance is connected in series between the input terminal 140 (considering the delay means 122) to the delay circuit and the input to the following limiter-amplifier stage which, in the particular illustration, is the limiting amplifier 125. The capacitance 173 is connected between the output side of the resistance and ground. The resistance 172 is made variable, and thereby serves to afford adjustment of the amount of delay introduced by the circuit. In a typical instance, the delay interval *dt* may be in the order of about 0.15 microseconds.

As shown best in FIG. 10, the circuit 122 in addition to providing the desirable delay in the transmission therethrough of the applied square-shaped waveform 133 introduces an undesirable rounding of the leading edges of such waveform, as shown by the waveform 135. It is necessary, therefore, that an additional limiting amplifier be used after the delay circuit to reestablish the square-shaped waveform and this is accomplished by inclusion of the limiting amplifiers 125 and 126 in the circuit arrangement of FIG. 9. Evidently, by proper adjustment of each delay circuit, for example, by means of the variable resistance 172 shown in FIG. 12 for delay circuit 122, the scanning-voltage waveforms and the video signals are made to arrive at the associated viewing cathode-ray tube in time coincidence.

Referring to FIG. 9, the time base circuit 101 together with the shapes 102 and 103 provide two triangular waveforms at the outputs of the integrators 108 and 110 that differ by a small but precise frequency. These waveforms when applied to a conventional cathode-ray tube deflection system produce a square-shaped raster with diagonal line scanning. The small but precise frequency difference between the two triangular waveforms is maintained at a constant value by virtue of the precise frequency division that occurs in each of the channels 105 and 106; and by utilizing adjacent or successive odd numbers in the frequency division, a single (i.e., two fields per frame) interlace of the scanning lines is obtained.

The position and direction of the trace at any instant depends upon the momentary phase relationship of the two time base signals respectively applied to the deflection system of the cathode-ray tube. As brought out hereinbefore, the two time base signals are voltage waveforms of triangular shape, as shown at 134 in FIG. 10 considering the scanning cathode-ray tubes 74, and as shown at 137 considering the viewing cathode-ray tubes 75. Various phase relationships and the respectively corresponding orientation of the trace on the face of the cathode ray tube are shown in FIGS. 13*a* through 13*b*, to which reference will now be made.

In this group of figures, the two associated voltage waveforms are illustratively depicted in various phase relationships in the graphs that comprise a part of each of FIGS. 13*a* through 13*b*, and which are correspondingly designated 174*a* through 174*b*. Each of the graphs 174 is divided into equal increments by a plurality of vertical lines, the spacings between which represent 45° in terms of the phase relationship between the two waveforms. For purposes of identification in each of the graphs 174, the upper triangularly shaped waveform is designated 134*x* and the lower triangularly shaped waveform is designated 134*y*. By comparing the waveform 134*y* in each of the graphs 174*a* through 174*h*, it will be noted that it occupies the same position in each graph and alternates between positive and negative half-cycles about a reference axis.

Similarly, the waveform 134*x* alternates between positive and negative half-cycles about a reference axis, but the phase thereof is continuously changing relative to the waveform 134*y*. In graph 174*a*, the instantaneous phase relationship of the triangularly shaped voltage waveforms 134*x* and 134*y* is one of coincidence, and the spot is moving in one direction or the other to trace the path 175 which is diagonally oriented an extends from the lower left-hand corner to the upper right-hand corner of the raster. The alternate directions of movement of the spot in tracing the path 175 are indicated by the oppositely facing arrows therealong.

At the instant that the phase relationship has changed to one in which the waveform 134*x* leads the waveform 134*y* by 45°, the path then being traced by the moving spot is designated in FIG. 13*b* with the numeral 176, and progresses in the direction indicated by the arrows. Subsequently, the phase relationship between the waveforms 134*x* and 134*y* is one in which the waveform 134*x* leads by 90°, as shown in FIG. 13*c*. The corresponding path traced by the moving spot is denoted 177 in this figure, and develops in the direction of the arrows positioned therealong. At yet a subsequent time at which the waveform 134*x* leads the waveform 134*y* by 135° as illustrated in FIG. 13*d*, the corresponding path 178 being traced by the spot has the illustrated orientation in such Figure and the spot is moving in the direction of the arrows.

At the time that the waveform 134*x* has shifted to a position in which it leads the waveform 134*y* by 180°, the path then being traced by the moving spot has a straightline configuration, as shown at 179 in FIG. 13*e*, and extends from the upper left-hand to the lower right-hand corner of the raster pattern. The precise direction of movement can be in either direction, as indicated by the arrows. At the time that the waveform 134*x* leads the waveform 134*y* by 225°, as shown in FIG. 13*f*, the path described by the spot has the illustrated orientation and is designated with the numeral 180. The direction of movement of the trace is as indicated by the arrows along such path. It should be noted that the orientation of the paths 178 and 180 are substantially the same except that the direction of movement of the scanning spot is opposite as between these two paths. In that the paths are substantially coincident, will be evident that each spot along such path will be traversed twice by the scanning spot, once in each direction.

FIG. 13*g* illustrates the case in which the waveform 134*x* leads the waveform 134*y* by 270°, and the corresponding path then traversed by the moving spot is designated with the numeral 181 and the direction of movement of the spot is indicated by the arrows therealong. By comparing FIG. 13*g* with FIG. 13*c*, it is seen that the described paths 177 and 181 are substantially coincident but that the direction in which the spot is moving to trace the path 181 is opposite to its direction in tracing the path 177. At the time that the waveform 134*x* is leading the waveform 134*y* by 315°, the path 182 then being traced by the spot has the orientation illustrated in FIG. 13*h*, and the direction of movement of the spot is shown by the arrows. A comparison of FIG. 13*h* with FIG. 13*b* indicates that the paths 176 and 182 are substantially coincident, and that the spot is moving in opposite directions in describing these two paths. Thus, any point along such paths is traversed twice but in opposite directions by the spot in tracing the two paths 176 and 182. Clearly then, ad taking the case of a point that lies on the paths 176 and 182, and also lies along the paths 178 and 180, such point will be traversed four times by the spot—twice in opposite directions along one orthogonal axis and twice in opposite directions along the other orthogonal axis. Considering all of the various paths traversed by the spot in defining the dual-diagonal scanning raster, every image point lying within such raster is traversed four times in opposite directions along each pair of orthogonal axes.

At the time that the waveform 134*x* leads the waveform 134*y* by 360°, , the condition illustrated in FIG. 13*a* is again assumed, and one entire field 99 (FIG. 7) has been completed and the next successive field will be an interlace therewith to define the frame 100 shown in FIG. 8. The entire cycle of operation will then be repeated.

Scanning and Light Collection Systems

To a great extent, the essential features of the scanning and light collection systems have been described hereinbefore, at least as concerns the essence of the automatic registration instrument being considered herein. That is to say, the scanning system comprising the flying spot cathode-ray tubes 74*a* and 74*b* simply transmits scanning light beams toward photosensitive devices, such as the multiplier phototubes 76*a* and 76*b*, and the light reaching such tubes is image modulated as it passes through the photographic transparencies 57*a* and 57*b*. The output of each photosensitive device (that is, the anode current in the case of multiplier phototubes) at any instant is dependent upon the amount of light then incident thereon, and such output is transmitted to the associated viewing cathode-ray tube 75 for visual reproduction on the face thereof.

The various components shown in FIG. 3 within the block 67 in direct association with the flying spot-scanning tubes 74 and photosensitive devices 76 are somewhat in the nature of refinements that might be omitted if better performing cathode-ray tubes and photosensitive devices were available or economically acceptable. An exception perhaps is in each of the lens systems which first focuses the scanning beam onto the emulsion 57' of the photographic transparency 57, and then collects the light transmitted therethrough and redirects the same toward the associated multiplier phototube so as to be incident on the photosensitive cathode thereof. The various lenses are indicated diagrammatically in FIG. 3, and are designated with the numerals 183*a* and 194*a* in the case of the cathode-ray tube 74*a* and multiplier phototube 76*a*, and with the numerals 183*b* and 184*b* in the case of the cathode-ray tube 74*b* and multiplier phototube 76*b*. As shown perhaps more clearly in FIG. 4, the lens 183 is a high-quality cathode-ray tube transfer lens (such as an Elgeet lens, F 1.9–3-inch focal length, "oscilo novitar") and the lens 184 may comprise a pair of convex lenses with the arcuate surfaces thereof disposed in facing relation. In the usual instance, light shields such as the enclosure 185 shown in FIG. 4 will be used in conjunction with the scanning and light collection systems to exclude, insofar as practicable, ambient light.

As indicated hereinbefore, the photosensitive devices 76 used in the particular instrument being considered are multiplier phototubes which are advantageously employed in detecting the modulation of low-intensity light because the minute current generated by light impinging on the photocathode of the tube is amplified by the action of a series of dynodes or secondary emission stages contained within the tube itself which thereby obviates the necessity of separate amplification stages which might otherwise be required to bring such minute current output to a useful magnitude.

In operation of a multiplier phototube, light incident upon the photocathode thereof causes the release of electrons which are then attracted to the first of a series of secondary emission electrodes, that is, dynodes—which first dynode is maintained at a positive potential relative to the photocathode. Upon arriving at the first dynode, the electrons striking the same dissipate some of their energy at the dynode surface, thereby causing the release of secondary electrons that are ejected from the dynode surface at a relatively low velocity. Depending upon the potential of the first dynode, as many as eight or 10 secondary electrons may be emitted from each primary electron striking that dynode surface. The electrons liberated from the surface of the first dynode are accelerated toward a second dynode, the surface of which is maintained at a positive potential with respect to the first dynode. This action of electrons being attracted toward a dynode, striking a surface thereof and causing the secondary emission of a much greater number of electrons is repeated at each dynode contained within the multiplier phototube; and in current practice, tubes of this type generally have between six and 12 dynodes.

The number of secondary electrons emitted per primary electron at each dynode stage is essentially a function of the kinetic energy of each primary electron, and such kinetic energy is directly proportional to the potential difference between the emitting electrode (usually dynode) from which the primary electron was emitted and the dynode at which it arrives. Over the useful operating range of voltage differences between successive dynodes, the number of electrons emitted is very nearly a linear function of the potential difference between adjacent dynodes. Therefore, in a multiplier phototube containing 10 dynodes, for example, the amplification of the tube as a whole will vary substantially as the 10th power of the voltage applied across the dynode string. As a result, the final anode current of the phototube is strongly dependent upon the value of the voltage applied thereacross.

Further, the dynodes of multiplier phototubes vary widely in their electron-multiplying efficiency from unit to unit, and in addition thereto, there is a slow change in dynode efficiency throughout the useful life of multiplier phototubes which cannot be predicted with accuracy and which disturbs the amplification characteristics thereof.

Accordingly, a dynode regulator is employed in association with each multiplier phototube 76, and it is operative to adjust automatically the amplification of such phototube in response to contemporary values of the output current thereof to maintain the average current output substantially constant. This result is attained by adjusting automatically the potential difference between at least two and usually between several successive or adjacent dynodes in response to changes, from a predetermined value, tending to be experienced by the output current from time to time. In FIG. 3, the dynode regulators respectively associated with the multiplier phototubes **76*a* and 76*b* are denoted with the numerals 186*a* and 186*b***; and for the details of a specific circuit arrangement that may be used herein, reference is made to the copending patent application of Gilbert L. Hobrough, Ser. No. 325,867, filed Nov. 26, 1963, and entitled "Dynode Control Circuit."

A pair of screen noise feedback control assemblies are shown in FIG. 3 within the block 67 in respective association with the scanning cathode-ray tubes **74*a* and 74*b*, and such assemblies have for their purpose the maintenance of a relatively uniform or constant light intensity from point to point along the faces of the associated scanning tubes. These assemblies are refinements that improve the quality of the images appearing on the faces of the viewing cathode-ray tubes 75*a* and 75*b*** and, consequently, are not essential in the instrument.

In the specific form shown, such assemblies include, in the case of the scanning tube **74*a*, a lens system 187*a* which collects a part of the light appearing along the face of the scanning tube 74*a* and directs such light onto the photosensitive cathode of a multiplier phototube 188*a*. The current output of the multiplier phototube is fed to and provides the input of a conventional simplifier 189*a*, the output of which is fed to the cathode-ray tube 74*a*** and is effective to alter the electron stream striking the face of the cathode-ray tube to either increase or decrease the intensity of the light resulting therefrom to make the scanning pattern of relatively uniform intensity throughout the entire area of the face.

In the usual instance, the multiplier phototube **188*a* will be associated with a dynode regulator, as heretofore described in connection with the multiplier phototube 76*a*, but such a regulator has been omitted in FIG. 3 for the purpose of simplifying the drawing. It will be evident that a similar feedback control network is arranged with the scanning cathode-ray tube 76*b*, and for purposes of specific identification, the lens system is denoted 187*b*, the multiplier phototube 188*b*, and the amplifier 189*b***.

The feedback control network in performing the function of maintaining the light intensity of the scanning spot substantially uniform throughout the face of the scanning tube, senses any tendency toward either an increase or decrease in such intensity from a predetermined norm, and the current output of the multiplier phototube changes in proportion thereto. That is to say, if the light intensity tends to diminish at any instant, the corresponding output current of the multiplier phototube will decrease, and vice versa.

The output of the amplifier is inversely related to the current input thereto from the multiplier phototube in the sense that when the input current decreases, the amplifier output increases and is fed to the scanning cathode-ray tube so as to cause the spot intensity to increase. The reverse operation occurs if the light intensity tends to increase along the face of the cathode-ray tube, in which event the output current of the multiplier phototube increases and the output of the amplifier is accordingly decreased to reduce the spot intensity.

Video Processor

The video processors 69 (FIGS. 3, 14, and 15) are employed for enhancement of the video images seen by an operator on the faces of the viewing cathode-ray tubes **75*a* and 75*b*. In the present apparatus, image enhancement is confined to automatic regulation of tonal range and to a limited amount of edge enhancement. In accomplishing automatic regulation of tonal range, each video processor includes an automatic gain control operative to adjust amplification in such a manner that the output video amplitude remains substantially constant in spite of variations in input amplitude caused by differences in local image contrast. This automatic gain control feature together with the rapid transport system 55** heretofore described and the zoom control can be used to optimize the appearance and interpretability of individual portions of the imagery.

For example, assume that the image area being viewed contains elements of high contrast together with some areas of lesser contrast. Under these conditions, the tonal range of the viewed image will adjust itself to accommodate the high-contrast areas of the image, and a relatively small fraction of the brightness range will be effective in the presentation of the lower contrast material. By adjusting the zoom control (namely, selective enlargement of a particular small area of the photographic transparencies, as was explained previously) and by moving the transport in the $x$ and $y$ directions, it is often possible to exclude the high-contrast portions of such an image so that the entire field consists of lower contrast materials. Under these conditions, the automatic gain control immediately readjusts the signal levels so that the lower contrast material will be increased in apparent contrast until the brightness range of this material fills the full range of the viewing cathode-ray tube.

There is a limit to the amount of edge enhancement or high-frequency emphasis that can be applied to the scanned image by means of video networks; and this limit is set by the appearance of undesirable smear and overshoot effects such as are obtained in an uncorrectly tuned television set. The crossed-diagonal raster heretofore described permits considerable edge enhancement (relative to a television raster, for example) because smearing or overshoot effects appear symmetrically about a boundary being enhanced in four diagonal directions. Thus, a dot enhanced by a video network appears as a four-pointed star in the case of the crossed-diagonal raster but with a conventional TV raster it would be stretched out into a line. Experience indicates that enhancement to the extent of a two-to-one increase in amplitude over the highest video octave can be tolerated with the dual-diagonal raster used herein, and that such enhancement is effective in increasing the apparent sharpness of the viewed image.

The video processors **69*a* and 69*b* used herein in respective association with the left and right scanning and viewing channels are identical, and the video processor illustrated in FIGS. 14 and 15 may be taken to be either of the video processors 69*a* or 69*b*. Therefore, in the subsequent description of this component with reference to FIGS. 14 and 15**, letter suffixes will be omitted since the description applies equally to both processors.

The video processors are respectively connected to the outputs of the multiplier phototubes, and each video signal enters the associated video processor 69 through a signal line 190. The signal line 190 divides at a junction point 191 with one branch leading to an inverter 192 and the other branch leading to a stationary contact 193 provided by a switch 194 which has also a second stationary contact 195 and a movable contact 196 selectively engageable with one or the other of the stationary contacts. Evidently, the function of the switch 194 is to permit the inverter 192 to be selectively bypassed and such bypassing thereof is accomplished whenever the movable contact 196 of the switch is in engagement with the stationary contact 193. In the alternate position of the switch, the inverter 192 is connected in the circuit.

The inverter 192 serves to invert the input signal fed thereto so as to provide at its output (which may be taken to be the second stationary contact 195 of the switch 194) a video waveform which is an inverted replica of the video waveform fed thereto on the signal line 190. By way of example, the inverter may be a transformer or a unity gain amplifier. The movable contact 196 of the switch connects to the input of an attenuator 197, and depending upon the position of the movable contact, either the video input signal appearing at the line 190 or the inverted replica thereof will be fed to the attenuator 197.

When the switch connects the input signal line 190 to the attenuator through the inverter 192, the inverted replica of the input signal when amplified and displayed at the binocular viewer 62 will present to the operator a negative image of the photographs 57 then being scanned. Alternately, when the switch bypasses the inverter 192, the input signal when amplified and displayed at the binocular viewer will present to the operator a normal or positive image of the photographs 57 then being scanned.

The purpose of such selector switch arrangement is to permit the viewing of negative images as stereo pairs (a negative image may be defined as one in which the lighter portions of the image appear dark and the darker portions thereof appear light so that tonal values are inverted), and such negative images may be obtained directly from serial film immediately after processing thereof. In this respect, the action of the inverter reverses such negative images, and they appear as normal positive images to the operator.

The attenuator 197 delivers at the output signal line 198 thereof a reduced replica of the video waveform fed thereto by the switch 194. The extent of attenuation or reduction in amplitude of the signal during its transmission through the attenuator is determined by the amplitude of a control signal applied to the attenuator through a signal line 199. The output signal of the attenuator 197 is delivered through the signal line 198 to an amplifier 200 which serves to amplify the attenuated signal, and the amplified replica of the input signal thereto is fed by a signal line 201 to edge-enhancing networks 202.

The output signal of the edge-enhancing networks 202 appears on a signal line 203, and is very similar to the input signal to the edge-enhancing networks except that the high-frequency components of such input signal have been increased in amplitude relative to the lower frequency components thereof. In particular, the edge-enhancing networks 202 employed in the particular instrument being considered, operate to increase the amplitude of the signals or signal components occupying the upper octave of the video spectrum from approximately 4 megacycles to approximately 8 megacycles. This increase is a linear function, and varies from essentially no increase at a frequency of about 4 megacycles per second to an increase of twice the initial amplitude at a frequency of about 8 megacycles per second.

The output signal line 203 of the edge-enhancing networks 202 divides into two paths respectively denoted 204 and 205. The path 204 feeds into an output amplifier 206 which delivers at the output signal line 207 thereof an amplified replica of the enhanced video signal fed thereto from the edge-enhancing networks 202. The path 205 feeds an automatic gain control amplifier 208 which supplies at the output signal line 209 thereof an amplified replica of the input signal fed thereto. Such output signal from the amplifier 208 is delivered to a rectifier 210 which may be conventional, and the output thereof is fed by signal line 211 to a low-pass network 212 that provides the aforementioned control signal fed to the attenuator 197 through the signal line 199.

The output of the rectifier 210 consists principally of a DC component which is proportional to the average value of the video waveform fed thereto through the signal line 209. However, also present in the output of the rectifier 210 are undulations or alternating current components have a minimum frequency equal to approximately the lowest frequency present in the video input signal fed to the rectifier on the signal line 209. The function of the low-pass network 212 is to remove such undulations or alternating current components from the signal fed thereto and to provide at the signal line 199 a smoothed control signal, the value of which is a function of the amplitude of the video signal appearing at the signal line 209. This smoothed control signal transmitted from the low-pass filter network 212 to the attenuator 197 controls the degree of attenuation of the video signals passing through the attenuator.

Evidently then, the attenuator 197, amplifier 200, edge-enhancing networks 202, amplifier 208, rectifier 210, and low-pass network 212 define an automatic gain control system, and function to maintain the amplitude of the video signals appearing at the output signal line 203 (and, therefore, at the output signal line 207) at a substantially constant value. In this connection, and as an example of the action of such system when the equilibrium is disturbed by a change in the amplitude of the signal fed to the input of the attenuator network 197, consider an increase in the amplitude of such signal resulting possibly from an examination of a portion of a photograph having a higher contrast imagery than the portion thereof previously under examination. Since the signals on the lines 198, 201, 203 and the branches 204 and 250 thereof, and 209 are all amplified replicas of the video signal fed to the input of the attenuator, the effect of a sudden increase in the amplitude of such signal is to increase correspondingly the signal levels on the enumerated signal lines.

Since the signals on the lines 211 and 199, which respectively define the input to and output from the low-pass network 212, are derived by rectification and filtering of the signal on the line 209 defining the input to the rectifier 210, the signals present on the lines 211 and 199 will also increase in amplitude proportionately to the increase in amplitude of the input signal to the attenuator 197. Such increase in the amplitude of the control signal fed from the low-pass network 212 to the attenuator 197 serves to increase the amount of attenuation of the video signal passing through the attenuator 197 so that the output signal thereof appearing at the line 198 will be reduced in amplitude relative to the value that it would have had if the control signal to the attenuator had not been increased in amplitude.

Such reduction in the amplitude of the signal on the line 198 defining the attenuator output is also present in the signals on the lines 201, 203 and the branches 204 and 205 thereof, and 209 since all of such latter signals are amplified replicas of the signal appearing at the output of the attenuator. Evidently then, the automatic gain control system is effective to reduce amplitude changes at the output signal line 207 relative to changes in the amplitude of the video signals applied to the attenuator 197. In practice, an amplitude variation in the order of the 10 to 1 in the video signals constituting the input to the attenuator 197 is reduced by the action of the automatic gain control system to an amplitude variation of approximately 1.2 to 1 at the output signal line 207 of the video processor.

A specific circuit in which this result is achieved is illustrated in FIG. 15, and will now be described at least as respects those features thereof which are not readily evident from an inspection of the circuit drawing. For convenience of analogy to the block diagram of FIG. 14, the schematic circuit has been illustratively separated by broken lines into sections generally corresponding to the inverter 192, attenuator 197, edge-enhancing networks 202, amplifiers 206 and 208, rectifier 210, and low-pass network 212; and the various sections have been designated with these numerals.

The signal input line 190 is connected to the base of a transistor 213 which serves as an inverting amplifier and selectively inverts or does not invert the video signal fed thereto depending upon whether a control voltage is applied to a conductor 214 which is connected to the collector of the transistor through series resistances 215 and 216. Thus, the functions of the inverter 192 and switch 194 as illustrated separately in FIG. 14 are combined into a single circuit. The base-to-emitter junction of the transistor is biased in part by a resistance 217 (bypassed with a capacitance 218) connecting the emitter to ground, and in part by a voltage-dividing network by means of which the base of the transistor is connected to ground through a resistance 219 and to the supply voltage e.g., −30 volts DC) through a resistance 220. A capacitance 221 connected between ground and the junction of the series resistances 215 and 216 bypasses to ground, noise or spurious signals which may be present on the control line 214.

The conductor 214 is connected through a manually operable switch to the power supply (−30 volts DC in the circuit shown). Ordinarily, such manually operable switch is open—in which event the base-emitter junction of the transistor 213 is forward biased by the resistors 219 and 220 in the base thereof, and the output signal from the amplifier is a positive reproduction of the video input signal. However, when the conductor 214 is connected to the voltage supply, transistor 213 becomes a low-gain amplifier with the output thereof being an inverted replica of the video input signal present at the input signal line 190.

The attenuator 197 is in FIG. 15 the light-sensitive resistance assembly 222 which is a commercially available element sold under the trade name "Raysister." The function of this element is conventional, and the value of the resistance defined between the terminals 223 and 224 thereof is a function of the control lamp voltage applied to the terminals 225 and 226. The video signal constituting the output of the inverter 192 is fed from the collector of the transistor 213 to the terminal 223 of the light-sensitive resistance 222, and the output signal from such attenuator is fed to the amplifier and edge-enhancing networks through a coupling capacitance 227 connected to the terminal 224.

The amplifier 200 and edge-enhancing networks 202 comprise transistors 228 and 229, and the coupling capacitance 227 transmits the output signal from the attenuator to the base of the transistor 228 which is grounded through a resistance 230. The base of the transistor 228 is also connected through a resistance 231 to the emitter of the transistor 229 which emitter is coupled to the emitter of the transistor 228 by a serially connected resistance 232 and capacitance 233 defining a feedback loop. A resistance 234 connects the emitter of the transistor 228 to ground; and in a similar manner, the emitter of the transistor 228 is grounded through a resistance 235 which is bypassed by a capacitance 236.

The collector of the transistor 229 is connected to the voltage supply through a resistance 237, and the collector of the transistor 228 is connected to such supply through series resistances 238 and 239, and a capacitance 240 connects the junction of such resistance to ground. The collector of the transistor 228 is directly connected to the base of the transistor 229, and the collector of the transistor 229 is connected by a resistance 241 and capacitance 242 in series therewith to the emitter of the transistor 228. The transistors 228 and 229 together with the described circuit components comprise the aforementioned amplifier 200 and edge-enhancing networks 202, which function generally to amplify the attenuated signal output from the attenuator 197 and additionally to amplify further the upper octave of the video spectrum, from approximately 4 megacycles to approximately 8 megacycles, progressively in a substantially linear relation to frequency.

The outer amplifier 206 comprises the transistor 243, the base of which is directly connected to the collector of the aforementioned transistor 229. The video output from the amplifier 206 is delivered to the signal line 207 through a capacitance 244 which is connected to the emitter of the transistor 243, which emitter is connected to the voltage supply through a resistance 245. The collector of the transistor is grounded through a resistance 246 which is bypassed by a capacitance 247.

The rectifier 210 is a voltage-doubling rectifier comprising the diodes 248 and 249, the first of which has its anode connected to the emitter of the transistor 243 through a capacitance 250 and its cathode connected to the voltage supply. The anode of the diode 249 is connected to such voltage supply by a capacitance 251, and the cathode of such diode is connected to the junction of the diode 248 and capacitance 250.

The low-pass network 212 includes a transistor 252 which serves to amplify the control signal transmitted to the attenuator 197. Such control signal current is fed to the terminal 226 of the control lamp of the light-sensitive resistance assembly 222 through a current-limiting resistance 253 which connects such terminal to the collector of the transistor 252, and then to ground from terminal 225. The collector of the transistor 252 is connected with ground through a capacitance 254 and the emitter of the transistor is directly connected to the voltage supply. The base of the transistor is connected by a resistance 255 to the cathode of the diode 249, and the base is also connected to the voltage supply through a resistance 256 and capacitance 257 in series therewith. The voltage supply line, it may be noted, is connected to ground by a capacitance 258.

Most of the low-pass filtering action is provided by the internal characteristics of the light-sensitive resistance 222 (described heretofore as being comprised by the attenuator 197), but additional low-pass filtering action is provided by the capacitance 257 and resistance 256 in series therewith and also by the action of the capacitance 254 and load resistance 253. Evidently then, the functional elements clearly separated in the block diagram of FIG. 14 are in the actual circuit embodiment being considered not so clearly separate and distinct, and a single network may perform several of the functional operations indicated in the block diagram of FIG. 14. For example, the amplifiers 206 and 208 illustrated separately in FIG. 14 are combined in the actual circuit illustrated in FIG. 15, and the transistor 243 performs the function of both amplifiers supplying the video output signal to the external circuit from its emitter on line 207 and an output on its collector to the full-wave rectifier on line 209.

In the circuit of FIG. 15, the junction of the resistance 255 and diode 249 is connected by a resistance 259 and conductor 260 to a manual adjustment (e.g., potentiometer), not shown, by means of which the potential applied to the base of the transistor 252 can be adjusted to control the degree of amplification afforded thereby and, therefore, image brightness.

As stated hereinbefore and as illustrated in FIG. 3, the particular automatic registration instrument being considered employs two identical video processors, identified as 69*a* and 69*b*, which are respectively associated with the flying spot-scanning system 58*a*, light collection assembly 59*a*, and viewing cathode-ray tube 75*a*, and with the flying spot-scanning system 58*b*, light collection assembly 59*b*, and viewing cathode-ray tube 75*b*. The output signals from the video processors 69*a* and 69*b* are fed by the output signal lines 207*a* and 207*b* thereof to respectively associated amplifiers 261*a* and 261*b* which transmit amplified replicas of the video signal inputs thereto to the intensity electrodes of the respective viewing cathode-ray tubes 75*a* and 75*b* through signal lines 262*a* and 262*b*. The amplifiers 261 may be wholly conventional units, such as illustrated in Fairchild application Data Sheet APP, 27/2 Sept. 19, 1961.

Transformation System

The image transformations effected by the apparatus include, as heretofore indicated, zero-order transformations or image displacements, and these are produced by shifting the scanning rasters on the faces of the flying spot scanner tubes 74*a* and 74*b*. Such displacements of the images in the $x$ and $y$ directions are provided also by the relative physical displacement afforded by the transport system of one photographic transparency 57 with respect to the other. As heretofore explained, such relative motion may be manually accommodated by the transport system. Displacement of the rasters provides rapid image movement and the physical adjustment of the photographic transparencies is by comparison relatively slow. In this way, however, a rapid-acting system is obtained by virtue of raster displacement while the physical adjustment avoids the necessity of large raster displacements and thereby permits the optical and electronic-optical systems to work over relatively narrow field angles, thereby improving image resolution.

Figure 1:
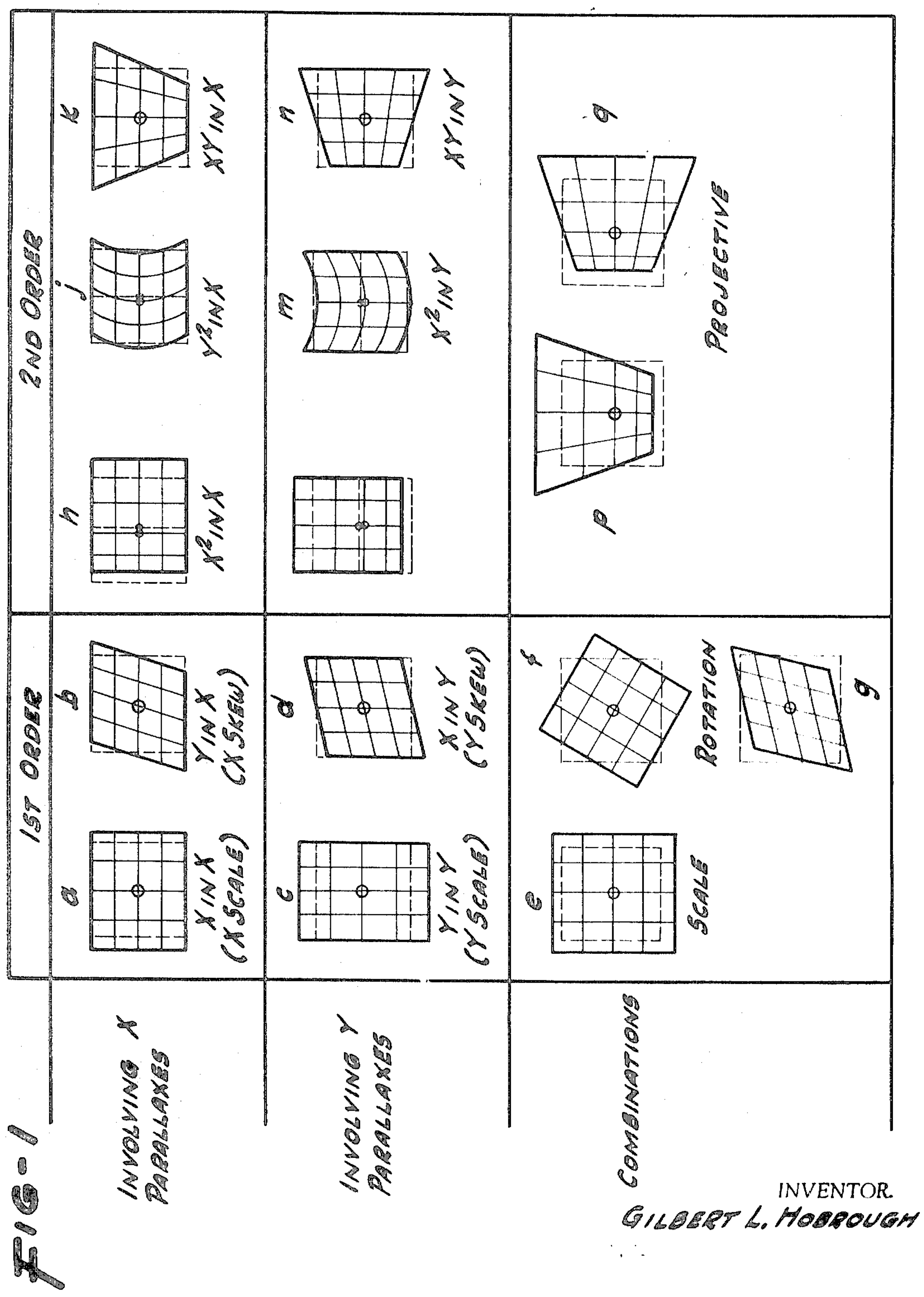
FIG. 1 is a graph depicting a number of image transformations which can be performed in accordance with the present invention.

The image transformations also include the first and second-order transformations illustrated in FIG. 1 and heretofore described; and in the particular embodiment of the invention being considered, the signals that result in the first and second-order transformations as well as the zero-order transformations originate in the correlation system 70 and define the various error signal inputs to the transformation system 71. However, as respects the operation of the transformation system, the manner in which the registration error signals are derived is not critical, and they could originate as manual adjustments whereupon the various transformations would be under the control of an operator who would adjust them (i.e., control signals therefor) separately by hand until the desired registration of the left and right images was attained.

Thus, although the present invention anticipates the attainment of automatic registration of a pair of stereo images by means of the correlation system 70 which will be described in detail hereinafter, it is apparent that signals under manual control could be supplied for each of the desired transformations to serve as input registration signals to the transformation system. Therefore, the order of description, from the functional point of view, more appropriately considers the transformation system 71 prior to a discussion of the correlation system, and this order will be observed.

Referring to FIG. 16, which is a block diagram of the transformation system 71, such system is seen to comprise a plurality of modulators—there being 10 in number respectively denoted with the numerals 270 through 279, one multiplier 280, two squaring circuits 281 and 282, two sum and difference or hybrid circuits 283 and 284, and a plurality of points of connection for the modulators, illustrated as six summing points respectively denoted with the numerals 285 through 290. Each of the prime transformation error signals is applied to a separate modulator and since there are 10 prime transformations accommodated by the instrument, there are necessarily 10 modulators. The zero-order or $x$ and $y$ parallax error signals are directly fed, respectively, to the summing points 285 and 286.

The prime first-order transformations illustrated in FIG. 1 are accommodated by the modulators 270 through 273; and in a particular sense, the $x$ scale error signals are fed to the modulator 270 through a signal line 291, the $x$ skew error signals are fed to the modulator 271 through a signal line 292, the $y$ skew error signals are fed to the modulator 272 through a signal line 293, and the $y$ scale error signals are fed to the modulator 273 through a signal line 294. The $xy$ in $x$ and $xy$ in $y$ error signals are respectively fed to the modulators 274 and 275 through signal lines 295 and 296. Similarly, the $x^2$ in $x$, $y^2$ in $x$, $x^2$ in $y$, and $y^2$ in $y$ error signals are respectively fed to the modulators 276 through 279 through the respectively associated signal lines 297 through 300. Thus, there is an error signal line and a modulator for each of the 10 prime first- and second-order transformations illustrated in FIG. 1.

The outputs of the various modulators are added together at the respectively associated summing points; and considering firstly the prime first-order transformations, the outputs of the modulators 270 and 271, which are associated with the $x$ parallaxes (i.e., $x$ scale and $x$ skew error signals) and with the $x$ parallax error signal, are added together at the summing point 285 and are transmitted via a signal line 301 to the hybrid circuit 283. Similarly, the outputs of the modulators 272 and 273, which are associated with the $y$ parallaxes and with the $y$ parallax error signal, are added together at the summing point 286 and are transmitted via a signal line 302 to the hybrid circuit 284. The $x$-scanning signal from the raster generator 68 is transmitted to the transformation system 71 by the signal line 114 and constitutes one of the inputs to the modulator 270 and to the modulator 272. Similarly, the $y$ scanning signal from the raster generator 68 is transmitted to the transformation system 71 by the signal line 113 and constitutes one of the inputs to the modulator 271 and to the modulator 273.

The modulators used herein are each a balanced modulator which is a type of multiplier wherein the input signals thereto are the factors and the output signal is their product. Of the two input signals to such modulator, one input (called the control) varies slowly with time or remains constant. The other input (called the carrier) is generally a repetitive waveform of relatively high frequency. In each of the modulators comprised in the transformation system 71, the registration error signals from the correlation system 70 constitute the control inputs, and the carrier inputs are derived from the scanning signals or waveforms delivered to the transformation system from the raster generator 68. The outputs of the modulators are correction signals which are added together into two groups respectively constituting the $\Delta x$ and $\Delta y$ correction or transformation signals which are combined with the scanning signals in the hybrid circuits 283 and 284, and the resultant signals are designated transformed scanning signals which are transmitted to the flying spot scanners **74*a* and 74*b* via the amplification system 72**.

In the present instance, any balanced modulator circuit is suitable for use provided only that it performs the multiplication between the control and carrier signals (that is, the associated registration error signals and the scanning signals) accurately, and that it is capable of handling without distortion all frequency components present in the scanning signals. For a particular modulator circuit suitable for use herein, reference may be made to the copending patent application of Gilbert L. Hobrough, entitled "Tunnel Diode Modulator," Ser. No. 311,607, filed Sept. 13, 1963.

A hybrid circuit is a sum and difference circuit, the purpose of which in the present invention is to effect transformations of the scanning rasters of the two flying spot scanner cathode-ray tubes **74*a* and 74*b* in opposite directions such that the transformation applied to the cathode-ray tube 74*a* is complementary to the corresponding transformation applied at any instant to the cathode-ray tube 74*b*. A hybrid circuit which may be used herein is illustrated in block diagram form in FIG. 17. It should be noted that the hybrid circuits 283 and 284 are identical; and, therefore, the circuit illustrated in FIG. 17 is equally applicable to both, but for purposes of specific description will be taken to be the hybrid circuit 283**.

The control signal input, which constitutes the $\Delta x$ correction signal, is transmitted to the hybrid circuit on signal line 301 and the carrier signal input, which constitutes the $x$-scanning signal, is transmitted to the hybrid circuit on signal line 114. The carrier signal constitutes the unmodified $x$ scanning signal from the raster generator 68, and the $\Delta x$ correction signal constitutes the sum of the outputs of the modulators 270 and 271 as such summation may be modified by the outputs of the modulators 274, 276, and 277. The two output signals from the hybrid circuit appear on signal lines 303 and 304, the first of which (as shown in FIG. 3) provides the input to the $x$ deflection amplifier **116*b*, and the second of which provides the input to the right deflection amplifier 116*a*. In the case of the hybrid 284, the two outputs therefrom are denoted 305 and 306, and they are respectively connected to the right and left deflection amplifiers 115*a* and 115*b***.

The hybrid circuit illustrated in FIG. 17 comprises four amplifiers, respectively denoted 307 through 310, each of which, for example, may be a transistor and the various circuit components associated therewith. The two signals appearing at the input signal lines 114 and 301 are respectively amplified in the amplifiers 307 and 308 and are added at the summing point 31!1. The input signal appearing at the signal line 114 is also delivered to an amplifier 309, and the input signal appearing at the signal line 301 is also fed to the amplifier 310 but through a phase inverter circuit generally indicated at 312. The outputs of the amplifiers 309 and 310 are added at the summing point 313.

Quite evidently, an input signal present on the signal line 114 appears at each of the summing points 311 and 313 in amplified form and identical phase. However, an input signal present at the signal line 301 will appear at the summing point 311 in amplified form, and at the summing point 313 in amplified form but in opposite phase relationship. Therefore, the total output signal at the signal line 303 associated with the summing point 311 is proportional to the sum of the input signals present at the signal lines 114 and 301, and in the present instance is the sum of the amplified input signals. The total output signal at the signal line 304 associated with the summing point 313, however, is proportional to the difference between the input signals present at the signal lines 114 and 301, and in the present instance constitutes the difference between the amplified input signals, and specifically, the $x$-scanning signal from the line 114 minus the $\Delta x$ correction signal on the line 301.

For a specific hybrid or sum and difference circuit which may be used herein, reference may be made to the copending patent application of Gilbert L Hobrough, entitled "Hybrid Circuit," Ser. No. 308,776, filed Sept. 13, 1963.

In considering the action of the transformation system 71 in performing a first-order transformation, it will be seen that the modulator 270 functions to produce an $x$ scale transformation of the scanning patterns on the scanner tubes **74*a* and 74*b*** similar to the $x$ scale transformation illustrated in FIG. 1 as transformation *a*. It will also be seen that the magnitude and sign of such transformation is proportional to the corresponding $x$ scale registration error signal (derived from the correlation system) applied to the modulator 270 by the signal line 291. In this consideration, it will be assumed initially that all registration error signals from the correlation system are zero, which will correspond to a condition in which no transformations of the scanning rasters are required to effect registration of the photographic images being inspected by the scanner tubes **74*a* and 74*b***.

Since each of the modulators is in fact operative to multiply the two input signals fed thereto, and since one of the input signals is in each case equal to zero, the output of each modulator must of necessity be equal to zero. Under these conditions, therefore, the $x$ correction signal appearing on the signal line 301 will be zero; and, consequently, one of the inputs (i.e., from the signal line 301) to the hybrid circuit 283 will be zero. Evidently then, the output signals from the hybrid circuit 283 appearing on the signal lines 303 and 304 will each be equal to the input scanning signal appearing on the signal line 114 and which constitutes one of the two inputs to the hybrid circuit. That is to say, the algebraic sum of such scanning signal and zero will equal the scanning signal.

Likewise, the $y$ correction signal appearing on the signal line 302 will be zero; and, consequently, one of the inputs to the hybrid circuit 284 will be zero. Evidently then, the output signals from the hybrid circuit 284 appearing on the signal lines 305 and 306 will each be equal to the input scanning signal appearing on the signal line 113 and which constitutes the other of the two inputs to the hybrid circuit.

It may be concluded then that since the input signals on lines 113 and 114 to the transformation system constitute the $y$- and $x$-scanning signals required to produce the aforementioned square-shaped scanning raster for the scanning cathode-ray tubes **74*a* and 74*b***, such scanning rasters will be square-shaped and untransformed whenever the error signals are zero.

Next assume that a positive $x$ scale error signal is applied to the modulator 270 through the signal line 291. Under this condition, the modulator output being fed to the summing point 285 will be reduced replica of the input or $x$-scanning signal fed to the modulator on line 114, and it may be designated the $x$ scale correction signal. The extent of such reduction will be a function of the magnitude of the input error signal because the output signal constitutes the product of such error signal and the $x$-scanning signal. Accordingly, the greater the magnitude of the error signal, the greater the magnitude of the output correction signal from the modulator.

Added to this positive output signal from the modulator 270 will be the zero outputs of the other modulators (271, 274, 276 and 277) and the zero parallax signal from line 317, all of which contribute to the total $x$ correction signal or $\Delta x$ correction signal being transmitted via signal line 301 to the hybrid circuit 283; and the hybrid circuit 283 will then have two input signals respectively constituting the $x$-scanning signal and the $\Delta x$ correction signal (which in this case constitutes the $x$ scale correction signal). As a result of the action of the hybrid circuit, the transformed scanning signal appearing on the output signal line 303 will be the $x$-scanning signal increased in amplitude by the addition thereto of the positive $\Delta x$ correction signal. This will result in an increased $x$-scanning amplitude on the left scanner cathode-ray tube **74*b*. Correspondingly, the signal appearing on the output signal line 304 will be the $x$-scanning signal reduced in amplitude by the subtraction therefrom (addition thereto of an inverted or negative signal) of the positive $x$ correction signal. This will result in a decrease in the $x$-scanning amplitude on the right scanner cathode-ray tube 74*a***.

Generally stated, then, the presence of a positive $x$ scale registration error signal on the line 291 will cause an increased $x$ deflection on the left scanner cathode-ray tube **74*b*, with a consequent increase in the $x$-dimension width of the raster on the face thereof, as illustrated in FIG. 1*a*; and at the same time, there will be a decrease in the $x$ deflection on the right scanner cathode-ray tube 74*a*, with a consequent reduction in the $x$-dimension width of the raster on the face thereof producing a narrow raster having a transformation opposite to that illustrated in FIG. 1*a***.

If the $x$ scale registration error signal appearing on the signal line 291 is negative rather than positive, the product waveform constituting the output of the modulator 270 will be an inverted reduced replica of the $x$-scanning waveform on the signal line 114 representing the product of such scanning waveform multiplied by a negative number representing the magnitude of the voltage of the $x$ scale error signal present on the line 291.

In this event, the signal on the output line 303 of the hybrid 283, which represents the sum of the input signals fed thereto on the lines 114 and 301, will be equal to the $x$-scanning signal input thereto appearing on the line 114 reduced by the amplitude of the signal on the line 301 which, since it is negative, will be in reverse phase relationship with respect to the scanning signal on the line 114. Therefore, the left $x$ deflection signal on the output line 303 will be reduced in amplitude and will result in a narrow raster on the flying spot scanner tube **74*b***.

Likewise, the output signal on the line 304 will represent the difference between the $x$-scanning signal input fed to the hybrid circuit on the line 114 and the reverse replica thereof appearing on the line 301 which difference, since the replica is negative, is equivalent to the sum of the signal on the line 114 and an unreversed replica thereof. Therefore, the signal on the output line 304 will be of increased amplitude and will result in a scanning raster on the right scanner cathode-ray tube **74*a*** having an increased $x$-dimension width.

Summarizing then, it can be seen that the effect of any $x$ scale error signal appearing on the signal line 291 is to produce an $x$ scale transformation of the raster of each of the flying spot scanner tubes **74*a* and 74*b*, and that the direction and magnitude of any such transformation are respectively equal to the sign and proportional to the magnitude of the error signal appearing on the line 291. Further, such transformation as applied to the left cathode-ray tube 74*b* is opposite in sign to the corresponding transformation applied to the right cathode-ray tube 74*a***.

In an entirely analogous manner, it can be shown that a $y$ scale error signal applied to the modulator 273 via the signal line 294 will effect a $y$ scale transformation of the scanner cathode-ray tubes **74*a* and 74*b* through the action of the modulator in providing a replica on the signal line 302 of the $y$-scanning signal fed to the modulator on the signal line 113. In this connection, the hybrid circuit 284 functions in a manner similar to that of the hybrid 283 in effecting $x$ scale transformations, and will correspondingly effect $y$ scale transformations in opposite senses on the left and right scanner cathode-ray tubes 74*b* and 74*a***.

The operation of the transformation system 71 will now be described with reference to the action taken thereby in response to the presence of the skew error signal. Assume initially that a positive $x$ skew error signal is being fed to the modulator 271 by the signal line 292. The modulator 271 is substantially identical to and therefore functions in the same manner as the modulator 270; and accordingly, the output of the modulator 271 will be a reduced replica of the $y$-scanning signal fed to the modulator via the signal line 113. Such reduced replica will be transmitted from the modulator 271 to the summing point 285, and therefore will be delivered by the signal line 301 to the input of the hybrid circuit 283.

Although the action of the modulator 271 is quite similar to that of the modulator 270 in that both deliver reproduced replicas of scanning signals to the summing point 285, and therefore to one of the inputs of the hybrid circuit 283, it should be noted that the modulator 270 introduces a reduced replica of the $x$-scanning signal onto the signal line 301 and that the modulator 271 introduces a reduced replica of the $y$-scanning signal onto the signal line 301.

As a result of the action of the modulator 271 in response to the presence of a positive $x$ skew error signal on the line 292, and the consequent delivery of a reduced replica of the $y$-scanning signal to the hybrid circuit 283, such replica of the $y$-scanning signal (which is the $x$ skew correction signal) is added by the hybrid 283 to the $x$-scanning signal delivered thereto by signal line 114; and the sum thereof appears on the output signal line 303. Such output signal is delivered, as previously described, to the $x$ deflection coil of the left flying spot scanner 74*b*; and since the position of the scanning spot is at any instant a linear function of the $x$ and $y$ deflection signals at such instant, the position of the scanning spot in the raster of the left scanner cathode-ray tube will be modified by the addition to the $x$-scanning signal of a signal derived from the $y$-scanning signal. Therefore, the square-shaped raster on the left flying spot scanner tube 74*b* will be transformed, as indicated in FIG. 1*b*.

In particular, such raster will be displaced toward the right (as viewed in FIG. 1) or in the positive $x$ direction in the upper portion of the raster, which corresponds to the addition to the $x$-coordinate signal (i.e., the instantaneous value of the $x$-scanning signal) of a positive $\Delta x$ correction signal which constitutes a portion of the positive $y$-coordinate signal (i.e., the contemporaneous instantaneous value of the $y$-scanning signal). Likewise, the raster will be displaced to the left or negative $x$ direction in the lower portion of the raster corresponding to the addition to the $x$-coordinate signal of a negative $y$-coordinate signal. Evidently then, such $x$ shift of the raster will be proportional to the value of the $y$-coordinate at any instant, and the shift will range from zero in the center of the raster (corresponding to the addition of a zero $y$-coordinate signal) to a maximum positive shift at the top of the raster which corresponds to the maximum $y$ positive coordinate signal, and similarly, to a maximum negative shift at the bottom of the raster which corresponds to the maximum $y$ negative coordinate signal. A corresponding complementary shift in the raster of the right scanner cathode-ray tube 74*a* is effected by the hybrid circuit 283 via the output signal line 304 in the manner heretofore described.

If the $x$ skew error signal on the line 292 is of negative sign, the modulator 271 will produce a negative replica of the $y$-scanning waveform, which replica will be transmitted to the summing point 285 and delivered by the signal line 301 to the hybrid circuit 283. The action of the hybrid circuit 283 is then similar to that heretofore described in connection with the presence of a negative $x$ scale error signal on the line 291; and the negative replica or inverted waveform delivered on the signal line 301 to the hybrid circuit will be algebraically added thereby to the $x$-scanning waveform delivered to the hybrid via the signal line 114. The resulting waveforms appearing at the output lines 303 and 304 of the hybrid will be modified in the opposite sense relative to the waveforms appearing on such output lines when a positive $x$ skew error signal is transmitted to the modulator 271. Consequently, under the condition of a negative $x$ skew error signal, the transformations on the flying spot scanner tubes 74*a* and 74*b* will be reversed, and the transformation illustrated in FIG. 1*b* will then appear on the right scanner cathode-ray tube 74*a*, and its transformation complement will appear on the left scanner tube 74*b*.

The modulator 272 and hybrid circuit 284 will function in an entirely analogous manner to the presence of either a positive or a negative $y$ skew error signal on the signal line 293. Accordingly, the replicas of the $x$-scanning signal delivered to the summing point 286 and transmitted by the signal line 302 to the hybrid 284 will be added to and subtracted from the $y$-scanning signal, and the output signals appearing on the lines 305 and 306 will effect complementary skew transformations in the rasters appearing on the faces of the scanner cathode-ray tubes 74*a* and 74*b*, as heretofore described, to produce the $y$ skew transformation illustrated in FIG. 1*d*.

It will be apparent from the foregoing discussion that the modulators 270 through 273 are operative in combination with the hybrid circuits 283 and 284 to effect the first-order transformations illustrated in FIG. 1. The production of the second-order transformations illustrated in FIG. 1 will now be described and in this connection, the function of the modulators 276 through 279 will first be considered, which respectively receive $x^2$ in $x$, $y^2$ in $x$, $x^2$ in $y$, and $y^2$ in $y$ error signals via the respectively associated error signal lines 298 through 300.

It may be noted first, however, that the multiplier 280 and squaring circuits 281 and 282 used in the production of the second-order transformations can be conventional and, for an example of a typical multiplier suitable for use herein, reference may be made to a publication entitled "IEEE Transactions on Electronic Computors," Volume EC-13, No. 3, dated June 1964, wherein a multiplier circuit is illustrated on page 291, FIG. 3 of a chapter entitled "Transistorized Multiplier and Divider and Its Applications" by P. Kundu and S. Banerji; and reference may be made also to a publication entitled "IRE Transactions on Electronic Computers," Volume EC-6, No. 1, dated Mar. 1957, wherein a multiplier circuit is illustrated in FIG. 3 (identified as "Ring Modulator as Basic Multiplier Unit") of a chapter entitled "An Electronic Analog Multiplier Using Carriers" by Eric S. Weibel. For a squaring circuit, reference may be made to a publication by McGraw-Hill Book Company entitled "Waveforms," 1949 Edition, Chapter 19 (by F. B. Berger and D. MacRae, Jr.), Section 6, FIGS. 19 and 20 which are concerned with a push-pull squaring circuit.

The modulators 276 through 279, in response to the registration error signals respectively fed thereto, multiply the associated error signals and the $x$ and $y$ scanning signals after squaring of the scanning signals in the respectively associated squaring circuits 281 and 282. More particularly, the squaring circuit 281 delivers to a signal line 314 a signal having a waveform proportional to the square of the $x$-scanning signal at any instant. Similarly, the squaring circuit 282 delivers to a signal line 315 a signal having a waveform proportional to the square of the $y$-scanning signal at any instant. The signal line 314 is connected to both the modulator 276 and the modulator 278 and, therefore, the output signal form the squaring circuit 281, which signal is proportional to the square of the $x$-scanning signal, provides one of the inputs to each of the modulators 276 and 278. In an identical manner, the signal line 315 is connected to the modulators 277 and 279 and, therefore, the output signal from the squaring circuit 282, which signal is proportional to the square of the $y$-scanning signal, provides one of the inputs to each of the modulators 277 and 279.

Considering the modulator 276, it will be evident that this modulator multiplies the signal output from the squaring circuit 281 and the $x^2$ in $x$ registration error signal which is delivered thereto by the signal line 297. The output of the modulator 276 is connected to the summing point 289 which is defined along the signal line 301 that delivers the $\Delta x$ correction signal to the hybrid circuit 283. Comparing the action of the modulator 276 with that of the modulator 270 (heretofore described in connection with the first-order transformations), it will be evident that both modulators deliver to the signal line 301, which transmits signals thereon to the hybrid circuit 283, signals derived from the $x$-scanning signal. Since, as heretofore described, the modulator 270 functions to transmit to the summing point 283 and signal line 301 a reduced replica of the $x$-scanning signal, which is added in the hybrid circuit 283 to the original $x$-scanning signal and ultimately produces the $x$ scale transformation illustrated in FIG. 1*a*, it would be properly expected that the modulator 276 functions to transmit to the summing point 289 and signal line 301 an output signal combining the aforementioned square of the $x$-scanning signal and the $x^2$ in $x$ error signal to produce, in an analogous manner, the $x^2$ in $x$ transformation illustrated in FIG. 1*h*. This is in fact the case, and the modulator 276 may be regarded as producing such second-order transformation.

The $x^2$ in $x$ transformation is nonlinear because one of the factors fed to the modulator 276 is a signal proportional to the square of the instantaneous $x$-scanning waveform ($x$-coordinate signal). More especially, the scanning raster, as shown in FIG. 1*h*, is displaced toward the right or in the $+x$ direction in the right half thereof (i.e., the $+x$, $+y$ and $+x$, $-y$ quadrants), which corresponds to the addition to the positive $x$-scanning signal throughout such portion of the raster of a positive transformation signal proportional to a $(+x)^2$ coordinate signal. Similarly, the raster is displaced toward the right in the left half thereof, (i.e., the $-x$, $+y$ and $-x$, $-y$ quadrants), which corresponds to the addition to the negative $x$-scanning signal throughout such portion of the raster of a positive transformation signal proportional to a $(-x)^2$ coordinate signal.

It can be shown in an identical manner that the modulator 279 controls the multiplication of a $y^2$ in $y$ registration error signal fed thereto on the signal line 300 and a signal proportional to the square of the $y$-scanning signal at any instant, which proportional signal is fed to the modulator via the signal line 315; and it can be further shown that the output of the modulator 279, in being fed to the hybrid circuit 284 by the signal line 302, provides the $y^2$ in $y$ transformation illustrated in FIG. 1*l*.

The operation of the modulator 277 may be analogized to the operation of the modulator 271 in that each is concerned with a skew-type transformation. More pointedly, each of the modulators 277 and 271 controls the multiplication of an $x$ parallax registration error signal and a signal derived from the $y$-scanning signal. In the case of the modulator 271, such derived signal is a reduced replica of the $y$-scanning signal at any instant; and in the case of the modulator 277, such derived signal is a reduced replica of the square of the $y$-scanning signal at any instant. Since, as heretofore described, the modulator 271 functions to transmit to the summing point 285 and signal line 301 a reduced replica of the $y$-scanning signal which is added in the hybrid circuit 283 to the original $x$-scanning signal and ultimately produces the $x$ skew transformation illustrated in FIG. 1*b*, it would be properly expected that the modulator 277 functions to transmit to the summing point 289 and signal line 301 a reduced replica of the square of the $y$-scanning signal which is added in the hybrid circuit 283 to the original $x$-scanning signal and ultimately produces the $y^2$ and $y$ transformation illustrated in FIG. 1*j*, and this is in fact the case.

The $y^2$ in $x$ transformation is nonlinear because one of the terms in the transformation signal is a squared quantity, i.e., the square of the $y$-scanning waveform at any instant ($y$-coordinate signal). As is evident in FIG. 1*j*, the transformation of the scanning raster varies from a negative displacement along the horizontal center thereof (i.e., along the $x$-coordinate axis whereat the $y$-coordinate signals are zero) to a maximum positive displacement in both the upper and lower halves of the raster where the $y$-coordinate signals are maximum. The lines extending along or "parallel" to the $y$-axis are, therefore, curved in parabolic arcs corresponding to the squared term processed by the modulator 277.

It can be shown in an identical manner that the modulator 278 controls the multiplication of an $x^2$ in $y$ registration error signal fed thereto on the signal line 299 and a signal proportional to the square of the $x$-scanning signal at any instant—which scanning signal is fed to the modulator from the squaring circuit 281 by the signal line 314; and it can be further shown that the output of the modulator 278 in being fed to the hybrid circuit 284 by the signal line 302 from summing point 290, provides the $x^2$ in $y$ transformation illustrated in FIG. 1*m*.

The remaining two second-order transformations—namely, the $xy$ in $x$ and $yx$ in $y$ transformations respectively illustrated in FIGS. 1*k* and 1*n*—originate in the modulators 274 and 275 in response to registration error signals fed thereto on the respectively associated signal lines 295 and 296. The modulators 274 and 275 each receive their second input via a signal line 316 from a multiplier 280 that delivers to the signal line a product signal having a waveform proportional to the product, at any instant, of the two input signal waveforms transmitted thereto by the signal lines 114 and 113—that is, the $x$- and $y$-scanning signals.

Considering first the modulator 274 which produces the $xy$ in $x$ transformation illustrated in FIG. 1*k*, such modulator multiplies a reduced replica of the $xy$ product signal (derived in the multiplier 280 from the $x$- and $y$-scanning signals) fed thereto on line 316 and the $xy$ in $x$ 301 at the summing point 287. The combination of an $x$ signal component with the $x$-scanning signal causes an $x$-scale-type change in the scanning raster (as in the prior described transformation shown in FIG. 1*a*), and the combination of a $y$ signal component with the $x$-scanning signal results in an $x$-skew-type change in the lines parallel to the $y$-axis of the scanning raster. Evidently then, the combination with the $x$-scanning signal of a waveform derived from the product of the $x$- and $y$-scanning signals can produce the composite change illustrated in FIG. 1 as the *k* transformation, $xy$ in $x$.

In further considering this transformation, the product waveform delivered by the multiplier 280 to the signal line 316 will be zero when either of its factor waveforms is zero; that is, when either the $x$-scanning signal appearing on the line 113 is zero. Upon such occurrence, the scale and skew modifications will be zero, and this condition obtains along the $x$axis because the $y$-coordinate signal is zero therealong and also along the $y$-axis because the $x$-coordinate signal is zero therealong. In the first quadrant ($+x$, $+y$) of the scanning raster, all of the instantaneous $x$- and $y$-coordinate values are positive and, therefore, the product output signal of the multiplier 280 will be positive as will be the outputs of the modulators 274 and 245. Consequently, the addition of a positive signal to the positive instantaneous $x$-coordinate signal will displace the raster in the positive $x$ direction in this first quadrant.

Considering the second quadrant ($-x$, $+y$) of the raster, the product output of the multiplier 280 for signals in this quadrant will be negative because the $x$-scanning signal input to the multiplier is a negative quantity in this quadrant. Consequently, the raster will be displaced in the negative $x$ direction because of the addition to the negative $x$-coordinate signals of negative transformation signals.

Referring to the third quadrant ($-x$, $-y$) of the raster, the product output of the multiplier 280 will be a positive quantity because each of the input signals thereto will be of negative sign. This, the addition of a negative $x$-scanning signal and a positive transformation signal will displace the raster in the positive direction, that is, reduce the $x$-direction width thereof in the third quadrant.

Correspondingly, and considering the fourth quadrant ($+x$, $-y$), the product output of the multiplier 280 will be a negative quantity because one of the factors (the $y$-scanning signal) fed thereto is a negative quantity in this quadrant. Therefore, the addition to the positive $x$-scanning signal of a negative quantity will displace the raster in the negative direction or reduce the $x$-direction width thereof. Thus, the modulator 274 in cooperation with the multiplier 280 is operative to effect the *xy* in *x* transformation illustrated in FIG. 1*k*.

By analogy, it is apparent that the modulator 275 is effective in combination with the multiplier 280 to effect the *xy* in *y* transformation illustrated in FIG. 1*n*. In this respect, and considering the raster quadrants 1 through 4 heretofore described, a positive product signal from the multiplier 280 will be added to the *y*-coordinate signal in the first quadrant, and will cause a displacement of he raster in the positive direction along the *y*-axis. In the second quadrant, a negative signal will be added to the positive *y*-coordinate signal (because the *x*-scanning signal fed to the multiplier 280 is negative), which will result in a displacement of the raster in the negative direction along the *y*-axis. In the third quadrant, a positive signal (both the *x*- and *y*-scanning signals fed to the multiplier are negative) will be added to the negative *y*-coordinate signal, which will reduce the magnitude thereof and cause a displacement of the raster in the positive direction along the *y*-axis. In the fourth quadrant, the product output of the multiplier 280 will be negative (the *y*-scanning signal thereto is negative), and the resulting negative signal added to the negative *y*-coordinate signal will displace the raster in the negative direction along the *y*-axis. Therefore, it is seen that the modulator 275 in combination with the multiplier 280 is operative to produce the *xy* in *y* raster transformation illustrated in FIG. 1*n*.

As in the case of the first-order transformations described hereinbefore, the hybrid circuits 283 and 284 introduce the second-order transformation signals in opposite senses to the left and right flying spot scanner tubes 74*b* and 74*a* to produce complementary transformations in the left and right channels.

The modulators 270 and 279 have been seen to act as mathematical multipliers and, therefore, it may be concluded that the transformations illustrated in FIG. 1 are essentially independent of the waveforms used to produce the scanning raster. In this respect, displacement of any undistorted coordinate position in the scanning raster is a function of such coordinate position and, therefore, of the instantaneous values of the *x*- and *y*-scanning signal voltages representing such position. Thus, the raster displacements or image transformations shown in FIG. 1 could be effected were television scanning rasters employed rather than the dual-diagonal scanning raster specifically considered herein, although in such case the waveforms would differ in many essential respects.

It is evident from the foregoing that each of the modulators is responsive to a particular error signal input thereto; and it should be noted that the sign and the magnitude of the correction signal output from each modulator is a function of the polarity and magnitude of the registration error signal input thereto. Thus, in each instance, the greater the magnitude, of the error signal input to a modulator, the greater the magnitude of the output correction signal therefrom, and vice versa.

In the foregoing discussion of the function of each of the modulators 270 through 279 in producing an output correction signal it was assumed, for simplicity of description, that the contemporaneous values of the other modulators was zero. That is to say, in describing the operation of the modulator 270 in developing the *x* scale correction signal and the transmission thereof to the hybrid circuit 283 via signal line 301, it was assumed that the modulators 271, 274, 276, and 277 had zero outputs, and it was further assumed that the zero-order or *x* parallax error signal applied to the signal line 301 at the summing pint 285 therealong was also zero. Such "-zero output" assumption was similarly made in describing the function of each of the modulators 271, 274, 276, and 277.

It is evident, however, that some or all of the modulators may have signal outputs concurrently, and at the same time there may be parallax error signals respectively applied to the signal lines 301 and 302. Further, all such error signals might be positive, and might be negative, some might be positive and others negative, and still others might be zero—whatever combination is necessary to effect registration between left and right photographic images being scanned. In any event, all such error signals appearing at the summing points 285, 286, and 289 in the case of the signal line 301, and at the summing points 286, 288, and 290 in the case of the signal line 302, will be algebraically summed; and such total sum or $\Delta x$ correction signal will be applied to the hybrid circuit 283 by the signal line 301, and such total sum or $\Delta y$ correction signal will be applied to the hybrid circuit 284 by the signal line 302. The outputs of the hybrid circuits, then, constitute the original scanning signals from the raster generator as modified by the $\Delta x$ or $\Delta y$ (as the case may be) correction signal so that such hybrid circuits deliver transformed scanning signals to the scanning cathode-ray tubes to control the scanning rasters thereof.

The function of the transformation system 71 is conveniently summarized in mathematical terms by the following polynomials: $\Delta x$ correction signal$=a_1x^2+b_1y^2+c_1xy+d_1x+e_1y+f_1$ where $a_1x^2$ represents the $x^2$ in $x$ second-order transformation;
$b_1y^2$ represents the $y^2$ in $x$ second-order transformation;
$c_1xy$ represents the $xy$ in $x$ second-order transformation;
$d_1x$ represents the $x$ in the $x$ first-order transformation;
$e_1y$ represents the $y$ in $x$ first-order transformation; and
$f_1$ represents the $x$ parallax zero-order transformation.

Correspondingly, $\Delta y$ correction signal$=a_2x^2+b^2y^2+c^2xy+d_2x+c_2y+f_2$ where $a_2x^1$ represents the $x^2$ in $y$ second-order transformation;
$b_2y^2$ represents the $y^2$ in $y$ second-order transformation;
$c_2xy$ represents the $xy$ in $y$ second-order transformation;
$d_2x$ represents the $x$ in $y$ first-order transformation;
$e_2y$ represents the $y$ in $y$ first-order transformation; and
$f_2$ represents the $y$ parallax zero-order transformation.

In the case of each polynomial, the various $x$ and $y$ terms respectively represent the $x$- and $y$-coordinate signals at any instant (i.e., the instantaneous values of the $x$- and $y$-scanning signals). The coefficients $a$ through $c$, inclusive, represent the error signals transmitted to the various modulators via the respectively associated signal lines 291' through 300'. The $f_1$ and $f_2$ terms, as indicated heretofore, respectively represent the $x$ and $y$ parallax signals. Evidently then, the various $x$ terms will be zero whenever the position of the scanning spot lies on the $y$-axis of the aforementioned Cartesian coordinate system, the various $y$ terms will be zero whenever the position of the scanning spot lies on the $x$-axis of such system, and all of the $x$ and $y$ terms will be zero only when the scanning spot is located at the origin of such $x$- and $y$-coordinate axes. Any one of the various coefficients will be zero whenever there is no misregister between the left and right photographic images of the type requiring the particular first- or second-order transformation represented by the $x$ or $y$ term associated with such coefficient. In the event that any such misregister exists, the coefficient will be either positive or negative depending upon the direction of the misregister.

From the foregoing mathematical expressions, it is apparent that the various terms in each polynomial may be of positive or negative sign and can be of various magnitudes including zero. In any event, the various terms are algebraically added to form the respective $\Delta x$ and $\Delta y$ correction signals which are transmitted to the associated hybrid circuits 283 and 284 and are combined thereat with the original $x$ in $y$-scanning signals from the raster generator to provide the transformed scanning signals which are then applied to the scanning cathode-ray tubes to control the scanning rasters thereof.

As indicated hereinbefore, the registration error signals are derived from the correlation system 70 (FIG. 3) which senses any misregister or displacement differences between the left and right photographic images being scanned at any instant. In this manner, the transformations of the scanning rasters can be controlled in response to the relative distortions or displacements between the two images, and the distortion reduced automatically to zero through the described action of the transformation system.

CORRELATION SYSTEM

As stated hereinbefore, the present invention includes the attainment of automatic registration of a pair of stereo images, and such attainment is effected through registration error signals developed in the correlation system 70 which is operative to sense any misregister or displacement differences between the left and right photographic images being scanned at any instant and produce such registration error signals in response thereto. In producing the registration error signals, the correlation system observes the video signals being transmitted through the video processors 69*a* and 69*b* to the viewing cathode-ray tubes 75*a* and 75*b*, and detects in such signals any differences in timing between corresponding detail in the left and right channels of the apparatus. The correlation system also receives reference signals from the raster generator 68, which reference signals indicate the scanning spot position in the *x* and *y* directions separately. From these four input signals (that is, the left and right video signals and the *x*- and *y*-scanning spot coordinate signals), the correlation system computes the direction of registration errors and makes this information available in the form of registration error signals which are fed to the transformation system 71.

In describing the correlation system, reference will first be made to FIG. 18 which is a block diagram of the system in its entirety. As seen in this figure, the correlation system comprises an array of correlation units similarly connected to the four input terminals for the system by means of which it is connected to the raster generator 68 and to the video processors 69*a* and 69*b*. For convenience of identification, the left video input signal line is denoted with the numeral 325, the right video input signal line is designated 326, and the *x* reference input and *y* reference input signal lines are respectively denoted with the numerals 327 and 328. As is evident in FIG. 3, the signal line 325 is connected to the left video processor 69*b* or to the output signal line 207*b* thereof; and in a similar manner, the signal line 326 is connected to the right video processor 69*a* or to the output signal line 207*a* thereof. The *x* and *y* reference input signal lines 327 and 328 are respectively connected to the output signal lines 130 and 129 of the raster generator 68.

The outputs of the correlation units are added together to provide 12 registration error signals, and each of such signals is transmitted through a low-pass filter network operative to smooth the signals and control the response and stability of each of the prime transformation correction channels. The 12 registration error signals constituting the output of the correlation system 70 are fed to the transformation system 71 heretofore described; and constitute the zero-order (*x* and *y* parallax) error signals delivered thereto on the signal lines 317 and 318, the first-order transformation error signals respectively fed thereto on the signal lines 291 through 294, and the second-order registration error signals respectively fed thereto on the signal lines 295 through 300. Accordingly, the output signal lines of the correlation system are respectively denoted with the same numerals.

Each of the individual correlation units in the correlation system 70 is operative upon a different portion of the video spectrum. In order to effect this selection, each correlation unit includes a band-pass filter for each video input thereto. Each of the band-pass filters limits the video signals available for use in the correlation function to a fraction of the video spectrum. In the particular instrument being considered, there are five correlation units respectively denoted with the numerals 329, 330, 331, 332, and 333. The unit 329 is adapted to accept for correlation usage video signals lying within a frequency band centered on approximately 80 kilocycles per second and extending from a lower limit of about 50 kilocycles per second to an upper limit of about 120 kilocycles per second. Similarly, the correlation unit 330 is adapted to accept for correlation usage video signals lying within a frequency band centered on approximately 170 kilocycles from a lower limit of about 120 kilocycles per second to an upper limit of about 220 kilocycles per second. In the same manner, the correlation units 331 through 333 are adapted to accept for correlation usage contiguous portions of the video spectrum (respectively centered on approximately 270 kilocycles, 800 kilocycles, and 1.7 megacycles) so that the correlation units collectively are sensitive to video input signals lying in the range from approximately 55 kilocycles per second (the lower limit of correlation unit 329) to an upper frequency limit of approximately 2.5 megacycles per second (representing the upper frequency limit of the correlation unit 333). It should be noted that all of the correlation units are identical in terms of both circuit and function except for the characteristics of the said band-pass filters. The correlation system 70 also includes a low-pass network for each registration error signal; and since there are 12 such signals, there are 12 low-pass networks which, for identification, are respectively designated with the numerals 334 through 345.

One of the correlation units comprised by the correlation system 70 is illustrated in FIG. 19, and may be taken to be any one of the correlation units 329 through 333 since, as stated hereinbefore, such units are all identical except for the band-pass filter networks included therein which makes the same selective to certain specific frequency ranges in the video spectrum. For purposes of specific identification, however, the correlation unit shown in FIG. 19 will be considered to be the unit 329 and is so designated in this figure.

The correlation unit comprises a group of modules that are symmetrically disposed with respect to the four input signals thereto. The video module to which the left and right video input signals are delivered from the video processors 69*b* and 60*a* is enclosed in chain links denoted with the numeral 346. The band-pass filters that determine the portion of the video spectrum to which the particular correlation unit is sensitive are located in the module 346 and are respectively denoted with the numerals 347 and 348. The video module comprises five functional components which, in addition to the band-pass networks 347 and 348, include zero-level discriminators 349 and 350 respectively connected to the band-pass networks through signal lines 351 and 352 and an exclusive OR-gate 353 which is connected to the outputs of the zero-level discriminators 349 and 350 by signal lines 354 and 355.

The band-pass networks 347 and 348 are completely conventional in design and simply operate to reject all of the frequencies of the video spectrum except those within a predetermined range or passband. In the case of the network 347, the video signals lying within such band are transmitted to the zero-level discriminator 349 via signal line 351; and in the case of the network 348, the video signals lying within such band are transmitted to the zero-level discriminator 350 via signal line 352. The output signals from the zero-level discriminators 349 and 350 are transmitted over signal lines 354 and 350 to the gate circuit 353—the output of which constitutes the output signal of the video module 346 and is transmitted over signal line 356 to a pair of analyzer modules respectively indicated by chain line units denoted 357 and 358.

Before proceeding with the discussion of the correlation unit in its entirety, it is believed that such discussion will be implemented by first considering in detail the operation of the zero-level discriminators 349 and 350 and then the operation of the exclusive OR-gate 353. Accordingly, reference will now be made to FIG. 20 which is a schematic circuit diagram of one of the zero-level discriminators (the discriminators 349 and 350 being identical)—the discriminator 349, for example.

The circuit of FIG. 20 includes a pair of transistors 359 and 360 which are connected as a common-emitter-limiting amplifier. The output signal of the circuit is taken from the collector of the transistor 360, which is connected to ground through a resistance 361, and appears on the aforementioned output signal line 354. The input to the circuit if fed thereto on the aforementioned signal line 351 which is connected to the base of the transistor 359 through a blocking capacitance 362. The input signal line 351 is connected to ground through a resistance 363, and a voltage divider comprising the resistances 364 and 365 determines the average voltage on the base of the transistor 359. As indicated hereinbefore, the emitters of the transistors are connected in common and are coupled to the voltage supply line 366 through a resistance 367. Such supply line is connected to the resistance 364 and is also connected to the voltage divider comprising the resistances 368 and 369 that bias the base of the transistor 360. The base of the transistor 360 is bypassed to ground by a capacitance 370.

In operation of the circuit, the voltage supply line 366 is connected to an external power source and is maintained at a potential of approximately 6 volts positive with respect to ground. The resistances 364 and 368 are approximately equal in value, as are the resistances 365 and 369; and the values are selected so that the bases of the transistors 359 and 360 are each maintained at a direct current potential of approximately 3 volts with respect to ground. The capacitance 370 in bypassing the base of the transistor 360 to ground stabilizes the potential on such base. The capacitance 362 prevents a direct current connection between the base of the transistor 359 and the input signal line 351 so that the potential established on the base of the transistor 359 by the voltage divider resistances 364 and 365 will not be disturbed by the flow of direct current to the input line 351 and external circuit connected thereto.

The current flowing through the resistance 367 will selectively flow through the transistors 359 and 360 depending upon which transistor base is more negative. If the bases are equally negative, then the current flowing through the resistances 367 will split evenly and flow equally through the two transistors. Any current flowing through the path defined by the resistance 367 and transistor 360 will also flow through the resistance 361 and thereby develop a potential drop thereacross which potential constitutes a positive output signal form the transistor 360.

The characteristics of the transistors 359 and 360 are such that a potential difference on the bases thereof of approximately 0.1 volt is sufficient to switch the path of the current flowing through the emitter resistance 367 completely to the transistor having the most negative base potential. Since the input signal to the circuit is applied to the base of the transistor 359 and is superimposed on the direct current potential applied to the base, also because the base of the transistor 360 is maintained at a constant potential with respect to ground, and further because the said direct current potential and said constant potential on the bases of the transistors are substantially equal, it is apparent that the current flowing through the resistance 367 will be switched alternately through the transistors 359 and 360 in response to the character of the input signal waveform transmitted over the input signal line 351 to the base of the transistor 359.

A typical waveform of such input signal is illustrated in FIG. 21 and is generally denoted with the numeral 371. Also illustrated in this Figure is the output waveform 372 which appears on the output signal line 354 and is the waveform of the voltage appearing across the collector resistance 361. The input and output waveforms 371 and 372 are related to each other in FIG. 21 in a time sense; and it is seen that the input signal alternates about the reference voltage (i.e., the DC potential on the base of the transistor 359) and that whenever the input signal is positive relative thereto, the output signal is positive by a predetermined fixed amount regardless of the magnitude of the positive input signal. Likewise, whenever the input signal is negative relative to the said reference voltage, the output signal will be zero regardless of the magnitude of the negative input signal. Further, whenever the input signal changes from positive to negative, the output signal switches abruptly from the positive state to the zero state. Contrariwise, whenever the input signal changes from negative to positive, the output signal switches abruptly from the zero state to the positive state.

Next to be described are the details of the exclusive OR gate 353. Such details are shown in the schematic circuit diagram of FIG. 22, and the function of the gate will be described with particular reference to that figure. It may be noted, however, that all of the exclusive OR gates used in the correlation unit shown in FIG. 19 are identical so that the following description applies to all of the gates.

The exclusive OR gate is seen to comprise five transistors respectively designated with the numerals 373, 374, 375, 376, and 377. The transistors are connected in a circuit network comprising four resistances 378, 379, 380, and 381. The inputs to the gate from the zero-level discriminators are applied via signal lines 354 and 355 to the respective bases of the transistors 373 and 374. The output signal from the gate appears on the output signal line 356 which is connected to the collector of the transistor 377. The circuit is adapted to be connected by a voltage supply sine 382 to an external power source of approximately 6 volts positive potential with respect to ground. Each of the resistances 378 through 381 is commonly connected to the voltage supply line 382 and is also separately connected to the collectors of the transistors so that each such resistance serves as a collector load for at least one transistor. In particular, the resistance 378 defines the collector load for the transistor 373, the resistance 379 constitutes the collector load for the transistor 374, the resistance 380 provides the collector load for the transistors 375 and 376 which have the collectors thereof connected in common, and the resistance 381 forms the collector load for the transistor 377.

The operation of the exclusive OR gate circuit 353 will now be described under various types of input signals supplied thereto on the signal lines 354 and 355. In this respect, the operation will be considered first that corresponds to a condition in which the potentials on both of the signal lines 354 and 355 are zero. This condition prevails whenever the output signals from the zero-level discriminators 349 and 350 are zero. In the condition in which the input signals on the lines 354 and 355 are both zero, there will be no base current flowing in the transistors 373 and 374, and therefore each of such transistors will be in the "off" position. That is to say, the collector currents thereof will also be zero. Consequently, no current will flow through the resistances 378 and 370 which constitute the loads for the transistors 373 and 374. Therefore, the voltage across these resistances will also be zero, and the potential on the lines 383 and 384—respectively connecting the resistance 378 to the collector of the transistor 373 and the resistance 379 to the collector of the transistor 374—will be positive and equal to the supply voltage.

Considering the transistors 375 and 376 under such conditions, it is clear that since the emitters and bases are in each instance at the same potential (namely, the value of the supply voltage appearing on the supply line 382), the collector currents through each of these transistors will be zero. Accordingly, the current flow through the resistance 380 resulting from the supply potential on the line 382 will flow into the base of the transistor 377 so that such transistor will be in the "on" condition, whereupon collector current will flow therein from the supply line 382 through the resistance 381. The resistances 380 and 381 are equal and have a value of approximately 2,000 ohms each. Therefore, under the condition in which the input signals on the lines 354 and 355 are both zero, the transistor 377 is said to be "saturated;" indicating that the collector thereof will assume a lower potential than the base thereof and typically 0.15 volt above zero. The signal level on the output signal line 356 will therefore be at 0.15 volt which, for purposes hereof, may be taken to be and will be called herein a zero output.

Operation of the exclusive OR gate circuit will now be considered under the conditions in which the input signals thereto are both positive. This condition will occur whenever the input to the zero-level discriminators 349 and 350 are both positive. It should be noted that the resistance values in the discriminators 349 and 350 are selected so that a positive output signal therefrom will be of sufficient magnitude to saturate the transistors 373 and 374 which are respectively connected to the discriminators via the signal lines 354 and 355. When such transistors are saturated, the potentials on the conductors 383 and 384 will fall to a value of approximately 0.5 volt as previous described for the transistor 377. Corresponding, current will flow through the resistances 378 and 379 in response to the positive potential maintained on the supply line 382. The potentials on the bases of the transistors 375 and 376 will likewise be at the saturation potential as a consequence of their direct connection to the collectors of the transistors 373 and 374 via the respectively associated conductors 383 and 384. The potentials on the emitters of the transistors 374 and 376 will be at the same saturation potential by virtue of their direct connection, respectively, to the collectors of the transistors 374 and 373.

Considering the transistors 375 and 376 under such conditions, it is clear that since the emitters and bases are in each instance at the same potential (namely, the saturation potential of approximately 0.15 volt), the collector current flowing through these transistors and bases will be zero. Accordingly, the current flowing through the resistance 380 by virtue of the positive supply potential on the line 382, will flow into the base of the transistor 377 and saturate the same; and as described before under the condition in which the signal inputs to the circuit are both zero, the resulting output voltage on the signal line 356 will be approximately 0.15 volt or the output will be zero.

Operation of the exclusive OR gate circuit will now be considered under the conditions in which one of the input signals thereto is positive and the other input is zero. By way of example, take the condition in which the signal on the line 354 is positive and the signal on the line 355 negative. Such positive input on the line 354 will be delivered to the base of the transistor 373 and will cause the transistor to become saturated so that the potential on the conductor 383 will be approximately 0.15 volt. The zero-signal potential on the conductor 355 will cause the transistor 374 to be cut off or nonconducting so that the potential on the conductor 384 will tend toward the supply voltage on the supply line 382 by virtue of the low current flow through the resistance 379.

Since the emitter of the transistor 376 is at a few tenths of a volt above zero and the base of the transistor is connected to the supply voltage through the resistance 379, base current will flow in the transistor 376 and saturate the same so that the collector thereof will be at a potential of approximately 0.15 volt above the potential of the emitter of the transistor 374 which, as previously established, is at a potential of approximately 0.15 volt above zero. Therefore, the collector of the transistor 376 and the base of the transistor 377 will be approximately 0.3 volt above zero; and under this condition, the transistor 377 will be nonconducting and the potential on its collector and on the output signal line 356 will be positive to an extent depending upon the external load connected to such signal line.

In a completely analogous manner, if the signal on the input line 354 is of zero potential and the signal on the input line 355 is positive, the transistors 374 and 375 will be saturated which will result in a potential on the base of the transistor 377 of approximately 0.3 volt above zero; and again, the transistor 377 will be in a nonconducting state and the output signal line 356 will be positive.

Summarizing the operation of the exclusive OR gate shown in FIG. 22: If the two input signals thereto on the signal lines 354 and 355 are both at zero potential or are both positive, then the potential on the output signal line 356 will be zero. If either of the input signals on the lines 354 and 355 is positive and the other zero, then the potential on the output signal line 356 will be positive. This summation is illustrated in table form in FIG. 23. It will evident that the gates employed herein (FIG. 22) are capable of very high-speed operation and accommodate the highest video frequencies encountered, i.e., 2.5 megacycles.

Considering the action of the exclusive OR gate together with the action of the two zero-level discriminators 349 and 350 in the video module 346, it will be apparent from the foregoing description that whenever the input signals on the lines 351 and 352 to the zero-level discriminators have the same polarity, then the output signal from the gate 353 appearing on the signal line 356 will be zero. Conversely, whenever the input signals to the discriminators 349 and 350 are of opposite polarity, the output signal from the gate 353 will be positive.

If the band-pass filter networks 347 and 348 are identical and provided that the left and right video input signals thereto appearing on the signal lines 325 and 326 are also identical (the input signals will be identical under conditions of perfect image registration), then the output of the gate 353 will be zero because the input signals to the zero-level discriminators 349 and 350 will have the same polarity.

It is anticipated, however, that the band-pass filter networks 347 and 348 will not be perfectly identical and, in fact, the passbands respectively defined by the networks 347 and 348 are staggered to the extent of approximately 30 percent of the bandwidth of such filter networks. Consequently, identical signals delivered on the input signal lines 325 and 326 to the respective band-pass filter networks will result in signals on the lines 351 and 352 to the zero-level discriminators which are in phase quadrature. FIG. 24 illustrates the action of the video module 346 under conditions of identical input signals thereto on the lines 325 and 326 from the left and right video processors **69*b* and 69*a*, and with the band-pass filter networks 347 and 348** producing output signals that are in a phase quadrature relationship because of the staggered passbands of the filter networks.

FIG. 24 shows the left and right video signals on the input signal lines 325 and 326 to the band-pass filter networks, on the input signal lines 351 and 352 to the zero-level discriminators, on the input signal lines 354 and 355 to the exclusive OR gate, and on the output signal line 356 from the gate. For convenience, the respective signal waveforms are identified in FIG. 24 by the numbers applied to the signal lines on which they appear, and are related to each other in a time sense. It can be seen that under the stated conditions of identical input signals on the lines 325 and 326 and the development of a phase quadrature relationship (by means of the filter networks 347 and 348) in the signals appearing on the lines 351 and 352, the output of the gate appearing on the signal line 353 will be alternately positive and zero with approximately equal time periods spent in each condition.

FIG. 25 illustrates the relative relationship of the same waveforms shown in FIG. 24 but at a condition in which the right video input signal on the line 326 lags the left video input signal on the line 325 to an extent that the phase relationship between the signals on the lines 351 and 352 (the output signals of the band-pass networks 347 and 348) is tending toward zero degrees. Under such conditions, the output signal on the line 356 will alternate between positive and zero values, but with a greater period of time spent in the zero condition than in the positive condition. In FIG. 26, the relationship is depicted in which the left video input signal on the line 325 lags the right video input signal on the line 326 to the extent that the signals on the lines 351 and 352 are approaching a 180° phase relationship. Under these conditions, the output signal on the line 356 alternates between positive and zero values but with a greater period of time spent in the positive condition.

It is seen then that the video module 346 delivers an output signal on the line 356 having characteristics which are dependent upon the relative timing between the video input signals on the lines 325 and 326. In particular, if the left video input signal is lagging the right video input signal, the output signal waveform on the line 356 will be predominantly positive. Conversely, if the right video input signal is lagging the left video input signal, the output signal waveform on the line 356 will be predominantly zero.

Referring to FIGS. 3 and 18 in particular, it is seen that the *x* reference signal input to the correlation system is derived from the raster generator 68 and is applied to each of the correlation units from the *x* reference input signal line 327. Similarly, the *y* reference signal input is derived from the raster generator and is applied to each of the correlation units from the *y* reference input signal line 328. The *x* and *y* reference input signals are replicas of the current waveforms in the respective *x* and *y* deflection coils of the viewer cathode-ray tubes 75*a* and 75*b*. Since the coordinate position of the scanning spot in the raster is at any instant substantially a linear function of the *x* and *y* deflection coil currents, the *x* and *y* reference signals on the lines 327 and 328 respectively represent the instantaneous position of the scanning spot raster in a Cartesian coordinate system having its origin at the center of the raster. Consequently, the sign and amplitude of the *x* reference signal on the input line 327 specifies the position of the scanning spot within the raster in the *x*-coordinate direction. Correspondingly, the sign and amplitude of the *y* reference signal on the input line 328 specifies the position of the scanning spot within the raster in the *y*-coordinate direction.

Referring to FIG. 19, it is seen that the *x* reference signal constituting one of the inputs to the correlation unit 329 is fed to a delay line 395, which delivers at the output signal line 386 a delayed replica of the *x* reference signal waveform. Similarly, the *y* reference signal constituting one of the inputs to the correlation unit 329 is fed to a delay line 387, which delivers at the output signal line 388 a delayed replica of the *y* reference signal waveform. The purpose of the delay lines 385 and 387 is to compensate for the delays in the video signals that occur in the video module 346. As a result of the delay lines 385 and 387, the *x* and *y* reference signals appearing on the signal lines 386 and 388 represent accurately in point of time the position of the scanning spot giving rise to the parallax information from the video module 346 appearing on the output signal line 356 thereof.

The delay lines 385 and 387 may be conventional and may take the form of the lumped-constant, low-pass type of delay line illustrated in FIG. 27. The design of such a delay line is convention in every respect, and the design procedures may be used which are found in the literature as, for example, a book entitled "Pulse and Digital Circuits" by Millman and Taub, chapter 10, section 2. For convenience, however, the illustration of FIG. 27 is included, and the typical delay line depicted thereby comprises a plurality of inductances, respectively designated by the numerals 389 through 392, connected in series with the input signal line 327 and output signal line 386. Connected between the successive junctures of such inductances are a plurality of capacitances to ground, respectively denoted 393 through 395. Any number of inductance-capacitance sections may be used in order to obtain the delay interval required for matching with the delay that occurs in the video module 346.

Referring again to FIG. 19, the delayed *x* reference signal appearing on the line 386 is delivered to a differentiator 396. Similarly, the delayed *y* reference signal on the line 388 is delivered to a differentiator 397. The function of each of the differentiators 396 and 397 is to transmit a differentiated signal waveform representing the scanning spot velocity in the *x* and *y* directions separately. Since the *x* reference signal represents the scanning spot position at any instant, the first derivation with respect to time of such *x* reference signal as provided by the differentiator 396 will represent the scanning spot velocity at the same instant of time. Similarly, the derivation of the *y*-scanning signal as provided by the differentiator 397 will represent the scanning spot velocity in the *y* direction at any instant. In the case of the differentiator 396, the signal output therefrom is transmitted over a signal line 398 to an exclusive OR-gate 399 comprising a part of the analyzer module 357; and in the case of the differentiator 397, the signal output therefrom is transmitted over a signal line 400 to an exclusive OR-gate 401 comprising a part of the analyzer module 358.

For convenience, a schematic circuit diagram of a differentiator circuit suitable for use herein is illustrated in FIG. 28. The differentiators 396 and 397 are identical, and therefore the circuit shown in FIG. 28 applies equally to both. For terms of description, however, the circuit may be assumed to be the differentiator 396, in which event an input signal is delivered thereto by the signal line 386 and the output therefrom is transmitted to the gate 399 over a signal line 398.

By comparing the differentiator circuit shown in FIG. 28 with the zero-level discriminator circuit illustrated in FIG. 20, it will be evident that the two circuits are nearly identical; and indeed, the transistors 402 and 403 function together as a limiting amplifier, and the description of the circuit shown in FIG. 20 applies equally well to the circuit of FIG. 28. The essential difference is that the input capacitance has different values in each case; and in particular, the input capacitance 404 of the differentiator circuit 396 is of much lower value and therefore provides a higher reactance than the equivalent capacitance 362 in the discriminator circuit of FIG. 20. As a result of the high-capacitive reactance of the capacitance 404, most of the scanning reference signal voltage delivered to the differentiator by the input signal line 386 appears across the capacitance 404 so that a greatly attenuated waveform appears on the signal 405 and on the base of the transistor 402.

The waveforms associated with the differentiator circuit are illustrated in FIG. 29; and in comparing the same, it will be noted that the waveform on the signal line 405 is considerably smaller than the waveform delivered to the differentiator on the line 386. Further, the triangularly shaped input waveform on the line 386 has been converted on the line 405 to a low-amplitude square-shaped waveform. Thus, the waveform on the signal line 405 is essentially the first derivative with respect to time of the input waveform appearing on the line 386. The action of the capacitance 404 together with the following resistances 406 and 407—which are each connected to the signal line 405 and are respectively connected to the voltage supply line 408 and to ground—in producing a differentiated waveform is well known in the art, and a detailed description of such action is available in the literature. See, for example, the text entitled "Pulse and Digital Circuits," Millman and Taub, chapter 2, section 2.

The differentiated waveform appearing on the signal line 405 is amplified by the limiting amplifiers 402 and 403 to deliver an amplified replica of the differentiated waveform on the output signal line 398, which signal line is connected to the collector of the transistor 403. A limiting amplifier rather than a linear amplifier is employed in the circuit of FIG. 28 in order that irregularities in the slopes of the input signal on the line 386 (and which would appear as irregularities in the amplitude of the derivative signal on line 405) will be obviated by the action of the limiting amplifier and will not appear in the output signal waveform (FIG. 29) on the line 398. As is evident by inspection of FIG. 28, the emitters of the transistors 402 and 403 are connected in common and are connected to the voltage supply line 408 through a resistance 409, the base of the transistor 403 is connected to a voltage divider network comprising the series resistances 410 and 411 (the last of which is bypassed to ground by a capacitance 412), and the collector of the transistor 403 is grounded through a resistance 413.

The analyzer modules 357 and 358 are essentially identical, and a schematic circuit diagram equally applicable to each is illustrated in FIG. 30 and, for purposes of specific identification, may be taken to be the analyzer module 357. This module comprises seven transistors respectively denoted with the numerals 414, 415, 416, 417, 418, 419, and 420, six resistances respectively denoted 421, 422, 423, 424, 425, and 426, and a diode 427.

As is evident in FIG. 19, the analyzer module 357 includes the aforementioned exclusive OR gate 399 and an amplifier 428 connected to the output thereof. The exclusive OR-gate 399 is identical in both circuit and function with the exclusive OR-gate 353 heretofore described and illustrated in FIG. 22.

Consequently, the exclusive OR gate portion of the analyzer module 357 will not be described further; and for convenience, the circuit as shown in FIG. 30 is divided into two sections respectively corresponding to the exclusive OR-gate 399 and to the amplifier 428. By comparing the exclusive OR-gate 353 as shown in FIG. 22, it will be OR-gate that the two circuits are identical.

The amplifier 428 constitutes an emitter-coupler or current mode amplifier which yields a current of predetermined magnitude on the output signal line (identified hereinbefore as signal line 317') whenever the output of the exclusive OR gate is positive. In the circuit of FIG. 30, the output of the gate 399 is made separately available for connection to external circuitry via the conductor 429 which is connected in common with the output of such gate to the base of the transistor 419, which base defines the input to the amplifier 428.

An external power supply maintains a potential of approximately 6 volts positive with respect to ground on the conductor 430. The diode 427 is connected between such conductor and ground in series with the resistance 426, and the diode develops a potential at the juncture thereof with the resistance 426 of approximately 0.8 volt by virtue of the current flowing through it, as determined by the value of such resistance and the applied potential on the conductor 430. The potential developed by the diode 427 is applied to the base of the transistor 420, and when the output of the exclusive OR gate 399 is zero (representing the condition in which the transistor 418 is saturated), the base of the transistor 419 will be approximately 0.15 volt with respect to ground while the base of the transistor 420 will be at 0.8 volt as determined by the diode 427. Under these conditions, the current flowing through the resistance 425 will flow through the transistor 419 and from the collector thereof to ground.

In the alternate condition in which the output of the exclusive OR-gate 399 is positive (representing a condition in which the transistor 418 is nonconducting), the base of the transistor 419 will be connected to the supply conductor 430 through the resistance 424 and, therefore, the base will be at a potential of approximately +6 volts. Under these conditions, the current flowing in the resistance 425 will flow through the transistor 420 and through its collector to the output signal line 317'; and, therefore, the current signal delivered to the external circuit via the output signal line 317' will be a replica of the voltage constituting the output of the exclusive OR-gate 399 present on the output conductor 429 and on the base of the transistor 419. Further, the magnitude of the current flowing in the signal line 317' when the gage is in the positive output condition thereof is determined by the value of the resistance 425 and the potential on the conductor 430.

It may be noted that it is necessary for proper operation of the output amplifier stage comprising the transistor 420 that the collector thereof be maintained at a negative potential with respect to its base of at least 0.2 volt. With the maintenance of such relative potential between the base and collector of the transistor 420, the analyzer module 357 appears to the external circuitry connected thereto as a very high-impedance generator and is, therefore, an approximation of a current source.

The action of the correlation unit 329, and in particular the action of the analyzer modules 357 and 358 thereof, will be considered in the presence of parallax between the right and left photographic images being scanned by the flying spot scanners 74*a* and 74*b*. As in the case of the description of the video module 346, simplified video waveforms will be assumed, and specifically sinusoidal waveforms having a frequency close to the center of the passband of the correlation unit under consideration (approximately 80 kilocycles in the case of the correlation unit 329).

The function of the analyzer modules 357 and 358 is to respectively translate the composite parallax signal present on the output signal line 356 from the video module 346 into coherent $x$ and $y$ parallax signals. Considering first the module 357, it will be apparent that the input signals thereto constitute the output signal of the video module 346 (which is transmitted over a signal line 356 from the exclusive OR-gate 353 thereof) and the differentiated $x$ deflection reference signal which is transmitted over the signal line 398 from the differentiator 396.

Figures 31, 32, 33, 34:
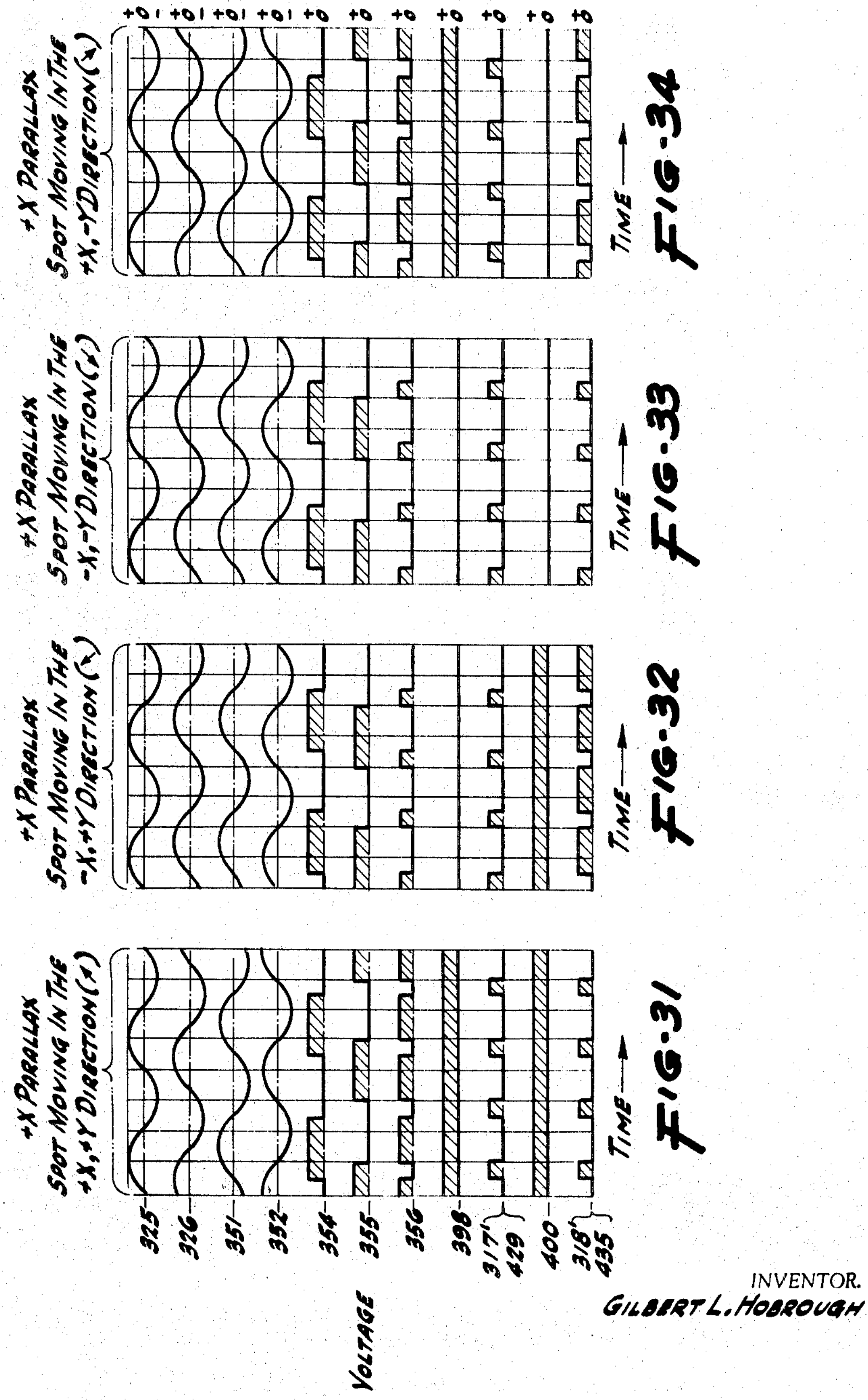

FIGS. 31 through 34, inclusive, constitute a table of waveforms depicting the signals at the video module 346 and at the analyzer modules 357 and 358 in the presence of positive $x$ parallax between the right and left photographic images being scanned. The waveforms are respectively identified in each of FIGS. 31 through 34 by the signal lines on which they appear. FIG. 31 illustrates the waveforms whenever the scanning spot is moving in the $+x$, $+y$ direction, FIG. 32 illustrates the waveforms whenever the scanning spot is moving in the $-x$, $+y$ direction, FIG. 33 illustrates the waveforms whenever the scanning spot is moving in the $-x$, $-y$ direction, and FIG. 34 illustrates the waveforms whenever the scanning spot is moving in the $+x$, $-y$ direction. Since the scanning spot is constrained by the nature of the dual-diagonal scanning raster (FIGS. 6 through 8 and 13) to move only in these four diagonal directions, FIGS. 31 through 34 illustrate the waveforms in the presence of $+x$ parallax under all possible scanning conditions.

It should be explained that the parallax assumed to exist between the right and left photographic images being scanned by the flying spot scanners 74*a* and 74*b* is oriented, for purposes of this discussion, in a Cartesian coordinate system intended in the illustration of FIG. 1 and effectively depicted therein by the undistorted or nontransformed images indicated by broken lines. Thus, the corresponding or homologous points in a pair of stereographic transparencies being scanned may be located by giving the $x$- and $y$-coordinates thereof as such coordinates relate to such Cartesian system. Therefore, the magnitude of any parallax existing between such two points may be specifically identified in terms of $x$- and/or $y$-coordinate numbers.

For example, if a specific point in the right photographic transparency is properly identified by the coordinate values $x_1=4$, $y_1=4$, and if the corresponding point in the left photographic transparency is properly identified as $x_2=2$, $y_2=2$, then relative parallax exists between such two points in both the $x$ and $y$ directions and is specifically identifiable as $x_p=2$, $y_p=2$. However, the sign of $x_p$ and $y_p$ will depend upon whether the parallax is taken to be that of the right image point with respect to the corresponding left image point, or vice versa. In the first instance, the relative displacement would be positive, and in the second instance it would be negative. For purposes hereof, a displacement of the left video image toward the right or in the $+x$ direction, considering the aforementioned Cartesian coordinate system illustrated in FIG. 1, is taken to be a $+x_p$ parallax; and a displacement of the left video image upwardly or in the $+y$ direction with respect to such coordinate system is taken to be a $+y_p$ parallax.

Referring to FIGS. 31 through 34, it can be seen that the phase relationship between the input waveforms to the video module appearing on the left and right signal lines 325 and 326 is dependent, in the presence of parallax, upon the direction of movement of the scanning spot. Consequently, and considering the condition of $+x$ parallax, the left video signal appearing on the line 325 lags the right video signal appearing on the line 326, as illustrated in FIGS. 31 and 34, when the direction of movement of the scanning spot is effectively in the $+x$ direction. However, when the direction of movement of the spot is effectively in the opposite or $-x$ direction, the left video signal appearing on the line 325 leads the right video signal appearing on the line 326, as illustrated in FIGS. 32 and 33.

Contrariwise, and considering a condition of $+x$ parallax, the phase relationship between such input signals is not dependent upon the direction of movement of the scanning spot in the $y$ direction. More particularly, the average value of such input signals, as evidenced by the output signal of the video module appearing on the line 356, is dependent upon the direction of movement of the scanning spot in the $x$ direction and is independent of the direction of movement thereof in the $y$ direction. The waveform on the signal line 317', which represents the output of the analyzer module 357, is seen to have a low average value under the four possible directions of scanning motion. The waveform on the signal line 318' which represents the output of the analyzer module 358 is seen to have a low average value in FIGS. 31 and 33 and a high average value in FIGS. 32 and 34. Since the effective output of each analyzer module is the average value of its output signal waveform, it can be seen that the output from the the analyzer module 358 appearing on line 318' has a median average value representing a zero $y$ parallax error signal, and that the output from the analyzer module 357 appearing on the line 317' has a low average value defining a $+x$ parallax error signal associated with the $+x$ parallax being sensed.

Figures 35, 36, 37, 38:
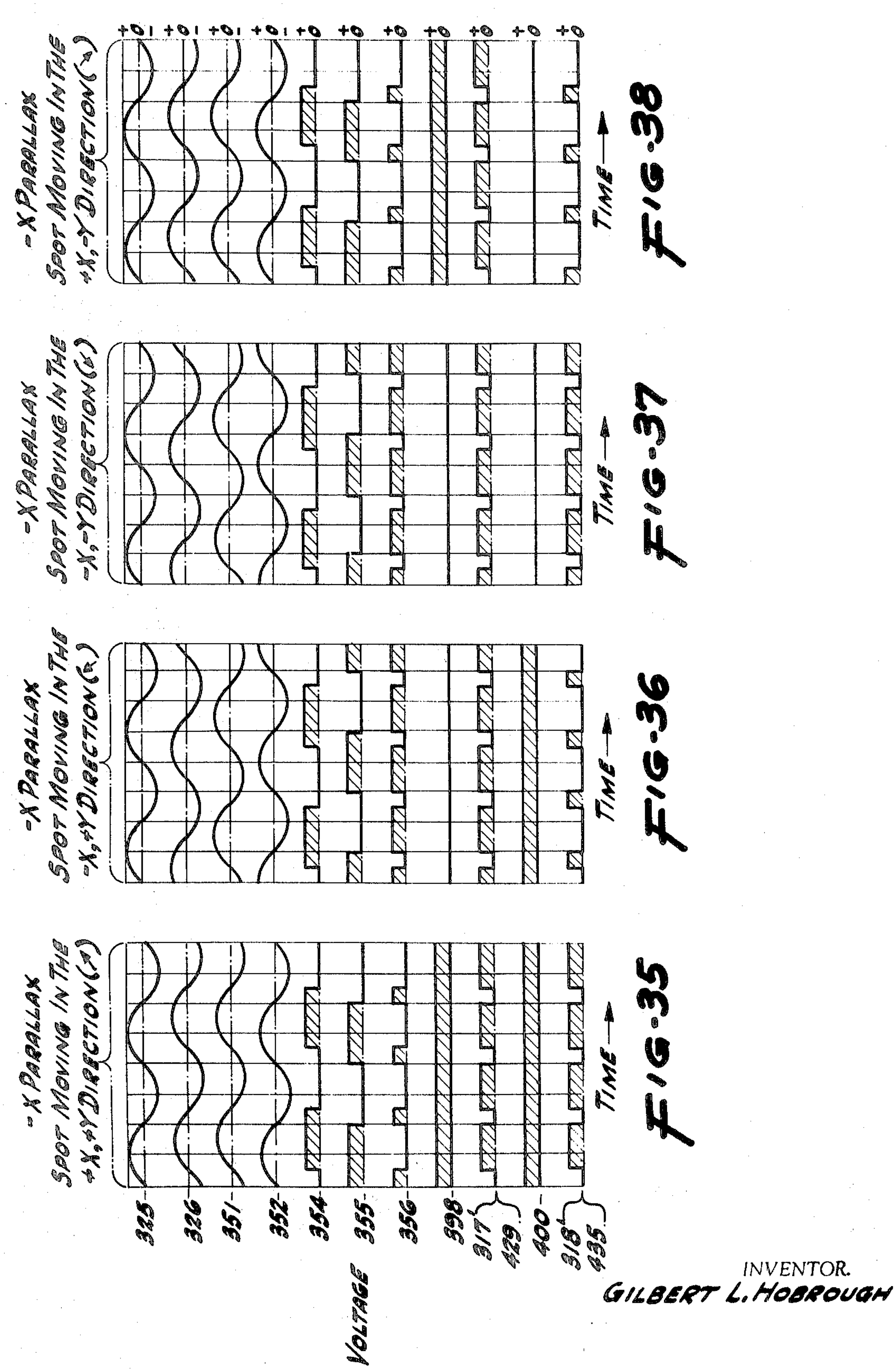

FIGS. 35 through 38, inclusive, constitute a table of waveforms similar to those illustrated in FIGS. 31 through 34, but represent the situation in which there is parallax between the images being scanned in a direction opposite to the parallax represented by the waveforms in FIGS. 31 trough 34, or negative $x$ parallax. Accordingly, the left video signal appearing on the line 325 leads the video signal appearing on line 326 when the scanning spot is moving in the $+x$ direction as shown in FIGS. 35 and 38. Correspondingly, the left video signal lags the right video signal as shown in FIGS. 36 and 37 when the direction of movement of the scanning spot is effectively in the $-x$ direction. It can be seen, then, that under such condition of $-x$ parallax, the output signal on the line 317' from the analyzer module 357 has a high average value defining a negative error signal in the $x$ parallax channel, and that this average value is maintained throughout all four directions of motion of the scanning spot. Contrariwise, the output of the analyzer module 358 appearing on the signal line 318' has alternately high and low average values resulting in an overall median average value defining a zero error signal in the $y$ parallax direction.

Figure 42:
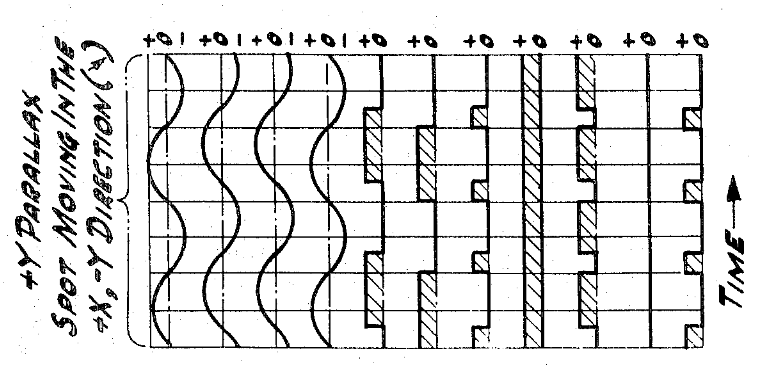
Figure 41:
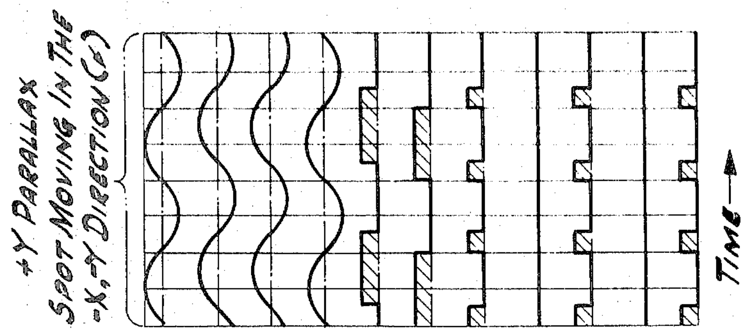
Figure 40:
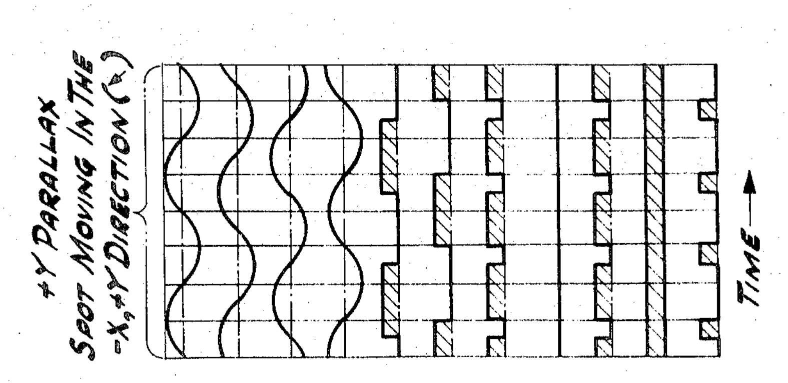
Figure 39:
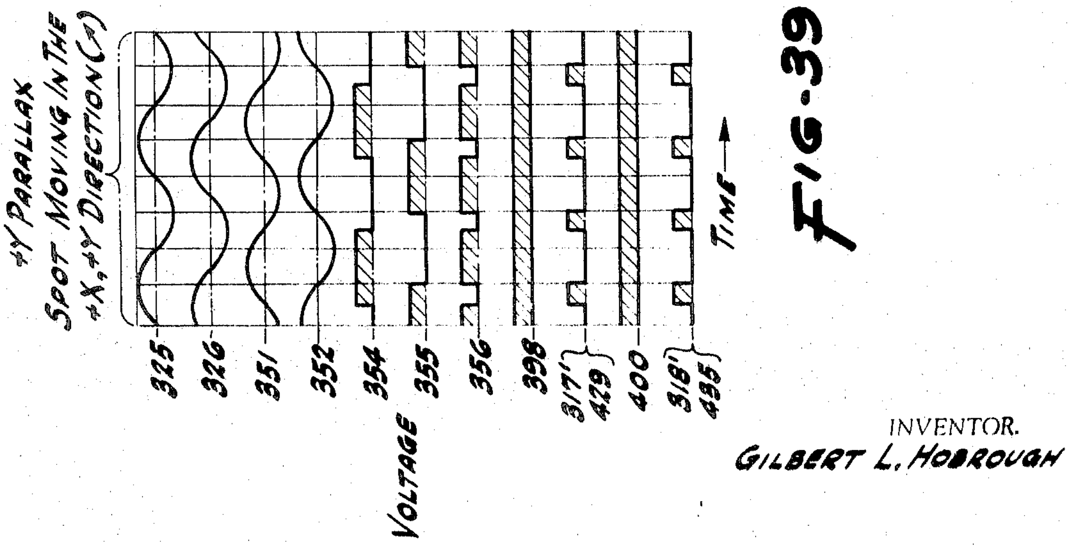
Figures 43, 44, 45, 46:
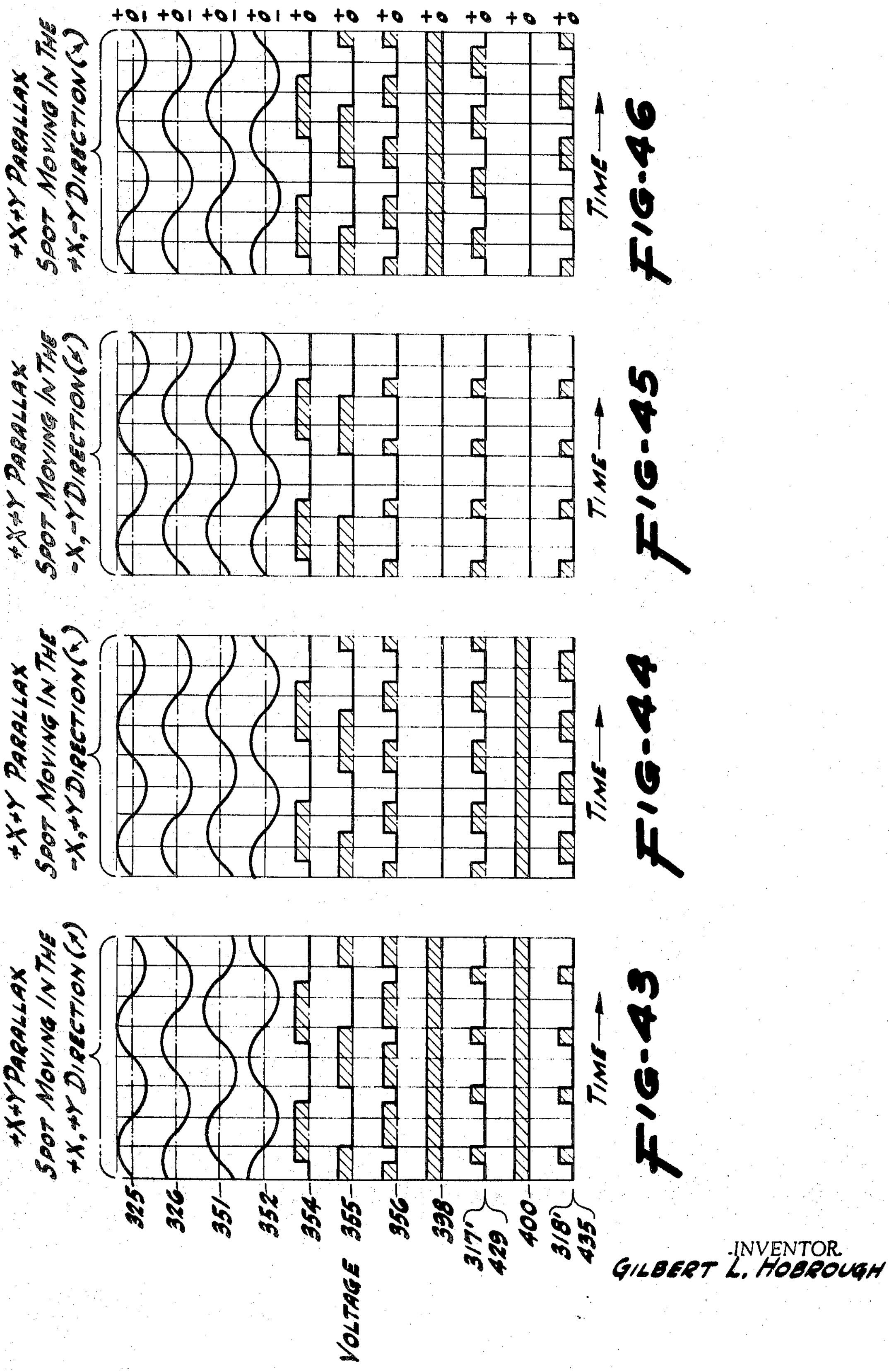

FIGS. 39 through 42, inclusive, illustrate the waveforms associated with the video module 346 and analyzer modules 358 and 358 under conditions of a $+y$ parallax displacement between the two photographic images being scanned by the scanner tubes 74a and 74b. As indicated hereinbefore, the direction of $+y$ parallax is taken to be such that the left video signal on the line 325 lags the right video signal appearing on the line 326 when the scanning spot is effectively moving in the $+y$ direction, as illustrated in FIGS. 39 and 40. Correspondingly then, the left video signal leads the right video signal when the scanning spot is effectively moving in a $-y$ direction, as illustrated in FIGS. 41 and 42. In the case of a $+y$ parallax, the output from the analyzer 357, which output appears on the signal line 317' and represents $x$ parallax, alternates between low and high average values, giving an effective median average output defining a zero error signal output fur the $x$ parallax channel. It can also be seen that the output from the analyzer module 358, which appears on the signal line 318' and represents $y$ parallax, has a low average value under all four directions of movement of the scanning spot defining a positive $y$ parallax error signal.

FIGS. 43 through 46, inclusive, constitute a table of waveforms associated with the video module 346 and analyzer modules 357 and 358 under conditions of combined $+x$ and $+y$ parallax. Comparing these figures, it will be seen that the outputs of the analyzer modules 357 and 358 respectively appearing on signal lines 317' and 318' have a low average value under the two conditions in which the direction of movement of the scanning spot is in the $+x$, $+y$ and $-x$, $-y$ directions respectively illustrated in FIGS. 43 and 45, and have a median average value in the other two scanning directions respectively illustrated in FIGS. 44 and 46. Therefore, the effective outputs of the analyzer modules 357 and 358 under conditions of a $+x$, $+y$ parallax are both below median value when averaged in all four directions of movement of the scanning spot; and, consequently, both the $x$ parallax error signal appearing on the line 317' and the $y$ parallax error signal appearing on the line 317' represent the positive parallax error in both the $x$ and $y$ channels.

It will be apparent from the foregoing discussion that the analyzer modules 357 and 358 function in entirely analogous manners in accommodating $-y$ parallax, $-x$, $-y$ parallaxes and the various possible combinations of $\pm x$ and $\pm y$ parallaxes. Accordingly, specific descriptions of these cases have been omitted as unnecessary to a complete understanding of the function of the correlation unit in providing appropriate parallax error signals on the output signal lines 317' and 318'.

Summarizing, the analyzer module 357 delivers an $x$ parallax error signal on the line 317' representative of the parallax between the left and right photographic images being scanned in the $x$ direction but not representative of any parallax existing between such two images in the $y$ direction. Similarly, the analyzer module 358 delivers a $y$ parallax error signal on the line 318' representative of the parallax between the left and right photographic images being scanned in the $y$ direction but not representative of any parallax existing between such two images in the $x$ direction. In the absence of average $x$ and $y$ parallax distortions, the signal on the line 356 will alternate between zero and positive for substantially equal periods, thereby representing a median signal. Therefore, the output of the analyzer module 357 will also have a median value regardless of the character of the reference signal present on the line 398, thereby representing a condition of zero $x$ parallax. Similarly, the output from the analyzer module 358 will have a median value regardless of the character of the reference signal present on the line 400, thereby representing a condition of zero $y$ parallax. Also, it will be apparent that increasing values of $x$ and $y$ parallax distortions result in an increasing departure from a median signal on the line 356 and a correspondingly increasing departure from a median signal on the line 317', in the case of $x$ parallax, and on the line 318', in the case of $y$ parallax. Therefore, the sign and magnitude of the output signals on the lines 317' and 318' are truly representative, respectively, of the direction or sign and the magnitude of the $x$ parallax distortion and $y$ parallax distortion between any left and right photographic images being scanned by the flying spot scanners 74a and 74b.

The action of the correlation unit 329 illustrated in FIG. 19 has been described under various conditions of parallax between the left and right photographic transparencies being scanned and in the various directions of parallax between the left and right photographic transparencies being scanned and in the various directions of movement of the scanning spot. Referring to FIG. 18, it is seen that the corresponding outputs of the correlation units 329 through 333 (which, as heretofore explained, are identical in function except for the specific frequency portions of the video spectrum on which they operate) are added together and the summed output is applied to a low-pass filter network. Each of the low-pass networks 334 through 345, inclusive, is an averaging network which smoothes the error signals delivered thereto from the associated analyzer modules so that the output signal from the filter network is in each case the average value of the signals from the analyzer modules in all of the correlation units connected to any particular low-pass network.

Specifically, the output of the $x$ parallax analyzer module 357 of each of the correlation units 329 through 333 is connected to the input of the $x$ parallax low-pass network 334. Likewise, the output of the $y$ parallax analyzer module 358 in each of such correlation units is connected to the input of the $y$ parallax low-pass network 335. If the video signals representing the left and right images being scanned have frequency components lying within the passband of several of the correlation units comprised by the correlation system 70, then each such unit will contribute a signal output constituting a portion of the combined registration error signal available at the corresponding output terminal of the correlation system. Conversely, if the video signals representing the left and right images being scanned contain frequencies lying within the passband of only one correlation unit, then the registration error signal appearing at the corresponding output terminal of the correlation system will be derived entirely from such one correlation unit. Due to the combined action of the several correlation units, a greater degree of reliability is obtained in the registration error signals than would be the case of only one correlation unit were to be used.

The action of the correlation unit 329 has been described in producing *x* and *y* parallax error signals, and the action of the unit 329 will now be described under conditions of relative distortion between the left and right images being scanned so that a registration error signal should be produced which will represent the particular distortion existing between such scanned images. In general, it may be stated that the presence of relative distortion between the images being scanned causes fluctuating parallax conditions to exist even after the average *x* and *y* parallaxes have been reduced to zero. For example, if an *x* scale discrepancy exists between the left and right images being scanned, then a fluctuating *x* parallax signal will be developed by the analyzer module 357 (FIG. 19).

As shown in FIG. 19, and as indicated in FIG. 30, the analyzer module 357 not only provides an output signal from the amplifier 428 thereof to the signal line 317' but it also provides an output signal directly from the exclusive OR-gate 399 which appears on the signal line 429. This signal line leads to an analyzer module 431, and in particular to an exclusive OR-gate 432 defining the input stage thereto. The function of the analyzer module 431 is to develop an *x* scale error signal from the nonamplified, *x* parallax signal from the analyzer module 357. In an analogous manner, if a *y* scale discrepancy exists between the left and right images being scanned, then a fluctuating *y* parallax signal will be developed by the analyzer module 358 (FIG. 19).

As shown in FIG. 19, the analyzer module 358 not only provides an output signal from the amplifier 433 thereof to the signal line 318', but it also provides an output signal directly from the exclusive OR-gate 434 which output from the gate appears on the signal line 435. This signal line leads to an analyzer module 436, and in particular to an exclusive OR-gate 437 defining the input stage thereto. The function of the analyzer module 436 is to develop a *y* scale error signal from the nonamplified, *y* parallax signal from the analyzer module 358.

The correlation unit 329 also includes a pair of analyzer modules 438 and 439 respectively comprising exclusive OR-gate 440 and 441. The gate 440 is connected to the signal line 429 from the analyzer module 357 (the gate 399 thereof), and the gate 441 is connected to the signal line 435 from the analyzer module 358 (the gate 434 thereof). The analyzer modules 438 and 439 respectively detect the presence of *x* skew and *y* skew distortions resulting from the *x* parallax signal on the signal line 429 being a function of the scanning spot position in the *y* direction, and resulting from the *y* parallax signal on the signal line 435 being a function of the scanning spot position in the *x* direction. For purposes of specifically designating the amplifier components of each of the analyzer modules 431, 436, 438, and 439, such amplifiers are respectively denoted with the numerals 442, 443, 444, and 445.

Referring to FIG. 19, the analyzer modules 431, 436, 438, and 439 respectively develop the first-order registration signals denoted *x* scale, *y* scale, *x* skew and *y* skew. In performing such functions, the analyzer modules 431 and 438 receive as one of the input signals thereto the *x* parallax signal output from the analyzer module 357 appearing on the signal line 429 therefrom. Similarly, the analyzer modules 436 and 439 receive as one of the input signals thereto the *y* parallax signal output from the analyzer module 358 appearing on the signal line 435 therefrom. The analyzer modules 431 and 439 receive as the other input signals thereto the undifferentiated *x* reference signal appearing on the signal line 446 which is connected to the output signal line 386 from the delay circuit 385 through a limiting amplifier 447 operative to shape and limit the amplitude of the signal on the line 386. Similarly, the analyzer modules 436 and 438 receive as the other input signals thereto the undifferentiated *y* reference signal appearing on the signal line 448 which is connected to the output signal line 388 from the delay circuit 387 through a limiting amplifier 449 operative to shape and limit the amplitude of the signal on the line 388. The limiting amplifiers 447 and 449 are identical in circuit detail and function to the zero-level discriminator previously described in connection with FIG. 20, and the waveforms illustrated in FIG. 21 may be taken to specifically apply to the limiting amplifier 447.

In this respect, the signal input to the limiting amplifier 447 appearing on the line 386 is proportional to the *x*-coordinate of the scanning spot at any instant. As indicated in FIG. 21, indicates output signal from the limiting amplifier 447 appearing on the line 446 has a constant positive value whenever the input signal is of positive polarity, and the output signal has a zero value whenever the input signal to the amplifier is of negative polarity. The signal on the line 446 constituting the output of the limiting amplifier indicates, therefore, only that the scanning spot is either in the right half (first and fourth quadrants) or the left half (second and third quadrants) of the raster. Similarly, and in a completely analogous manner, the action of the limiting amplifier 449 indicates only that the scanning spot is in the upper half (first and second quadrants) or the lower half (third and fourth quadrants) of the raster.

In describing the action of the analyzer modules 431, 438, 439, and 436, the nature and polarities of the parallax and reference signals to the analyzer modules will be separately considered in each case in the four quadrants of the scanning raster and in the presence of relative distortion between the left and right photographic images appropriate to the specific analyzer module in each instance.

As shown in FIG. 19, the module 431 delivers an *x* scale registration error signal to the line 291', and receives as its inputs the *x* parallax signal delivered thereto on the line 429 and the undifferentiated but shaped and limited *x* reference signal delivered thereto on the line 446. Consider first the position of the scanning spot to be in the first or fourth quadrants of the scanning raster, and referring to FIG. 1*a*, it will be seen that the *x* parallax signal will be positive in these quadrants. Therefore, the *x* parallax signal on the line 429 will be predominantly zero, as shown in FIGS. 31 through 34, for a condition of positive *x* parallax. Since the first and fourth quadrants involve only positive *x*-coordinate values, the *x* position signal on the line 386 will be positive, as will the output signal of the limiting amplifier 447 appearing on the signal line 446. Under these conditions, the analyzer module 431 will have as its inputs a positive reference signal delivered thereto by the signal line 446 and a predominantly zero signal delivered thereto on the line 429. In accordance with the operation of the exclusive OR gate in the analyzer module 431 (identical to the operation of the gate 353 illustrated in FIG. 22, and corresponding to the input and output conditions thereof summarized in FIG. 23), the output signal from the analyzer module 431 appearing on the line 291' under such conditions will be predominantly positive, defining a condition of positive *x* in *x* or *x* scale distortions.

Considering next that the scanning spot is moving in the second or third quadrants of the raster, and since the second and third quadrants both represent negative *x*-coordinate values, the *x* position reference signal on the line 387 will be negative but the output signal of the limiting amplifier 447 appearing on the signal line 446 will then be zero. Referring to FIG. 1*a*, it is seen that the *x* parallax signal will be negative in the second and third quadrants of the raster, and therefore, the *x* parallax signal on the line 429 will be predominantly positive, as shown in FIGS. 35 through 38 for conditions of negative *x* parallax. In accordance with the operation of the exclusive OR gate in the analyzer module 357 (refer to the operation of the gate 353 in FIGS. 22 and 23), the output signal from the analyzer module 431 appearing on the line 291' under such conditions will be predominantly positive, representing a condition of positive $x$ in $x$, or $x$ scale distortion. Evidently then, the output of the analyzer module 431 will be consistently positive under these conditions regardless of the quadrant in which the scanning spot is located, and therefore the signal on the line 291' is truly representative of positive $x$ scale distortion.

Whenever the $x$ scale distortion is of opposite sign (that is, negative $x$ scale distortion), as would be represented in FIG. 1*a* of the width of the raster therein illustrated were less than the height (that is to say, the $x$-direction width of the raster is contracted rather than expanded), the $x$ parallax is negative in the first and fourth quadrants and positive in the second and third quadrants. In the first and fourth quadrants, therefore, the input to the analyzer module 431 will be positive on the signal line 446 representing a positive $x$-coordinate position, and predominantly positive on the signal line 429 defining a negative $x$ parallax. Under such conditions, and in accordance with the operation of the analyzer module 431, the output thereof on the signal line 291' will be predominantly zero thereby representing a negative $x$ scale distortion. Likewise, with the scanning spot in either the second or third quadrants of the raster, the $x$-coordinate signal appearing on the line 446 will be zero representing negative $x$-coordinate values, and the parallax signal on the line 429 will be predominantly zero representing negative $x$ parallax. Therefore, the output of the module 431 appearing on the signal line 291' would again be predominantly zero representing a negative $x$ scale distortion.

In the absence of $x$ scale distortion between the photographic images being scanned, and assuming that all other distortions have been corrected or are nonexistent, the signal appearing on the line 429 will alternate between zero and positive for substantially equal periods, thereby representing a median signal. Therefore, the output appearing on the signal line 291' from the analyzer module 431 will also have a median value regardless of the character of the $x$ reference signal appearing on the line 446. It can also be seen that increasing values of $x$ scale distortion result in an increasing departure from a median signal on the line 420 and a correspondingly increasing departure from a median signal on the line 291'. Therefore, the sign and magnitude of the output signal appearing on the line 291 is truly representative of the direction or sign and magnitude of the $x$ scale distortion between any left and right photographic images being scanned by the flying spot scanners **74*a* and 74*b***.

Quite evidently then, the analyzer module 431 functions to correlate the fluctuating $x$ parallax signal output transmitted thereto from the analyzer module 357 with the $x$-coordinate reference signal transmitted thereto on the line 446, and derive from these two signals a consistent $x$ scale error signal. In an entirely analogous manner, it can be shown that the analyzer module 436 functions to detect the presence of $y$ scale distortion between the left and right photographic images by correlating the fluctuating $y$ parallax signal transmitted thereto via signal line 435 from the analyzer module 358 with the $y$-coordinate reference signal transmitted thereto via the signal line 448 from the limiting amplifier 449, and to drive a consistent $y$ scale error signal therefrom appearing on the line 294'.

The action of the correlation unit 329 has been described in producing $x$ and $y$ parallax error signals and $x$ and $y$ scale error signals; and the action of the correlation unit will now be described in the presence of skew distortions as shown in FIGS. 1*b* and 1*d*. Referring to FIG. 19, it will be observed that the $x$ skew and $y$ skew registration error signals appear on the lines 292' and 293' and, therefore, must be developed by the analyzer modules 438 and 439. It will also be observed that these modules 438 and 439 receive as parallax and reference inputs thereto the same signals that were utilized by the modules 431 and 436 in the development of $x$ and $y$ scale error signals. However, in the case of the modules 438 and 439, $x$ parallax is correlated with the $y$-coordinate position of the scanning spot, and $y$ parallax is correlated with the $x$-coordinate position of the scanning spot, respectively.

In the following description of the production of the skew error signals, the analyzer module 438 will first be considered. As shown in FIG. 19, the module 438 receives as inputs thereto the $x$ parallax signal output from the analyzer module 357 which is transmitted by the signal line 429 and the shaped and undifferentiated $y$-scanning signal which is transmitted thereto from the limiting amplifier 449 on the signal line 448. Considering first the position of the scanning spot when moving in the first and second quadrants of the raster, and referring to FIG. 1*b*, it will be seen that $x$ parallax will be positive in each of these two quadrants. Since the $y$-coordinate values are positive in the first and second quadrants, the analyzer module 438 will have as inputs thereto a positive reference signal appearing on the line 448 representing $+y$-coordinate position and a predominantly zero parallax signal appearing on the line 429 (illustrated in FIGS. 31 through 34 for a positive $x$ parallax condition). In accordance with the operation of the exclusive OR gate in the analyzer module 438 (such gate having been described in detail hereinbefore), the output signal appearing on the line 292' will be predominantly positive under such conditions representing a positive $y$ in $x$ or $x$ skew distortion.

The operation of the analyzer module 438 will next be considered when the scanning spot is located in either the third or fourth quadrants of the scanning raster. In these quadrants the $y$-coordinate values will be negative in all instances and therefore the potential on line 448 will be zero. Also, referring to FIG. 1*b*, it will be seen that the $x$ parallax is negative in both the third and fourth quadrants of the raster, and therefore the $x$ parallax signal transmitted to the module 438 on the signal line 429 will be predominantly positive, as shown in FIGS. 34 through 38 for negative $x$ parallax. In accordance with the operation of the exclusive OR gate in the analyzer module 438, the output thereof appearing on the signal line 292' will be predominantly positive under these conditions representing a positive $y$ in $x$ or $x$ skew distortion.

It can be seen, therefore, that the signal output of the analyzer module 438 will be consistently positive under these conditions regardless of the quadrant in which the scanning spot is located; and therefore, the signal appearing on the line 292' is truly representative of $+x$ skew distortion. Whenever the $x$ skew distortion is of opposite sign (that is, negative $x$ skew), as would be represented by FIG. **1*b* if the slope of the $y$ ordinates were opposite to that illustrated, the $x$ parallax will be negative in the first and second quadrants and positive in the third and fourth quadrants. Therefore, when the scanning spot is in the first and second quadrants, the inputs to the analyzer module 438 will be positive on the signal line 448 representing a positive $y$-coordinate position, and predominantly positive on the signal line 429 representing a negative $x$ parallax. In accordance with the operation of the analyzer module, the signal output therefrom on the line 292' will be predominantly zero, representing a negative skew distortion under these conditions. Likewise, when the scanning spot is in either the third or fourth quadrants of the raster, the $y$-coordinate signal appearing on the line 448 will be zero, thereby representing negative $y$-coordinate values, and the parallax signal appearing on the line 429 will be predominantly zero, representing positive $x$ parallax in such third and fourth quadrants. Therefore, the signal output of the analyzer module 438** will again be predominantly zero, representing a negative $x$ skew distortion.

In the absence of $x$ skew distortion, and assuming that all other distortions have been corrected or are nonexistent, the parallax signal appearing on the line 429 will alternate between zero and positive for substantially equal periods thereby representing a median signal. Accordingly, the output of the analyzer module 438 will also have a median value regardless of the character of the reference signal appearing on the line 448. Also, it can be seen that increasing values of $x$ skew distortion result in increasing departure from a median signal on the line 429 and a correspondingly increasing departure from a median signal on the output signal line 292', and therefore that the sign and magnitude of the output signal on the line 292' is truly representative of the direction and magnitude of the *x* skew distortion between the left and right photographic images being scanned.

It will be apparent from the foregoing that the analyzer module 438 is operative to correlate a fluctuating *x* parallax signal transmitted thereto via the signal line 429 from the analyzer module 357 with the *y*-coordinate reference signal transmitted thereto on the signal line 448, and derive therefrom a consistent *y* in *x* or *x* skew error signal. It may be shown in an entirely analogous manner that the analyzer module 439 is operative to detect the presence of *x* in *y* or *y* skew distortion between the left and right images being scanned by correlating the fluctuating *y* parallax signal transmitted thereto via the signal line 435 from the analyzer module 358 with the *x*-coordinate reference signal transmitted thereto via the signal line 446 from the limiting amplifier 447.

The analyzer modules 431, 436, 438, and 439 each detect the presence of first-order distortion between the left and right photographic images being scanned; and in performing this detection function, each of these analyzer modules is supplied with a reference signal derived directly from the instantaneous *x*- and *y*-scanning spot coordinate signals—that is to say, undifferentiated reference signals which are fed thereto from the *x* and *y* reference signal input lines 327 and 328 through the respectively associated delay lines and limiting amplifiers 384–447 and 387–449. The correlation unit 329 is also operative to detect the presence of second-order distortion between such images and, in response thereto, provide second-order registration error signals. In the specific apparatus being considered, there are six such second-order registration error signals developed.

The first two second-order error signals to be considered herein are the *xy* in *x* and *xy* in *y* signals which respectively appear on the signal lines 295' and 296' and are developed in the analyzer modules associated therewith (respectively identified in FIG. 19 by the numerals 450 and 451). These two modules receive as a reference signal, supplied thereto on a signal line 452, a signal derived from both of the *x*- and *y*-coordinate position reference signals. Such derived signal is produced by an exclusive OR-gate 453 the input signals to which are delivered thereto via the signal line 446 from the limiting amplifier 447 and via the signal line 448 from the limiting amplifier 449. The exclusive OR-gate 453 is identical in both circuit and function with the exclusive OR-gate 353 heretofore described in detail and illustrated in FIG. 22.

The analyzer module 450 receives as input signals thereto the signal provided by the exclusive OR-gate 453 and the *x* parallax signal from the exclusive OR-gate 399 of the analyzer module 357, which parallax signal is transmitted to the analyzer module 450 via the signal line 492. The output of the analyzer module 450 constitutes the *xy* in *x* error signal appearing on the line 295', and such signal is produced by the analyzer module 450 as a consequence of the operation of the exclusive OR-gate 454 and amplifier 455 therein which function in the manner hereinbefore described in connection with the analyzer module 357.

The analyzer module 451 receives as input signals thereto the signal provided by the exclusive OR-gate 453 and the *y* parallax signal from the exclusive OR-gate 434 of the analyzer module 358, which parallax signal is transmitted to the analyzer module 451 via the signal line 435. The output of the analyzer module 451 constitutes the *xy* in *y* error signal appearing on the line 296', and such signal is produced by the analyzer module 451 as a consequence of the operation of the exclusive OR-gate 456 and amplifier 457 therein which function in the manner hereinbefore described in connection with the analyzer module 358.

In considering the operation of the analyzer modules in producing the second-order *xy* in *x* and *xy* in *y* registration error signals, the analyzer module 450 will be described with respect to the nature and polarities of the input signals thereto in the presence of *xy* in *x* distortion (FIG. **1*k***) between the left and right photographic images being scanned when the scanning spot is in each of the four quadrants of the scanning raster. Taking the first quadrant (+*x*,+*y*) of the scanning raster, and assuming the *xy* in *x* distortion illustrated in FIG. **1*k***, it is seen that positive *x* parallax is present throughout the first quadrant. Therefore, under these conditions, the *x* parallax signal transmitted to the module 450 on the signal line 429 will be predominantly zero, as shown in FIGS. 31 through 34. Since both the *x*- and *y*-coordinate positions are positive in this quadrant, the corresponding reference signals on the lines 446 and 448 will each be positive, as previously described; and under these conditions, the product output of the exclusive OR-gate 453 appearing on the signal line 452 will be zero, as previously explained (see FIG. 23). Since the inputs to the exclusive OR-gate 454 of the analyzer module 450 are zero on the signal line 452 and predominantly zero on the signal line 429, the output of the gate and therefore of the module 450 will be predominantly zero, which in this case represents a positive *xy* in *x* distortion in the first quadrant as illustrated in FIG. **1*k***.

Consider next the situation when the scanning spot is moving in the second quadrant (−*x*,+*y*) of the scanning raster, and assuming the *xy* in *x* distortion illustrated in FIG. **1*k***, it is seen that negative *x* parallax is present throughout the second quadrant. Therefore, under these conditions, the *x* parallax signal transmitted to the module 450 on the signal line 429 will be predominantly positive, as shown in FIGS. 35 through 38. In this quadrant, the *x*-coordinate position is negative and the *y*-coordinate position is positive; and therefore, the *x* reference signal on the line 446 will be zero (FIG. 21) and the *y* reference signal on the line 448 will be positive. Under these conditions, the product output of the exclusive OR-gate 453 appearing on the signal line 452 will be positive as previously explained (see FIG. 23). Since the inputs to the exclusive OR-gate 454 of the analyzer module 450 are positive on the signal line 452 and predominantly positive on the signal line 429, the output of the gate and therefore of the module 450 will be predominantly zero—which again represents a positive *xy* in *x* distortion.

Consider next the situation when the scanning spot is moving in the third quadrant (−*x*,−*y*) of the scanning raster, and assuming the *xy* in *x* distortion illustrated in FIG. **1*k***, it is seen that positive *x* parallax is present throughout such third quadrant. Therefore, under these conditions, the *x* parallax signal transmitted to the module 450 on the signal line 429 will be predominantly zero, as shown in FIGS. 31 through 34. Since both the *x* -and *y*-coordinate positions are negative in this quadrant, the corresponding reference signals on the lines 446 and 448 will each be zero as previously described. Under these conditions, the product output of the exclusive OR-gate 453 appearing on the signal line 452 will be zero, as previously explained (FIG. 23). Since the inputs to the exclusive OR-gate 454 of the analyzer module 450 are zero on the signal line 452 and predominantly zero on the signal line 429, the output of the gate and therefore of the module 450 will be predominantly zero—which again represents a positive *xy* in *x* distortion.

Consider finally the situation when the scanning spot is moving in the fourth quadrant (+*x*,−*y*) of the scanning raster, and assuming the *xy* in *x* distortion illustrated in FIG. **1*k***, it is seen that negative *x* parallax is present throughout such fourth quadrant. Therefore, under these conditions, the *x* parallax signal transmitted to the module 450 on the signal line 429 will be predominantly positive, as shown in FIGS. 35 through 38. In this quadrant, the *x*-coordinate position is positive and the *y*-coordinate position is negative; and therefore, the *x* reference signal on the line 446 will be positive and the *y* reference signal on the line 448 will be zero. Under these conditions, the product output of the exclusive OR-gate 453 appearing on the signal line 452 will be positive as previously explained (see FIG. 23). Since the inputs to the exclusive OR-gate 454 of the analyzer module 450 are positive on the signal line 452 and predominantly positive on the signal line 429, the output of the gate and therefore of the module 450 will be predominantly zero—which again represents a positive *xy* in *x* distortion.

It is seen, therefore, that the signal output appearing on the signal line 295' from the analyzer module 450 is predominantly zero irrespective of the quadrant in which the scanning spot may be moving whenever a positive *xy* in *x* distortion exists; and accordingly, such signal output of the analyzer module is truly representative of positive *xy* in *x* distortion. If such distortion had been of opposite sign such as would be represented by an inversion of the distortion illustrated in FIG. **1*k*** (that is, the longer abscissa would be on the bottom rather than on the top) then the *x* parallax would have been negative in the first and third quadrants and positive in the second and fourth quadrants. In the first and third quadrants, therefore, the signal inputs to the analyzer module 450 would be zero on the line 452 and predominantly positive on the line 429. Under such conditions, the output from the analyzer module 450 is predominantly positive, representing, therefore, a negative *xy* in *x* distortion as required. Similarly, it can be shown that the output of the analyzer module 450 is positive whenever the scanning spot is moving in the second and fourth quadrants and the *xy* in *x* distortion is negative (i.e., the parallax is positive in each of these quadrants).

In the absence of *xy* in *x* distortion, and assuming that all other distortions have been corrected or are nonexistent, the signal representing *x* parallax on the line 429 will alternate between zero and positive for substantially equal periods thereby representing a median signal. Therefore, the output from the analyzer module 450 will also have a median value regardless of the character of the reference signal present on the line 452. Also, it will be apparent that increasing values of *xy* in *x* distortion result in an increasing departure from a median signal on the line 429 and a correspondingly increasing departure from a median signal on the line 295'. Therefore, the sign and magnitude of the output signal on the line 295' is truly representative of the direction or sign and the magnitude of the *xy* in *x* distortion between any left and right photographic images being scanned by the flying spot scanners **74*a* and 74*b***.

Quite evidently then, the analyzer module 450 in operative association with the various circuit components described functions to correlate the fluctuating *x* parallax signal output from the analyzer module 357 with the *xy*-coordinate reference signal from the exclusive OR-gate 453 in a manner such that a consistent *xy* in *x* error signal is derived. In an entirely analogous manner, the analyzer module 451 functions to detect the presence of *xy* in *y* distortion between left and right photographic images being scanned by the flying spot scanners by correlating the fluctuating *y* parallax signal output from the analyzer module 358 with the *xy* reference signal from the exclusive OR-gate 453 so as to produce a consistent *xy* in *y* error signal on the line 296'.

The second-order transformations containing squared terms are illustrated in FIGS. **1*h*, 1*j*, 1*l* and 1*m*, and are effected in response to registration error signals appearing on the signal lines 297' through 300' which are respectively connected to and define the output signal lines of analyzer modules 458, 459, 460, and 461. As in the case of the prior analyzer modules heretofore considered, each of the modules 458 through 461 comprises an exclusive OR gate and an amplifier; and for purposes of specific identification, the exclusive OR gates are respectively denoted 462 through 465 and, similarly, the amplifiers are respectively denoted 466 through 469. As illustrated in FIG. 19, the analyzer modules 458 and 459** receive as one of their inputs the *x* parallax signal transmitted thereto on signal line 429 from the analyzer module 357. Similarly, the analyzer modules 460 and 461 receive as one of their inputs the *y* parallax signal transmitted thereto on signal line 435 from the analyzer module 358.

The modules 458 and 460 receive as the other input signal thereto a reference signal from a signal line 470, which reference signal is derived from the *x* position reference signal appearing on the line 386 after processing thereof in a full-wave rectifier 471 and limiting amplifier 472. The signal line 470 defines the output from the amplifier 472, and the full-wave rectifier is connected to the input thereof by signal line 473. Similarly, the modules 459 and 461 receive as the other input signal thereto a reference signal from a signal line 474, which reference signal is derived from the *y* position reference signal appearing on the line 388 after processing thereof in a full-wave rectifier 475 and limiting amplifier 476. The signal line 474 defines the output from the amplifier 476, and the full-wave rectifier is connected to the input thereof by a signal line 477.

Prior to describing the operation of the analyzer modules 458 through 461, the action of each of the full-wave rectifiers and limiting amplifiers will be considered; and for purposes of description, the full-wave rectifier 471 and amplifier 472 will be selected, and their function described with relation to the *x*-coordinate reference signal fed to the rectifier 471 from the signal line 386. In this connection, a schematic circuit diagram of the rectifier is illustrated in FIG. 48.

The rectifier comprises four diodes respectively denoted 478, 479, 480, and 481 connected in a bridge network, with the anodes of the diodes 478 and 481 connected in common to ground and the cathodes of the diodes 479 and 480 connected in common to an output signal line 473. The cathode of the diode 478 and anode of the diode 479 are connected in common to one side of the secondary winding 483 of an isolation transformer generally designated with the numeral 485. In a similar manner, the cathode of the diode 481 and anode of the diode 480 are connected in common to the opposite side of the secondary winding 483. The primary winding 486 of the transformer is grounded at one end thereof, and the opposite end is connected to an input signal line 386. The output signal line 473 is connected to ground through a suitable load resistance 488 which can be omitted if the external circuitry connected with the output signal line 482 in any specific network provides a suitable loading resistance.

The transformer 485 acts to produce a voltage waveform across the secondary winding 483 which is a replica of the voltage input appearing on the signal line 386, and the full-wave rectifier delivers to the output signal line 473 a waveform having twice the frequency of the input waveform applied to the input signal line 386. More particularly, consider first the action of the rectifier when the potential at the juncture of the diodes 478 and 479 is positive with respect to the potential at the juncture of the diodes 480 and 481. Under these voltage conditions, the diodes 479 and 481 will be forward biased and, therefore, will present a low resistance to the flow of current. Correspondingly, the diodes 478 and 480 will be back biased and will accordingly present a high resistance to current flow. Consequently, the juncture of the diodes 480 and 481 is effectively connected to ground through the forward-biased diode 481, and the juncture of the diodes 478 and 479 is connected to the output signal line 386 through the forward-biased diode 479. The diodes 478 and 480 in being back biased will present a very high resistance to current flow, and the current therethrough can be neglected. Therefore, the potential appearing on the output signal line 473 will be essentially a duplicate of the potential at the juncture of the diodes 478 and 479, and the positive half of the input voltage waveform will be reproduced on the output signal line 473 essentially unmodified.

Consider next the action of the rectifier when the potential at the juncture of the diodes 480 and 481 is positive with respect to the potential at the juncture of the diodes 478 and 479. Under these voltage conditions, the diodes 478 and 480 will be forward biased and will therefore present a low resistance to the flow of current. Correspondingly, the diodes 479 and 481 will be back biased and will therefore present a high resistance to current flow. Consequently, the juncture of the diodes 478 and 479 is effectively connected to ground through the forward-biased diode 478, and the juncture of the diodes 480 and 481 is connected to the output signal line 473 through the forward-biased diode 480. The diodes 479 and 481 in being back biased will present a very high resistance to current flow, and the current therethrough can be neglected. Therefore, the potential appearing on the output signal line 473 will be essentially a duplicate of the potential at the juncture of the diodes 480 and 481 which is, by action of the transformer 485, an inverted duplicate of the input voltage waveform applied to the transformer on the input signal line 386.

The time relationships between the input and output waveforms of the full-wave rectifier 471 are illustrated in FIG. 49. Referring to this Figure, it is seen that the lower or negative portions of the $x$ reference signal waveforms on the line 386 appear inverted on the output line 473 of the rectifier and are added to the uninverted upper or positive portions of the input waveform to provide a reduced amplitude sawtooth waveform having twice the frequency of the input sawtooth waveform. The zero axis of the waveform appearing on the signal line 473 is denoted by the broken line 473*a* in FIG. 49, and such zero axis is established by the input circuit to the limiting amplifier 472.

Such limiting amplifier is identical in circuit and function with the limiting amplifiers heretofore described, and in particular with the zero level discriminator 349 which is illustrated schematically in FIG. 20. The input circuit establishing such zero line 473*a* in FIG. 49 is defined in the amplifier illustrated in FIG. 20 by the capacitance 362 and the resistances 364 and 365. The output waveform of the limiting amplifier 472 is a square-shaped waveform as shown in FIG. 49, and it alternates between positive and zero values in accordance with whether the input signal thereto is respectively positive or negative.

As indicated hereinbefore, the action of the full-wave rectifier 475 and limiting amplifier 476 associated therewith is completely analogous to that of the rectifier 471 and amplifier 472, and therefore the components 471–472 and 475–476 respectively perform analogous functions in the $x$ reference channel and $y$ reference channel.

The nature of the $x$ reference signal appearing on the line 470 and its relation to the position of the scanning spot in the raster at any instant will now be considered with reference to the waveforms illustrated in FIG. 49. Whenever the position of the scanning spot is adjacent the right-hand border of the scanning raster (that is, approaching the extreme limit of scanning motion in the $+x$ direction), the signal on the line 386 will be strongly positive and the corresponding signal on the line 470 will be positive. Similarly, whenever the scanning spot is adjacent the left-hand border of the scanning raster (that is, approaching the extreme limit of scanning motion in the $-x$ direction), the signal on the line 386 will be strongly negative and the corresponding signal on the line 470 will be positive. Whenever the scanning spot is near the center of the scanning raster (that is to say, adjacent the $y$-axis thereof), the signal on the line 386 will be near zero and the corresponding signal on the line 470 will be zero. It will be observed in FIG. 49 that the transition in the signal waveform from zero to a positive value on the line 470 occurs when the scanning spot is about halfway between the center ($y$-axis) of the raster and the left or right borders thereof.

The analyzer module 458 is connected to the signal line 470, and therefore one of the input signals to the exclusive OR-gate 462 is the second-order $x$ reference waveform illustrated in FIG. 49. The other input to the gate 462 is transmitted thereto via signal line 429 which provides a fluctuating $x$ parallax signal from the analyzer module 357. In response to these signal inputs, the analyzer module 458 develops an $x^2$ in $x$ registration error signal which appears on the line 297'. Referring to FIG. 1*h* which illustrates an $x^2$ in $x$ distortion of the scanning raster, it will be noted that an undistorted raster, indicated by broken lines is superimposed thereon. Comparing the undistorted and transformed rasters, it is seen that the $x$ parallax is positive adjacent both the left and right borders of the raster and is negative in the central region thereof.

Consider first the action of the analyzer module 458 whenever the position of the scanning spot approaches the right-hand margin of the scanning raster. The $x$ parallax is positive in this region and the $x$ parallax signal appearing on the line 429 will be predominantly zero, as shown in FIGS. 31 through 34 for a condition of positive parallax. Since the position of the spot near the right-hand border of the scanning raster represents a large positive $x$-coordinate value, the potential of the reference signal on the line 386 will be strongly positive, resulting in a positive signal on the input line 470 to the analyzer module 458, as illustrated in FIG. 49. In accordance with the operation of the exclusive OR-gate 462 in the module 458, the output signal on the line 297' therefrom will be predominantly positive (see FIG. 23 indicating that the output of the exclusive OR gate is positive whenever one of the input signals thereto is positive and the other zero), thereby representing a positive $x^2$ in $x$ distortion.

Next consider the action of the analyzer module 458 whenever the position of the scanning spot approaches the left-hand margin of the scanning raster. The $x$ parallax is positive in this region and the $x$ parallax signal appearing on the line 429 will be predominantly zero, as shown in FIGS. 31 through 34 for a condition of positive parallax. Since the position of the spot near the left-hand border represents a large negative $x$-coordinate value, the potential of the reference signal on the line 386 will be strongly negative, resulting in a positive signal on the input line 470 to the analyzer module 458 (FIG. 49). In accordance with the operation of the exclusive OR-gate 462 in the module 458, the output signal on the line 297' therefrom will be predominantly positive, thereby again representing a positive $x^2$ in $x$ distortion.

Next consider the action of the analyzer module 458 whenever the scanning spot is positioned near the center of the scanning raster. The $x$ parallax is negative in this region and the $x$ parallax signal appearing on the line 429 will be predominantly positive, as shown in FIGS. 35 through 38, for a condition of negative $x$ parallax. Since the position of the spot near the center of the scanning raster represents near zero $x$-coordinate values, the potential of the reference signal on the line 386 will be near zero, resulting in a zero signal on the input line 470 to the analyzer module 458. In accordance with the operation of the exclusive OR-gate 462 in the module 458, the output signal on the line 297' therefrom will be predominantly positive, thereby representing a positive $x^2$ in $x$ distortion.

Evidently then, the output of the analyzer module will be consistently positive regardless of the position of the scanning spot in the scanning raster; and, therefore, the positive signal on the line 297' is truly representative of positive $x^2$ in $x$ distortion. If the distortion had been of opposite sign, such as would be represented by the FIG. 1*h* if it were reversed from left to right, then the $x$ parallax would have been negative along both the left and right-hand borders of the scanning raster and positive in the central regions thereof. Therefore, with the scanning spot near the borders of the raster, the inputs to the module 458 would have been positive on the signal line 470, as before, and predominantly positive on the signal line 429 representing a negative $x$ parallax. In accordance with the operation of the analyzer module 458, the output therefrom on the signal line 297' would be predominantly zero under these conditions, representing a negative $x^2$ in $x$ distortion. Similarly, with the scanning spot near the center of the raster, the coordinate reference signal on the line 470 would be zero, as before; and the $x$ parallax signal on the line 429 would be predominantly zero representing positive $x$ parallax. Accordingly, the output signal on line 297' from the analyzer module 458 would be predominantly zero, again representing a negative $x^2$ in $x$ distortion.

In the absence of $x^2$ in $x$ distortion and assuming that all other distortions have been corrected or are nonexistent, the $x$ parallax signal on the line 429 will alternate between zero and positive values for substantially equal periods, representing a median signal. Therefore, the output from the module 458 will also have a median value regardless of the character of the reference signal fed thereto on the line 470. Also, increasing values of $x^2$ in $x$ distortion result in an increasing departure from a median signal on the line 429, and a correspondingly increasing departure from a median signal on the output line 297'. Therefore, the sign and magnitude of the signal appearing on the line 297' is truly representative of the direction and magnitude of the $x^2$ in $x$ distortion between the left and right photographic images being scanned by the flying spot scanners 74a and 74b.

It is apparent from the foregoing discussion that the analyzer module 458 functions to correlate the fluctuating $x$ parallax signal transmitted thereto on signal line 429 from the analyzer module 357 with the $x^2$ coordinate reference signal transmitted thereto on the line 470 from the limiting amplifier 472, and to derive from such signals a consistent $x^2$ in $x$ error signal. The analyzer module 461, in an entirely analogous manner, functions to correlate the fluctuating $y$ parallax signal transmitted thereto on signal line 435 from the analyzer module 358 with the $y^2$ coordinate reference signal transmitted thereto on the line 474 from the limiting amplifier 476, and to derive from such signals a consistent $y^2$ in $y$ error signal that appears on the signal line 300'.

The action of the correlation unit 329 will now be described in the presence of the second-order distortions illustrated in FIGS. 1j and 1m (namely, $y^2$ in $x$ and $x^2$ in $y$ distortions) which may be described as being curvilinear. The error signals representing such distortions respectively appear on the signal lines 298' and 299' which define the outputs from the respective analyzer modules 459 and 460. It may be concluded, therefore, that the signals for such second-order distortions are developed in these two modules.

It will be observed in FIG. 19 that the analyzer modules 459 and 460 receive as input signals the same parallax and reference signals which are utilized by the analyzer modules 458 and 461 heretofore described. However, in contrast to the modules 458 and 461 in which $x$ parallax error signals are coordinated with $x^2$-coordinate reference signals and $y$ parallax error signals are coordinated with the $y^2$-coordinate reference signals, respectively, the module 459 correlates the $x$ parallax error signal with the $y^2$-coordinate reference signal and the module 460 correlates the $y$ parallax error signal with the $x^2$-coordinate reference signal. In this respect, the exclusive OR-gate 463 of the analyzer module 459 is connected with the $x$ parallax signal line 429 and with the $y^2$ reference signal line 474; and similarly, the exclusive OR-gate 464 of the module 460 is connected to the $y$ parallax signal line 435 and to the $x^2$ reference signal line 470.

In considering the operation of the correlation unit in producing error signals representing the curvilinear distortions shown in FIGS. 1j and 1m, the action of the analyzer module 459 will be described in producing the $y^2$ in $x$ error signal appearing on the line 298'. As stated, the inputs to such module 459 constitute the $x$ parallax signal transmitted thereto on the line 429 and the $y^2$ coordinate reference signal transmitted thereto on the line 474. By referring to FIG. 1j, a comparison of the superimposed undistorted and transformed rasters shows that the $x$ parallax is positive toward the upper and lower borders of the raster and is negative in the central regions thereof.

Consider first the action of the analyzer module 459 whenever the position of the scanning spot approaches the upper border of the scanning raster. The $x$ parallax is positive in this region, and the $x$ parallax signal appearing on the line 429 will be predominantly zero, as shown in FIGS. 31 through 34 for a condition of positive parallax. Since the position of the spot near the upper border of the scanning raster represents a large positive $y$-coordinate value, the potential of the reference signal on the line 388 will be strongly positive, resulting in a positive $y^2$ reference signal on the input line 474 to the analyzer module 459 (corresponding to the $x^2$ reference signal on line 470, as illustrated in FIG. 49). In accordance with the operation of the exclusive OR-gate 463 in the analyzer module 459, the output signal on the line 298 therefrom will be predominantly positive (see FIG. 23 indicating that the output of the exclusive OR gate is positive whenever one of the input signals thereto is positive and the other negative), thereby representing a positive $y^2$ in $x$ distortion.

Next consider the action of the analyzer module 459 whenever the position of the scanning spot approaches the lower boundary of the scanning raster. The $x$ parallax is positive in this region and the $x$ parallax signal appearing on the line 429 will be predominantly zero, as shown in FIGS. 31 through 34 for a condition of positive parallax. Since the position of the spot near the lower boundary of the raster represents a large negative $y$-coordinate value, the potential of the reference signal on the line 388 will be strongly negative, resulting in a $y^2$ reference waveform on the line 474 to the analyzer module 459 which will be positive. In accordance with the operation of the exclusive OR-gate 463 in the module 459, the output signal on the line 298' therefrom will be predominantly positive, thereby again representing a positive $y^2$ in $x$ distortion.

Next consider the action of the analyzer module 459 whenever the scanning spot is positioned near the center of the scanning raster. The $x$ parallax is negative in this region and the $x$ parallax signal appearing on the line 429 will be predominantly positive, as shown in FIGS. 35 through 38 for a condition of negative $x$ parallax. Since the position of the spot near the center of the scanning raster represents near zero $y$-coordinate values, the potential of the reference signal on the line 388 will be near zero, resulting in a zero signal on the input line 474 to the analyzer module 459 (analogous to the signal on the line 470, as shown in FIG. 49). In accordance with the operation of the exclusive OR-gate 463 in the module 459, the output signal on the line 298' therefrom will be predominantly positive, thereby representing a positive $y^2$ in $x$ distortion. Evidently then, the output of the analyzer module 459 will be consistently positive regardless of the position of the scanning spot in the scanning raster; and, therefore, the positive signal on the line 298' is truly representative of positive $y^2$ in $x$ distortion.

If the distortion had been of opposite sign such as would be represented in FIG. 1j if it were reversed from left to right with the ordinals curved in the opposite direction, then the $x$ parallax would have been negative toward the upper and lower boundaries of the scanning raster and positive in the central regions thereof. Therefore, with the scanning spot near the upper and lower boundaries of the raster, the inputs to the module 459 would have been positive on the signal line 474, as before, and predominantly positive on the line 429, representing a negative $x$ parallax. In accordance with the operation of the analyzer module 459, the output therefrom on the signal line 298' would be predominantly zero under these conditions, representing a negative $y^2$ in $x$ distortion. Similarly, with the scanning spot near the center of the raster, the $y^2$-coordinate reference signal on the line 474 would be zero as before; and the $x$ parallax signal on the line 429 would be predominantly zero, representing positive $x$ parallax. Accordingly, the output signal on the line 298' from the analyzer module 459 would be predominantly zero, again representing a negative $y^2$ in $x$ distortion.

In the absence of $y^2$ in $x$ distortion, the $x$ parallax signal on the line 429 will alternate between zero and positive values for substantially equal periods representing a median signal. Therefore, the output from the analyzer module 459 will also have a median value regardless of the character of the reference signal fed thereto on the line 474. Also, increasing values of $x^2$ in $x$ distortion result in an increasing departure from a median signal on the line 429 and a correspondingly increasing departure from a median signal on the output line 298'. Therefore, the sign and magnitude of the signal appearing on the line 298' is truly representative of the direction and magnitude of the $y^2$ in $x$ distortion between the left and right photographic images being scanned by the flying spot scanners 74a and 74b.

It is apparent from the foregoing discussion that the analyzer module 459 functions to correlate the fluctuating $x$ parallax signal transmitted thereto on signal line 429 from the analyzer module 357 with the $y^2$-coordinate reference signal transmitted thereto on the line 474 from the limiting amplifier 476, and to derive from such signals a consistent $y^2$ in $x$ error signal. The analyzer module 460, in an entirely analogous manner, functions to correlate the fluctuating $y$ parallax signal transmitted thereto on signal line 435 from the analyzer module 358 with the $x^2$-coordinate reference signal transmitted thereto on the line 470 from the limiting amplifier 472, and to derive from such signals a consistent $x^2$ in $y$ error signal that appears on the line 299.

Summarizing briefly the operation of the correlation unit illustrated in FIG. 19, it may be said that each of the 10 analyzer modules function to sense misregister between the images being scanned according to the various types corresponding to the 10 prime transformations illustrated in FIG. 1, and the zero-order of $x$ and $y$ parallax transformations. Such sensing operations are performed in terms of detecting time differences between the left and right video input signals respectively transmitted to the video module 346 on the input signal lines 325 and 326, and between signals derived from the respective video input signals and the $x$ and $y$ reference signals or their derivatives. In particular, each analyzer module is effective to correlate a fluctuating parallax signal with the appropriate $x$ and $y$ reference signal or derivative thereof and to extract a registration error signal coherent with the particular reference input signal.

As illustrated in FIGS. 39 through 42, the analyzer module 357 is insensitive to $y$ parallax components of the output signal from the exclusive OR-gate 353 appearing on the signal line 356 therefrom. In a similar manner, FIGS. 31 through 38 illustrate that the analyzer module 358 is insensitive to $x$ parallax components of the output signal appearing on the line 356. It can be shown in a similar manner that each of the other analyzer modules is insensitive to parallax fluctuations that are not coherent with the reference signal input thereto but which may be coherent with reference signals to other modules. Therefore, each analyzer module by correlating a composite parallax fluctuation with its own particular reference signal is responsive, exclusively, to a single distortion component in such composite parallax signal. Evidently then, the actions of the various analyzer modules may be said to be mutually independent and, accordingly, there is no interference therebetween.

As discussed hereinbefore, the specific correlation system disclosed comprises a plurality of correlation units (see FIG. 18) which are identical except for the band-pass networks (the networks 347 and 348 illustrated in FIG. 19 for the correlation unit 329). By effectively segmenting the entire video spectrum into restricted-bandwidth portions thereof, the extent of information loss that results from clipping or reducing the amplitude of such video signals is materially lessened. Accordingly, this multiple-correlation unit arrangement enables the use of the exceedingly simple correlation circuitry comprising the exclusive OR gates in combination with the amplitude-limiting networks, namely, the zero-level discriminators 349 and 350, without significant loss of video information utilizable for correlation purposes.

As stated hereinbefore, the low-pass networks 334 through 345 illustrated in FIG. 18 are identical in both circuit and function, and the circuit details of one such low-pass network is illustrated in FIG. 50. This circuit, then, defines all of the low-pass networks, but for specific reference, the circuit is considered to represent the network 334 and is so labeled in FIG. 50.

Referring to FIG. 50, it is seen that the low-pass network 334 comprises resistors 490, 491, 493, and 495 together with capacitors 492, 494, and 496. The input signal line 317' is connected to the output signal line 317 through the series-connected resistors 490 and 491. The input line 317' is connected to ground through the capacitor 492, and the output line 317 is connected to ground through the resistor 495 and the capacitor 496 in series connection therewith. The midpoint of resistors 490 and 491 is connected to ground through the resistor 493 and the capacitor 494 in series connection therewith.

It will be apparent to persons skilled in the art that the network shown in FIG. 50 will, in general, attenuate signals applied to the input line 317' so that a reduced signal level with respect thereto will be available at the output line 317. Also, it will be evident that the higher frequency components of the input signals applied to the line 317' will be attenuated to a greater extent than the lower frequency components owing to the relatively reduced reactance of the capacitance elements of the circuit at higher frequencies.

FIG. 51 is a graph in which the $x$ or horizontal axis represents frequency conveniently in a logarithmic scale and the $y$ or vertical axis represents power-level ratio (decibels), and such graph illustrates the type of response to be expected from the low-pass network 334. Each of the segments 497 and 499 of the response characteristic has a slope of about −12 db. per octave, i.e., the abscissa of a point on the characteristic decreased by about 12 db. for an increase in frequency by a factor of 2. Similarly, each of the segments 498 and 500 has a slope of about −6 db. per octave. The points of mergence of the successive segments are called corner frequencies and are determined by the values of the circuit elements.

The circuit network 334 is effective to smooth the input signal on the line 317' in order to provide an output signal on the line 317 which varies smoothly with time. Also the network 334 does not render the $x$ parallax feedback correction loop unstable, as would be the case if the average slope of the characteristic in FIG. 51 were equal to at least −12 db. per octave.

The response time of each prime transformation correction channel is governed largely by the characteristic of the low-pass networks, particularly the corner frequencies thereof. Higher corner frequencies produce more rapid response and also increase the susceptibility of the system to noise and to the temporary loss of image correlation such as may be encountered briefly in passing areas of little or no image detail in one or both of the images being scanned.

GENERAL OBSERVATIONS

The operation of the image registration instrument, in an overall sense, is evident from the foregoing discussion in which each of the various components and its operation has been set forth in specific detail. Therefore, at this point only a few observations concerning features not specifically discussed heretofore in detail are desirable.

In this connection, it may be noted that the power supplies employed to generate the various voltages used throughout the instrument are wholly conventional, regulated power supplies.

In the particular instrument considered in detail herein, the primary use therefor is in obtaining registration of a pair of images and, in particular, registration of a pair of stereograms or stereo photographic transparencies for stereographic observation thereof. Thus, the scanning system concurrently scans a pair of such images, and electronic reproductions thereof are respectively developed in the binocular viewer 62 comprising the right and left viewing cathode-ray tubes **75*a* and 75*b*. It is quite common in photogrammetry, however, to be concerned with the problem of transforming a single image to facilitate visual observation thereof, for example, for photographically reproducing the same in undistorted form. That is to say, a photographic image may be undesirably distorted for any one of a number of reasons and visual inspection thereof can be tremendously enhanced if at least some of the distortion is removed. Such removal is often referred to as image rectification and involves transforming the image (that is, performing thereon one or more of the transformations illustrated in FIG. 1**). It should be quite evident that the present instrument is exceedingly useful in this "single-image transformation" context.

Also in the particular instrument being considered, the raster transformations are applied at the same time to each of the flying spot scanners 74*a* and 74*b*. This is by no means requisite, however, and image registration of a pair of images is readily obtained by applying the transformations exclusively to one or the other of the flying spot scanners. In this event, the hybrid circuits 283 and 284 (FIG. 16) could be omitted since their function, as heretofore explained in detail, is to modify in opposite senses the $x$-scanning signals, in the case of the hybrid 283, applied to the left and right scanning cathode-ray tubes 74*b* and 74*a* to effect complementary transformations of the rasters thereof. Similarly, modification is effected on the $y$-scanning signals by the hybrid circuit 284. If transformations are to be performed on the rasters of only one of the scanners, specifically by way of example the left flying spot scanner, the hybrid circuits 283 and 284 would be replaced by simple summing points such as the point 285 along the line 301, as already described. In this way, the $\Delta x$ correction signal present on the line 301 could be applied to the left scanner tube by adding at such a summing point, the $x$-scanning signal present on the line 114 and the $\Delta x$ correction signal on the line 301, and then taking the output of such summing point directly to the output line 303. In this case, since an $x$ transformation is not desired on the right scanner tube, the output line 304 would bypass the hybrid circuit and would be directly connected to the $x$-scanning signal line 114. Similarly, the $\Delta y$ correction signal on the line 302 could be applied to the left scanner tube by adding at a summing point, the $y$-scanning signal present on the line 113 and the $\Delta y$ correction signal on the line 302, and then taking the output of such summing point directly to the output line 305. Since any transformation is not desired on the right scanner, the output line 306 would bypass the hybrid circuit and would be directly connected to the $y$-scanning signal line 113.

In certain instances the raster transformations can be applied as readily to the viewing cathode-ray tubes 75*a* and 75*b* (or to one such viewing tube in accordance with the foregoing discussion) as to the flying spot scanner tubes 74*a* and 74*b*, although in the case of automatic registration the feedback control loops are effectively closed by effecting raster changes of the scanner tubes. In the event of such application to the viewing tubes, the output signals from the transformation system illustrated in FIG. 16 will simply be applied to the viewing cathode-ray tubes rather than to the flying spot scanners. It may be noted that in most cases, it is more desirable to apply the transformations to the scanning cathode-ray tubes because then the rasters appearing on the faces of the viewing cathode-ray tubes have the customary rectangular configuration. For purposes hereof, the application of the raster transformations to the scanning and viewing cathode-ray tubes are considered to have functional identicalness and for purposes of simplifying the claim language, reference will be made in the main to the flying spot scanners specifically in preference to employing generalities that, while sufficiently broad to literally encompass both the scanning and viewing cathode-ray tubes, would be quite cumbersome.

It should be understood that while the specific instrument performs transformations of the zero-, first-, and second-order, as heretofore described, the principles employed therein can be used to provide transformations of any higher order that might be either necessary or desirable in any particular instance. In a general sense, this would involve simply the addition of analyzer modules in the correlation system, and additional modulators would accordingly be used in the transformation system. Quite apparently, the inclusion of such additional components would increase both cost and complexity, neither of which are warranted in this instrument because, as stated hereinbefore, although certain types of photographs present considerable third- and higher-order distortions, sections of such photographs of a size likely to be examined at any one time show much less higher order distortion. Therefore, the complexity inherent in providing such higher order transformations should not be occasioned in this instance.

In a similar manner, there may be situations in which only lesser order transformations are warranted in an instrument, and in such event, a simplified form of the present instrument could be provided. That is, the correlation unit illustrated in FIG. 19 could be simplified by eliminating those analyzer modules and associated components concerned with the second-order transformations, and the transformation system illustrated in FIG. 16 would be simplified correspondingly by eliminating modulator assemblies. Thus, it can be stated that image transformations of any order that may be required in a particular environment can be provided using the principles disclosed herein.

It is to be understood that viewing referred to herein is comprehensive of visual observation by eyes or by photographic or analogous sensing means.

For purposes of presenting a specific example of component values in typical illustrative circuits, the following may be considered:

The Limiting Amplifier and Integrator Circuit illustrated in FIG. 11

| | | |
|---|---|---|
| transistor | **141** | 2N2189 |
| resistance | **142** | 6.8 k ohms |
| resistance | **143** | 15 k ohms |
| resistance | **144** | 4.7 k ohms |
| resistance | **145** | 15 k ohms |
| capacitance | **147** | 0.1 microfarads |
| transistor | **148** | 2N2189 |
| resistance | **149** | 15 k ohms |
| resistance | **150** | 2.2 k ohms |
| resistance | **151** | 220 ohms |
| capacitance | **152** | 1 microfarad |
| resistance | **153** | 2.2 k ohms |
| diode | **154** | 1N914 |
| diode | **155** | 1N914 |
| resistance | **156** | 1.8 k ohms |
| capacitance | **157** | 1 microfarad |
| capacitance | **158** | 1 microfarad |
| coupling capacitance | **159** | 4.7 microfarads |
| transistor | **160** | 2N2189 |
| resistance | **161** | 56 k ohms |
| resistance | **162** | 10 k ohms |
| resistance | **163** | 10 k ohms |
| resistance | **164** | 2.2 k ohms |
| capacitance | **165** | 4.7 microfarads |
| capacitance | **166** | 33 picofarads |
| resistance | **167** | 10 k ohms |
| transistor | **169** | 2N2189 |
| resistance | **170** | 3.3 k ohms |
| coupling capacitance | **171** | 4.7 microfarads |

The Delay Circuit illustrated in FIG. 12

| | | |
|---|---|---|
| resistance (variable) | **172** | 5 k ohms |
| capacitance | **173** | 68 picofarads |

The Video Processor Circuit illustrated in FIG. 15

| | | |
|---|---|---|
| transistor | **213** | 2N2189 |
| resistance | **215** | 3.9 k ohms |
| resistance | **216** | 1 k ohms |
| resistance | **217** | 1 k ohms |
| bypass capacitance | **218** | 15 picofarads |
| resistance | **219** | 3.3 k ohms |
| resistance | **220** | 18 k ohms |
| smoothing capacitance | **221** | 15 microfarads |
| light-sensitive resistance | **222** | ck 1114 |
| capacitance | **227** | 10 microfarads |
| transistor | **228** | 2N2189 |
| transistor | **229** | 2N2189 |
| resistance | **230** | 3.3 microfarads ohms |
| resistance | **231** | 6.8 k ohms |
| resistance | **232** | 220 ohms |
| capacitance | **233** | 68 0.1 **picofarads** |
| biasing resistance | **234** | 270 ohms |
| resistance | **235** | 1 k ohms |
| capacitance | **236** | 56 microfarads |
| resistance | **237** | 2.2 k ohms |
| resistance | **238** | 6.8 k ohms |
| resistance | **239** | 330 ohms |
| smoothing capacitance | **240** | 15 microfarads |
| resistance | **241** | 4.7 k ohms |
| capacitance | **242** | 1 microfarad |

| | | |
|---|---|---|
| transistor | 243 | 2N2102 |
| capacitance | 244 | 100 microfarads |
| resistance | 245 | 330 ohms |
| resistance | 246 | 330 ohms |
| capacitance | 247 | 470 picofarads |
| diode | 248 | 1N198 |
| diode | 249 | 1N198 |
| capacitance | 250 | 1.0 microfarads |
| capacitance | 251 | 2.2 microfarads |
| transistor | 252 | 2N2104 |
| load resistance | 253 | 1.8 k ohms |
| capacitance | 254 | 0.1 microfarads |
| resistance | 255 | 1 k ohms |
| resistance | 256 | 390 ohms |
| capacitance | 257 | 1000 microfarads |
| capacitance | 258 | 6.8 microfarads |
| resistance | 259 | 3.9 k ohms |

The Zero-Level Discriminator circuit illustrated in FIG. 20

| | | |
|---|---|---|
| transistor | 359 | 2N2189 |
| transistor | 360 | 2N2189 |
| resistance | 361 | 1 k ohms |
| blocking capacitance | 362 | 0.02 microfarads |
| resistance | 363 | 1 k ohms |
| resistance | 364 | 10 k ohms |
| resistance | 365 | 4.7 k ohms |
| resistance | 367 | 2.7 k ohms |
| resistance | 368 | 10 k ohms |
| resistance | 369 | 4.7 k ohms |
| capacitance | 370 | 0.02 microfarads |

The Exclusive OR gate Circuit illustrated in FIG. 22

| | | |
|---|---|---|
| transistor | 373 | 2N709 |
| transistor | 374 | 2N709 |
| transistor | 375 | 2N709 |
| transistor | 376 | 2N709 |
| transistor | 377 | 2N709 |
| resistance | 378 | 1 k ohms |
| resistance | 379 | 1 k ohms |
| resistance | 380 | 1 k ohms |
| resistance | 381 | 1 k ohms |

The Delay Line illustrated in FIG. 27

| | | |
|---|---|---|
| inductance | 389 | 1 microhenry |
| inductance | 390 | 1 microhenry |
| inductance | 391 | 1 microhenry |
| inductance | 392 | 1 microhenry |
| capacitance | 393 | 1,000 picofarads |
| capacitance | 394 | 1,000 picofarads |
| capacitance | 395 | 1,000 picofarads |

The Differentiator Circuit illustrated in FIG. 28

| | | |
|---|---|---|
| transistor | 402 | 2N2189 |
| transistor | 403 | 2N2189 |
| input capacitance | 404 | 0.02 microfarads |
| resistance | 406 | 10 k ohms |
| resistance | 407 | 4.7 k ohms |
| resistance | 409 | 2.7 k ohms |
| resistance | 410 | 10 k ohms |
| resistance | 411 | 4.7 k ohms |
| capacitance | 412 | 0.02 microfarads |
| resistance | 413 | 1 k ohms |

The Analyzer Module Circuit illustrated in FIG. 30

| | | |
|---|---|---|
| transistor | 414 | 2N709 |
| transistor | 415 | 2N709 |
| transistor | 416 | 2N709 |
| transistor | 417 | 2N709 |
| transistor | 418 | 2N709 |
| transistor | 419 | 2N2189 |
| transistor | 420 | 2N2198 |
| resistance | 421 | 1 k ohms |
| resistance | 422 | 1 k ohms |
| resistance | 423 | 1 k ohms |
| resistance | 424 | 1 k ohms |
| resistance | 425 | 2.2 k ohms |
| resistance | 426 | 1.2 k ohms |
| diode | 427 | 1N914 |

The full Waveform Rectifier Circuit illustrated in FIG. 48

| | | |
|---|---|---|
| diode | 478 | 1N914 |
| diode | 479 | 1N914 |
| diode | 480 | 1N914 |
| diode | 481 | 1N914 |
| load resistance | 488 | 1 k ohms |

The Low-Pass Networks illustrated in FIG. 50

| | | |
|---|---|---|
| resistance | 490 | 4.7 k ohms |
| resistance | 491 | 4.7 k ohms |
| capacitance | 492 | 39 microfarads |

| | | |
|---|---|---|
| resistance | 493 | 3.3 k ohms |
| capacitance | 494 | 15 microfarads |
| resistance | 495 | 2.2 k ohms |
| capacitance | 496 | 82 microfarads |

Approximate values for the corner frequencies indicated in the graph of FIG. 51 that result from the circuit values specifically set forth are as follows

| | | |
|---|---|---|
| $f_1$ | = | 0.2 cycles per second |
| $f_2$ | = | 0.8 cycles per second |
| $f_3$ | = | 1.6 cycles per second |
| $f_4$ | = | 3.2 cycles per second |

General Components illustrated in FIG. 3

| | | |
|---|---|---|
| 74a | cathode-ray tube | Dumont 5 CK P16. |
| 74b | cathode-ray tube | Dumont 5 CK P16. |
| 75a | cathode-ray tube | Video-Color Corp. VC5AP (PAS5) |
| 75b | cathode-ray tube | Video-Color Corp. VC5AP (PAS5) |
| 76a | multiplier phototube | RCA 6655-A |
| 76b | multiplier phototube | RCA 6655-A |
| 188a | multiplier phototube | RCA 6655-A |
| 188b | multiplier phototube | RCA 6655-A |

It should be appreciated that the specific circuit values set forth imply no criticality and can be varied greatly depending upon internal and external parameters, the choice of transistors, the specific function intended for the circuit in any environmental setting, etc.

While in the foregoing specification an embodiment of the invention has been set forth in considerable detail for purposes of making an adequate disclosure thereof, it will be appreciated by those skilled in the art that numerous changes may be made in such details without departing from the spirit and principles of the invention.

What is claimed is:

1. A transformation system for use in automatic registration instruments and including a plurality of input lines respectively constituting first and second reference signal lines and further constituting a plurality of registration error signal lines, and a plurality of balanced modulators respectively connected with such registration error signal lines and also with said reference signal lines, each of said modulators being operative to derive from the registration error signal and reference signal fed thereto a correction signal utilizable in application to the deflection system of a cathode-ray tube to effect a transformation in the scanning raster thereof.

2. In combination with a cathode-ray tube and a raster generator therefor, a transformation system including a plurality of input signal lines respectively constituting the $x$- and $y$-scanning signal output lines from said raster generator and also constituting a plurality of registration error signal lines, a plurality of balanced modulators respectively connected with one or the other of said $x$ and $y$ signal lines and with one of said registration error signal lines, the outputs of certain of said modulators being connected in common to define $\Delta x$ correction signal line and the outputs of certain other of said modulators being connected in common to define a $\Delta y$ correction signal line, said transformation system being connected with the deflection system of said cathode-ray tube so that the individual correction signals delivered by said modulators to said correction signal lines are transmitted therefrom to the deflection system of said tube.

3. The combination of claim 2 in which said transformation system comprises at least two groups of modulators respectively providing first-order and second-order registration error signals, and in which said transformation system further includes a multiplier circuit having separate inputs respectively connected with both the $x$- and $y$-scanning signal lines and providing an output signal line connected with at least one of the modulators in said second-order group.

4. The combination of claim 3 in which said transformation system further comprises a pair of squaring circuits respectively connected with said $x$- and $y$-scanning signal lines and with a pair of additional modulators comprised in said second-order group, such additional modulators being operative to provide second-order correction signals having squared terms therein.

5. The combination of claim 2 in which a pair of cathode-ray tubes are provided therein, and in which said transformation system further includes a pair of hybrid circuits one of which is connected to both the $x$-scanning and $\Delta x$ correction signal lines and the other of which is connected to both the $y$-scanning and $\Delta y$ correction signal lines, each of said hybrid circuits having a pair of outputs respectively providing the $x$- and $y$-scanning signals for each of said cathode-ray tubes of a character operative to effect raster transformations which appear thereon in opposite senses.

* * * * *